United States Patent
Yu et al.

(10) Patent No.: US 12,015,935 B2
(45) Date of Patent: Jun. 18, 2024

(54) SERVICE REQUEST AND PROVISION METHOD, DEVICE, AND STORAGE MEDIUM

(71) Applicant: Alibaba Group Holding Limited, Grand Cayman (KY)

(72) Inventors: Xiaobo Yu, Hangzhou (CN); Changming Bai, Hangzhou (CN); Dapeng Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 309 days.

(21) Appl. No.: 17/561,305

(22) Filed: Dec. 23, 2021

(65) Prior Publication Data

US 2022/0210669 A1    Jun. 30, 2022

(30) Foreign Application Priority Data

Dec. 31, 2020    (CN) .......................... 202011627884.5

(51) Int. Cl.
*H04W 48/18* (2009.01)
*H04L 41/0893* (2022.01)
*H04W 4/50* (2018.01)
*H04W 24/02* (2009.01)

(52) U.S. Cl.
CPC ............. *H04W 24/02* (2013.01); *H04W 4/50* (2018.02)

(58) Field of Classification Search
CPC ....... H04W 24/02; H04W 4/50; H04W 48/18; H04L 41/0893
See application file for complete search history.

(56) References Cited

U.S. PATENT DOCUMENTS

| | | | |
|---|---|---|---|
| 10,827,366 B2 | 11/2020 | Senarath et al. | |
| 10,892,958 B2 | 1/2021 | Bor-Yaliniz et al. | |
| 10,958,525 B2 | 3/2021 | Fang | |
| 11,051,195 B2 | 6/2021 | Yao et al. | |
| 11,115,826 B2 | 9/2021 | Choi et al. | |
| 11,265,210 B2 | 3/2022 | Xu et al. | |
| 2018/0310169 A1* | 10/2018 | Wang ................. H04L 61/5007 | |
| 2019/0109768 A1 | 4/2019 | Senarath et al. | |
| 2019/0140904 A1 | 5/2019 | Huang et al. | |
| 2019/0230004 A1 | 7/2019 | Zhou et al. | |
| 2019/0327149 A1 | 10/2019 | Sun et al. | |
| 2019/0327317 A1 | 10/2019 | Lu et al. | |
| 2020/0228405 A1 | 7/2020 | Fang | |
| 2020/0236594 A1 | 7/2020 | Tang et al. | |
| 2020/0382374 A1* | 12/2020 | Yi ........................... H04L 41/40 | |
| 2021/0160763 A1 | 5/2021 | Lou et al. | |

OTHER PUBLICATIONS

International Search Report and Written Opinion for PCT Application No. PCT/US21/65115, mailed, Mar. 22, 2022, 10 pages.

* cited by examiner

*Primary Examiner* — Joseph E Dean, Jr.

(74) *Attorney, Agent, or Firm* — Lee & Hayes, P.C.

(57) ABSTRACT

Through further capability exposure of a network slice management system, an application server is enabled to request, from the network slice management system, a network slice template service or a network slice capability service in addition to the network slice service, thus making full use of the slice management capabilities and resources in the slice management system, which in turn enhances the efficiency in using slice management capabilities and resources.

20 Claims, 24 Drawing Sheets

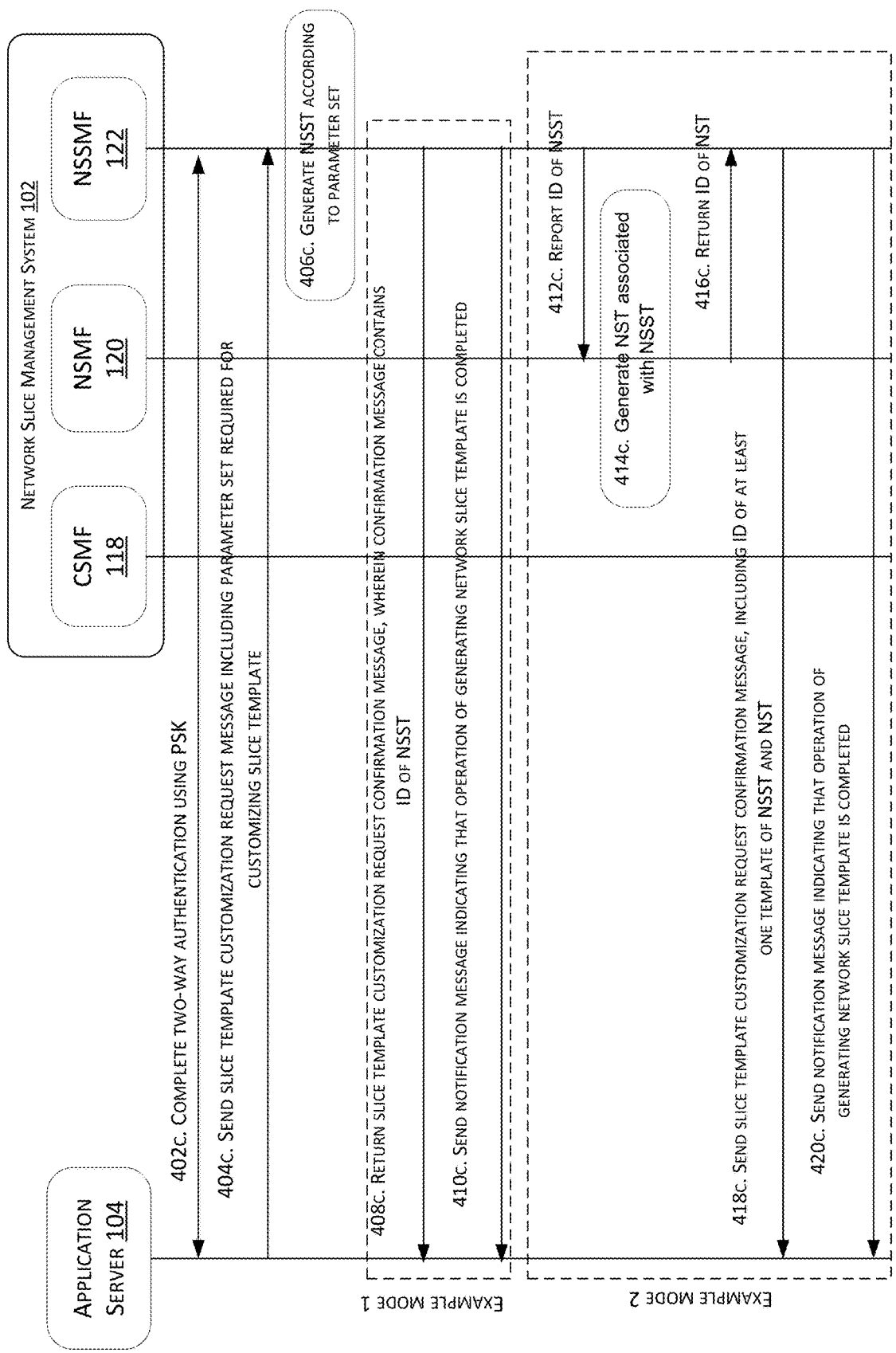

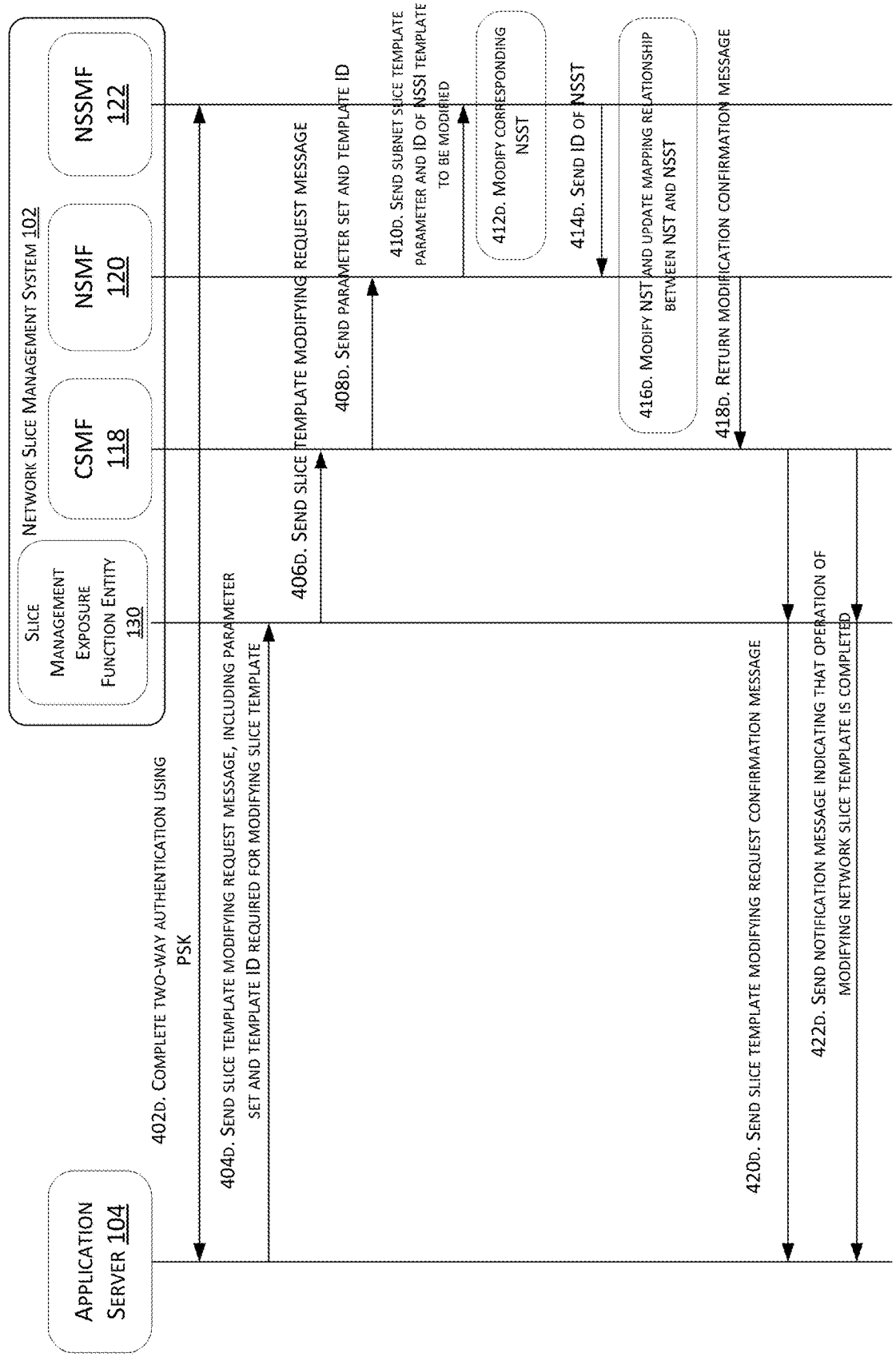

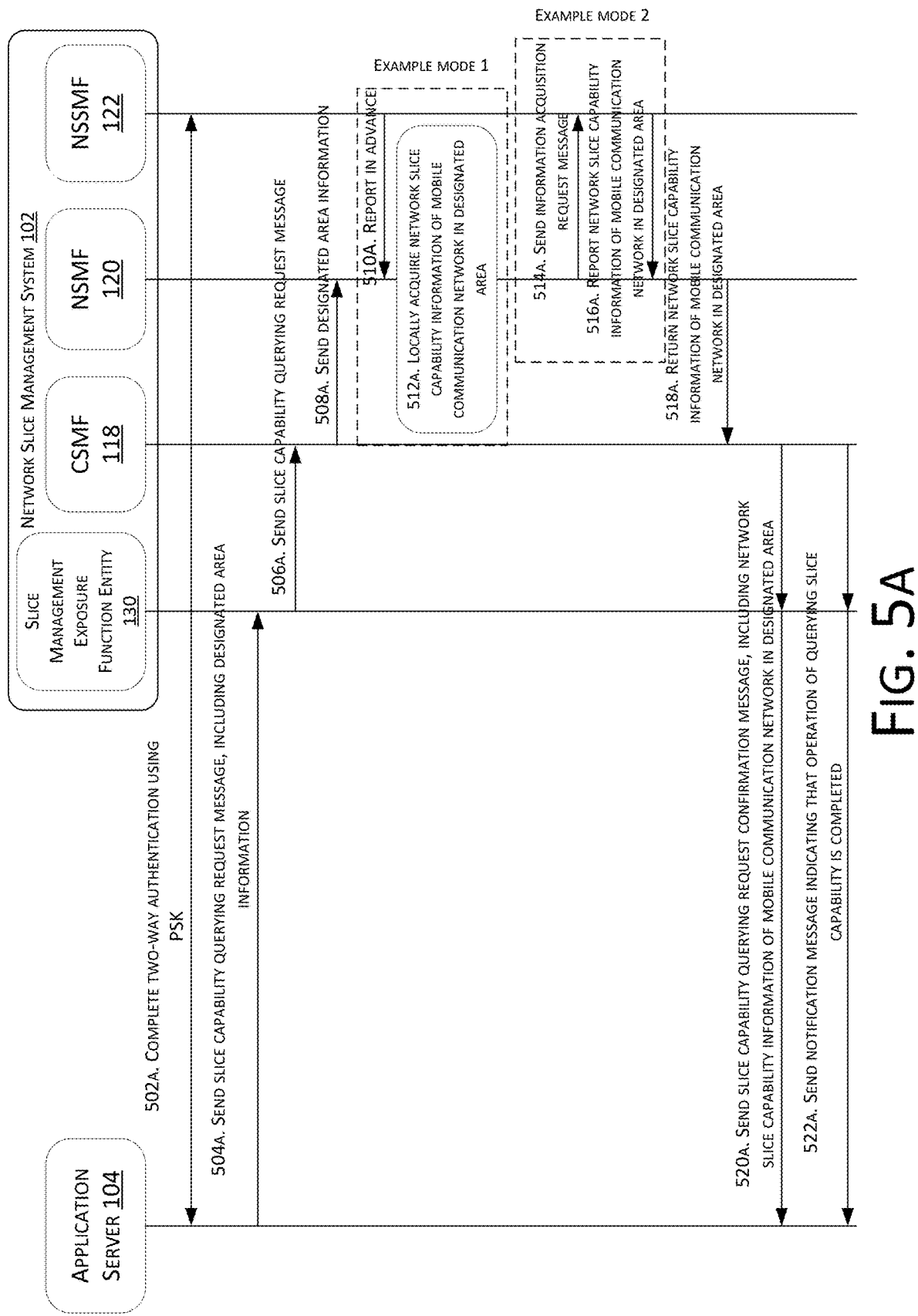

SERVICE REQUEST AND PROVISION METHOD, DEVICE, AND STORAGE MEDIUM

CROSS REFERENCE TO RELATED APPLICATIONS

This application claims priority to Chinese patent application No. 202011627884.5 filed on 31 Dec. 2020 and entitled "SERVICE REQUEST AND PROVISION METHOD, DEVICE, AND STORAGE MEDIUM," which is incorporated herein by reference in its entirety.

TECHNICAL FIELD

The present disclosure relates to the technical field of mobile communication, and, more particularly, to service request and provision methods, devices, and storage media.

BACKGROUND

A system with fifth-generation mobile communication technology (5G) needs to meet different network requirements, such as large bandwidth, low latency, multiple accesses, etc. Network slicing technology is thus introduced. A network slice is a method of building the network based on needs. A Network Functions Virtualization (NFV) technology enables operators to separate multiple virtual end-to-end networks on a unified infrastructure, thus meeting requirements of network performance in different scenarios. In this way, a complete operator network system may be composed of a large number of network slices that serve different scenarios or have different network characteristics, which leads to problems of managing the network slices.

With regard to the management problems of the network slices, 3GPP SA5 defines a slice management system for network slicing for operators. The system mainly includes a communication service management function (CSMF), a network slice management function (NSMF), and a network slice subnet management function (NSSMF). The CSMF is mainly responsible for converting communication service requirements of a slice request party into network slice requirements; the NSMF is mainly responsible for management and coordination for network slice instances (NSI); and the NSSMF is mainly responsible for management and coordination for network subnet slice instances (NSSI). Subsequently, an NFV Orchestrator (NFVO) and an NFV Manager (NFVM) assist in generating slice network entities corresponding to the NSSI or the NSI.

Through the above slice management system, operators may provide network slice services for slice request parties in different application scenarios. In other words, the entire life cycle of creation, activation, updating, release, and the like of a network slice may be reasonably managed. In the conventional techniques, research and use have been focusing on the slice management system's capability in providing network slice services. As a result, slice management capabilities and resources in the slice management system are not fully used. The efficiency in using the slice management system's slice management capabilities and resources is thus low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides service request and provision methods, devices, and storage media to provide many services related to network slicing through a network slice management system, thereby enhancing the efficiency in using slice management capabilities and resource.

Embodiments of the present disclosure provide a service request method applicable to an application server. The method comprises the following steps: sending to a network entity in a network slice management system a service request message, wherein the service request message comprises a service parameter to request the network slice management system to provide a target service therefor; the target service comprises a network slice template service or a network slice capability service; and receiving a response message returned by the network entity for the service request message, the response message carrying information of whether the network slice management system is capable of successfully providing the target service for the application server.

Embodiments of the present disclosure further provide a service provision method applicable to a network entity in a network slice management system. The method comprises the following steps: receiving a service request message sent by an application server, wherein the service request message comprises a service parameter to request a target service from the network slice management system; providing the target service for the application server according to the service parameter, wherein the target service comprises a network slice template service or a network slice capability service; and returning a response message to the application server, the response message carrying information of whether the network slice management system is capable of successfully providing the target service for the application server.

Embodiments of the present disclosure further provide an application server, comprising: one or more memories and processors, wherein the one or more memories are configured to store a computer program or computer-readable instructions; the one or more processors are coupled to the memories and configured to execute the computer program, so as to: send to a network entity in a network slice management system a service request message, wherein the service request message comprises a service parameter to request the network slice management system to provide a target service therefor; the target service comprises a network slice template service or a network slice capability service; and receive a response message returned by the network entity for the service request message, the response message carrying information of whether the network slice management system is capable of successfully providing the target service for the application server.

Embodiments of the present disclosure further provide a network entity, comprising: one or more memories and processors, wherein the one or more memories are configured to store a computer program or computer-readable instructions; the one or more processors are coupled to the memories and configured to execute the computer program, so as to: receive a service request message sent by an application server, wherein the service request message comprises a service parameter to request a target service from the network slice management system; provide the target service for the application server according to the service parameter, wherein the target service comprises a network slice template service or a network slice capability service; and return a response message to the application server, the response message carrying information of whether the network slice management system is capable of successfully providing the target service for the application server.

Embodiments of the present disclosure further provide one or more computer-readable storage media storing therein a computer program or computer-readable instructions, wherein when the computer program is executed by one or more processors, the one or more processors implement steps in the methods provided by the embodiments of the present disclosure.

Embodiments of the present disclosure further provide a computer program product, comprising a computer program or computer-readable instructions, wherein when the computer program or instruction is executed by one or more processors, the one or more processors implement steps in the methods provided by the embodiments of the present disclosure.

In the embodiments of the present disclosure, through further capability development of the network slice management system, the application server is enabled to request, from the network slice management system, the network slice template service or the network slice capability service in addition to the network slice service, thus making full use of the slice management capabilities and resources in the slice management system, which in turn enhances the efficiency in using slice management capabilities and resources.

BRIEF DESCRIPTION OF DRAWINGS

The accompanying drawings described herein are intended to provide a further understanding of the present disclosure, and constitute a part of the present disclosure. The illustrative embodiments of the present disclosure and the descriptions thereof are used to explain the present disclosure, and do not constitute an improper limitation to the present disclosure. In the drawings:

FIGS. 4a-4c show schematic flow diagrams of requesting a service of customizing a slice template respectively through CSMF, NSMF, and NSSMF according to an embodiment of the present disclosure;

FIGS. 4d-4f show schematic flow diagrams of requesting a service of modifying a slice template respectively through CSMF, NSMF, and NSSMF according to an embodiment of the present disclosure;

FIGS. 5a-5c show schematic flow diagrams of requesting a service of querying network slice capability information respectively through CSMF, NSMF, and NSSMF according to an embodiment of the present disclosure;

DESCRIPTION OF EMBODIMENTS

In order to make the objectives, technical solutions, and advantages of the present disclosure clearer, the technical solutions of the present disclosure will be clearly and completely described below in conjunction with the specific embodiments of the present disclosure and the corresponding accompanying drawings. Obviously, the described embodiments are only a part, not all, of the embodiments of the present disclosure. Based on the embodiments in the present disclosure, all other embodiments obtained by ordinary persons skilled in the art without creative efforts shall fall within the protection scope of the present disclosure.

Figure 1A:
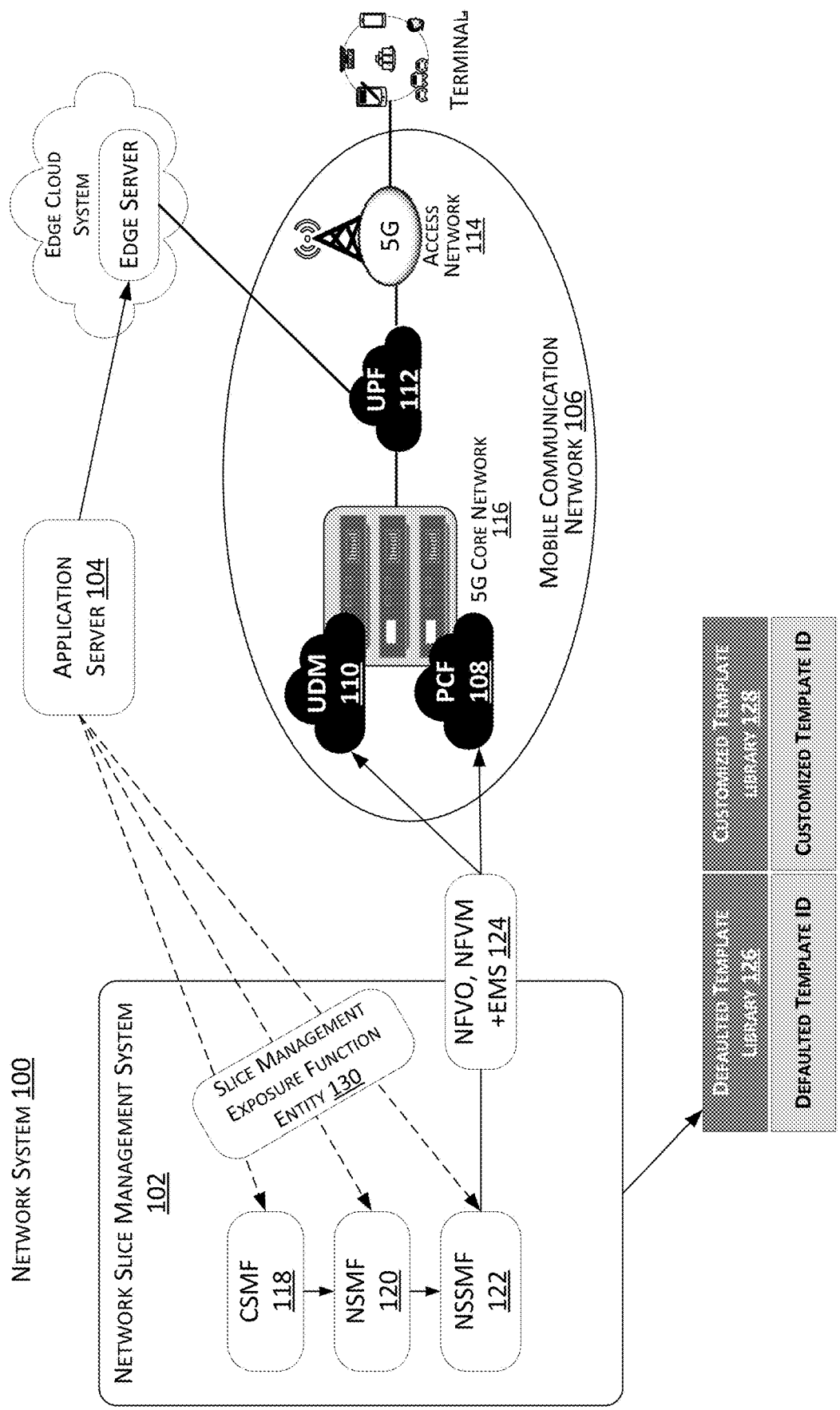
FIG. 1a shows a structural schematic diagram of a network system according to an embodiment of the present disclosure.

FIG. 1a shows a structural schematic diagram of a network system provided by an embodiment of the present disclosure. As shown in FIG. 1a, the network system 100 includes: a network slice management system 102 and an application server 104 in a mobile communication network 106.

In the embodiment, the network architecture and the communication system adopted by the mobile communication network 106 are not limited. Any mobile communication network into which a network slice technology is introduced is applicable to the embodiment of the present disclosure. As shown in FIG. 1a, the mobile communication network 106 may be a 5G mobile communication network (referred to as 5G network for short), and additionally may also be a 4G network or a mobile communication network with a greater system that might appear in the future. Regardless of the system of the mobile communication network 106, the architecture thereof mainly includes, but is not limited to: a radio access network (RAN) and a core network (CN). A transmission network may further be included. Depending on different network systems, network elements contained in the access network and the core network of the mobile communication network 106 may also be different. Taking the 5G network as an example, the access network in the 5G network mainly includes 5G base stations. The 5G core network (5GC) includes, but is not limited to, the following network functions and entities: network elements such as an Authentication Server Function (AUSF), a User Plane Function (UPF), an Access and Mobility Management Function (AMF), a Unified Data Management (UDM), a Network Exposure Function (NEF), a Session Management Function (SMF), a Network Slice Selection Function (NSSF), an NF Repository Function (NRF), a Policy Control Function (PCF), and an Application Function (AF). Only the PCF 108, the UDM 110, and the UPF 112 are illustrated in FIG. 1a.

In the embodiment, network slicing technology is introduced into the mobile communication network 106, which may architect multiple virtual end-to-end networks (i.e., network slices) on a unified infrastructure, thereby meeting different communication service requirements, such as high bandwidth requirements, low latency requirements, and multiple access requirements. The network slicing technology may be implemented in different parts of the mobile communication network 106, such as the access network 114 (e.g. a 5G access network), the core network 116 (e.g., a 5G core network), and the transmission network. For easy differentiation, network slices implemented in different parts (or different domains) of the mobile communication network 106 are considered as subnet slices. The subnet slices of one or more of the parts may be connected together to form a network slice capable of providing complete services to users. Each network slice is logically isolated from the access network to the transmission network, then to the core network.

The mobile communication network 106 supports the network slicing technology, allowing multiple network slices to be formed on the infrastructure thereof according to different communication servers. How to specifically form network slices on the infrastructure of the mobile communication network 106, however, depends on the network slice management system 102. As shown in FIG. 1a, the network slice management system 102 includes: network entities such as a CSMF 118, an NSMF 120, an NSSMF 122, etc. The CSMF 118 provides an interface for communicating with the NSMF 120; and the NSMF 120 provides an interface for communicating with the NSSMF 122. The CSMF 118 is responsible for receiving a communication service requirement sent by a scenario user, completing translating the communication service requirement of the user to a network slice requirement, and distributing the network slice requirement to the NSMF 120. The network slice requirement may be implemented as a Service Level Agreement (SLA) requirement. The NSMF 120 is mainly responsible for creating an NSI according to the network slice requirement, decomposing a network sub-slice requirement to each sub-slice, and distributing the network sub-slice requirement to the NSSMF 122 of each subnet. The NSSMF 122 is responsible for completing mapping from the NSI to an NSSI according to the received network sub-slice requirement, and calling the NFVO, the NFVM, an Element Management System (EMS), totally referred to as 124, and the like to assist in generating a slice network entity corresponding to the NSSI or the NSI, which means that the deployment of each subnet slice, computing, network, storage resources on which the subnet slices depend, and the like, is done on a Network Functions Virtualization Infrastructure (NFVI) of the mobile communication network 106.

In the embodiment, the deployment implementation of the network slice management system 102 is not limited. For example, the network slice management system 102 may be deployed at one level or multiple levels. In the case of deploying at multiple levels, the NSMF 120 is deployed at each level of the management system; one or more NSSMFs 122 are deployed below the NSMF 120. The NSMF 120 is responsible for managing and scheduling the NSI at the level. The NSSMF 122 is responsible for managing and scheduling the NSSI at the level. For example, an NSMF 120 at an upper level may interface with an NSMF 120 at a lower level to implement the interconnection between upper and lower management systems, which is not limited thereby. For example, NSSMFs 122 at two adjacent levels may be interfaced to implement the interconnection between the upper and lower management systems. Alternatively, the NSMF 120 at the upper level and the NSSMF 122 at the lower level may be interfaced to implement the interconnection between the upper and lower management systems.

Figure 1B:
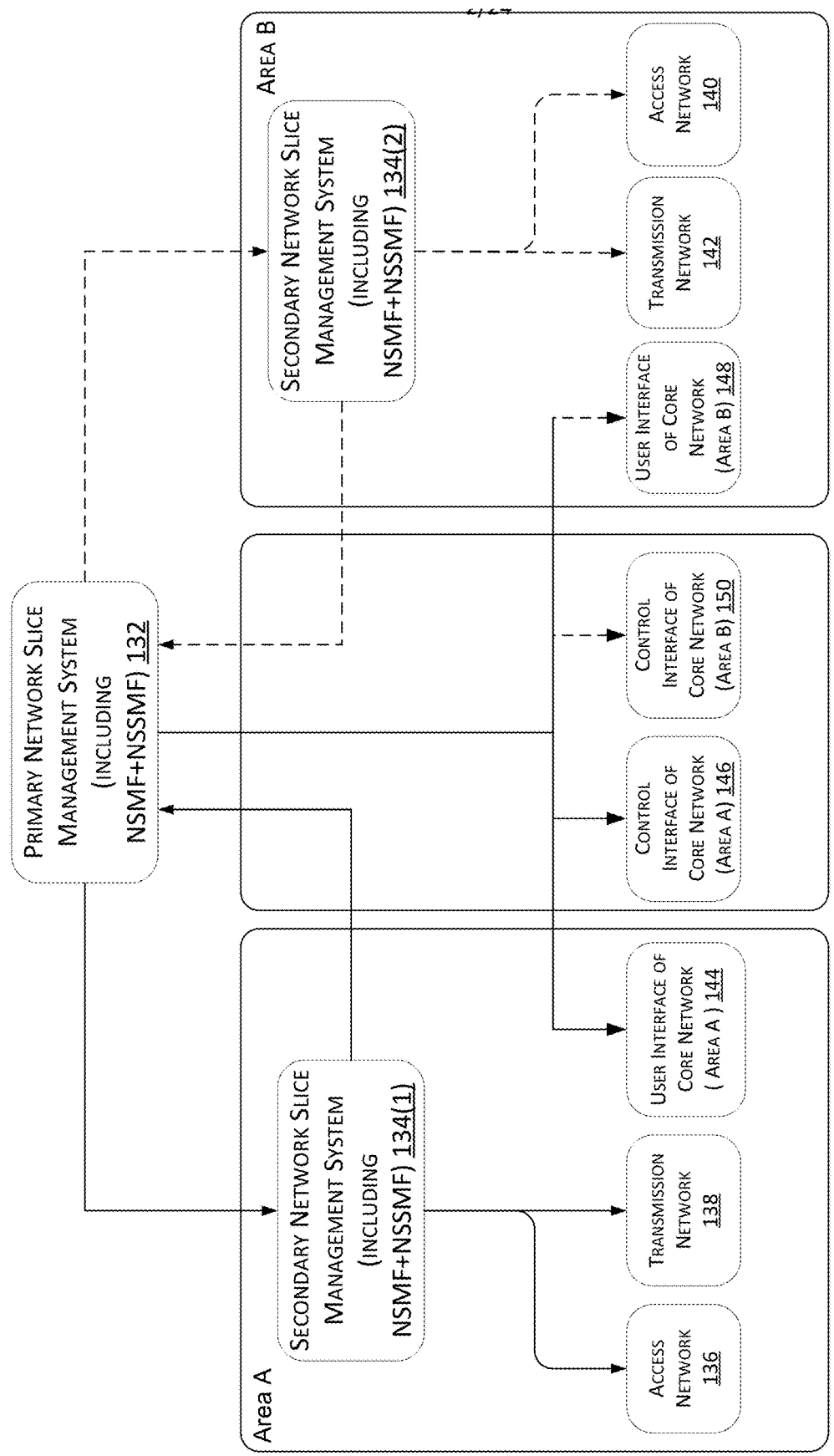
FIG. 1b shows an architecture schematic diagram of a network slice management system using two-level deployment according to an embodiment of the present disclosure.

FIG. 1b shows an architecture schematic diagram of a network slice management system 102 using two-level deployment. In the network slice management architecture shown in FIG. 1b, there is a primary network slice management system (including NSMF and NSSMF) 132 and one or more secondary network slice management system (including NSMF and NSSMF) 134(1) and 134(2). The secondary network slice management system 134(1) deployed in area A is responsible for the access network 136 of area A and a sub-slice (such as NSI and/or NSSI) in the transmission network (such as within a province) 138 of area A, which, for example, may be within a province. For example, an NSMF 120 deployed in area A is responsible for the NSI; an NSSMF 122 deployed in area A is responsible for the NSSI. The secondary network slice management system 134(2) deployed in area B is responsible for sub-slices in the access network 140 and the transmission network 142 of area B, which, for example, may be within another province. For example, an NSMF 120 deployed in area B is responsible for the NSI; an NSSMF 122 deployed in area B is responsible for the NSSI. The primary network slice management system 132 is responsible for sub-slices in the core network (including a user interface and a control interface) of areas A and B, such as a user interface of core network (area A) 144, a control interface of core network (area A) 146, a user interface of core network (area B) 148, and a control interface of core network (area B) 150. For example, the network slice management system 102 may be deployed hierarchically by using administrative regions as granularities. For example, a primary management system may be deployed in each province where one NSMF and multiple NSSMFs are correspondingly deployed in a province. Alternatively, a primary management system may be deployed across multiple provinces where one NSMF may be deployed across the provinces. The NSMF is responsible for scheduling and managing NSIs in these provinces. Multiple NSSMFs are deployed in each province and are responsible for scheduling and managing the NSSI in each province.

In the embodiment, a scenario user refers to the application server 104. In other words, the mobile communication network 106 and the network slice management system 102 cooperate with each other to provide the application server 104 with services related to network slicing, thereby meeting the network performance requirements of the application server 104 in different scenarios. The application server 104 may be a third-party server, for example, an edge server in an edge cloud system, but is not limited thereto. As shown in FIG. 1a, the application server 104 is illustrated as an edge server in an edge cloud system. One or multiple application servers 30 may be provided. In the case of multiple application servers 30, these multiple application servers 30 may be from the same third party or different third parties. Certainly, the application servers 30 may also be from an operator. An application server 30 from a third party and an application server 30 from an operator may have different permissions when using the services related to network slicing provided by the network slice management system 102. Each embodiment of the present disclosure focuses on the case that the application server 104 is from a third-party server, and the case that the application server 104 is from an operator will be described concisely.

In the embodiment, the network slice management system 102 may provide a management capability related to network slicing, referred to as the network slice management capability. In addition to the capability of providing a network slice service for the application server 104 according to a communication service requirement thereof, such management capability may also include managing templates related to network slicing and managing the network slice capability of the mobile communication network 106. The managing the network slice capability of the mobile communication network 106 refers to identifying whether the mobile communication network 106 has the network slice capability as well as managing information such as coverage and topology of the network slice capability when the communication network 10 has the network slice capability. In order to make full use of the network slice management capability of the network slice management system 102, the embodiment can fully expose the network slice management capability of the network slice management system 102 to the application server 104 by virtue of the capability exposure function of the mobile communication network 106. That is, the capabilities of the network slice management system 102 in providing the network slice service to the application server 104, managing the templates related to network slicing, and managing the network slice capability of the mobile communication network 106 are all exposed to the application server 104, thereby fully calling network slice management resources of the network slice management system 102, which in turn enhances the efficiency in using the network slice management resources.

The embodiment of the present disclosure focuses on the process of exposing the "capability of managing the template related to network slicing" and the "capability of managing the network slice capability of the mobile communication network 106" of the network slice management system 102. Based on the exposure of the two capabilities, the application server 104 may interact with the network entities in the network slice management system 102, requesting the network slice management system 102 to provide, in addition to the "network slice service," other services related to network slicing therefor, which are labeled as target services. In the embodiment of the application, the target services mainly refer to a network slice template service and a network slice capability service. Based on the exposure of the "capability in managing the templates related to network slicing" of the network slice management system 102, the application server 104 may request the network slice management system 102 to provide the network slice template service therefor. Based on the exposure of the "capability in managing the network slice capability of the mobile communication network 106" of the network slice management system 102, the application server 104 may request the network slice management system 102 to provide the network slice capability service therefor.

For example, the application server 104 sends a service request message to the network entity in the network slice management system 102. The service request message includes a service parameter, which is configured to request the network slice management system 102 to provide a target service therefor. The target service includes a network slice template service or a network slice capability service, which are different from the network slice service. The network entity in the network slice management system 102 receives the service request message sent by the application server 104, provides the target service for the application server 104 according to the service parameter in the service request message, and returns a response message regarding the service request message to the application server 104. The application server 104 receives the response message returned by the network entity in the network slice management system 102, and the response message carries information of whether the network slice management system 102 is capable of successfully providing the target service for the application server 104.

Figure 2:
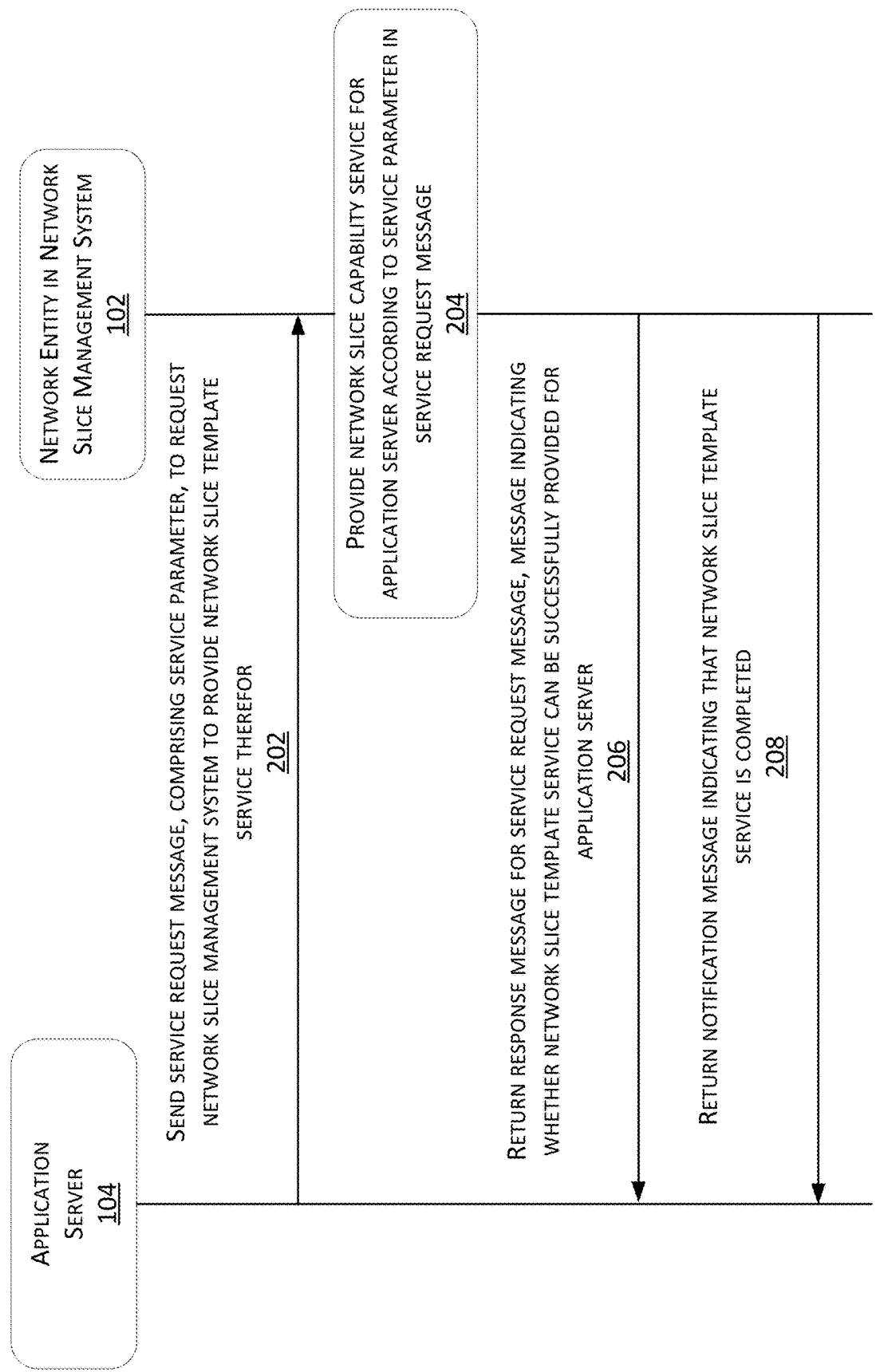
FIG. 2 shows a schematic flow diagram of an application server requesting a network slice template service from a network slice management system according to an embodiment of the present disclosure.

In an example scenario, the application server 104 may interact with the network entity in the network slice management system 102 and request the network slice management system 102 to provide a service related to the template of network slicing, referred to as the network slice template service. In other words, the target service may be implemented as the network slice template service. For easy differentiation and description, the template related to network slicing is referred to as a slice template for short. The slice template includes a Network Slice Template (NST) and/or a Network Slice Subnet Template (NSST). As shown in FIG. 2, the interaction process of the application server 104 requesting, from the network slice management system 102, the network slice template service includes the following steps:

202. The application server 104 sends to the network entity in the network slice management system 102 a service request message, wherein the service request message comprises a service parameter, which is configured to request the network slice management system 102 to provide the network slice template service therefor.

204. After receiving the service request message, the network entity in the network slice management system 102 provides the network slice template service for the application server 104 according to the service parameter in the service request message.

206. The network entity in the network slice management system 102 returns to the application server 104 the response message for the service request message, wherein the response message carries information of whether the network slice management system 102 is capable of successfully providing the network slice template service for the application server 104.

For example, after receiving the service request message, the network slice management system 102 may judge whether the network slice template service can be successfully provided for the application server 104 according to the service parameter. If the network slice template service can be successfully provided for the application server 104, a confirmation message is returned to the application server 104 as the response message for the service request, indicating that the network slice management system 102 is capable of successfully providing the network slice template service for the application server 104. If the network slice template service cannot be successfully provided for the application server 104, a service request error message is returned to the application server 104 as the response message, indicating that the network slice management system 102 is not able to successfully provide the network slice template service for the application server 104. Furthermore, in the case that the service request error message is returned to the application server 104 as the response message, the response message may also carry an error cause or cause code for unavailability of the network slice template service. The error cause may be any one of the following: 1. the application server 104 does not have the permission to customize the slice template; and the permission here may mean that an operator and a manufacturer to which the application server belongs have not signed an SLA about slice template management, etc.; and 2. the core network resources of the operator fail to support the generation of a customized slice template meeting requirements of the application server 104.

Further, for example, in the case that the network slice management system 102 is capable of successfully providing the network slice template service for the application server 104, considering that the network slice management system 102 provides the network slice template service for the application server 104 asynchronously, which means that after the application server requests the network slice management system 102 to provide the slice template, it might take some time to receive a notification message that the network slice management system 102 confirms completing the generation of the slice template, then as shown in FIG. 2, the method further includes the following after step 203.

208. The network entity in the network slice management system 102 returns to the application server 104 a notification message indicating that the network slice template service is completed.

In the embodiment, the network slice management system 102 may provide a default slice template for the application server 104. Regardless of whether the application server 104 comes from a third party or an operator, the application server 104 may request to use a default slice template provided by the network slice management system 102. The default slice template includes a default NST and/or a default NSST. That is, the network slice template service may include a service in which the application server 104 requests to use the default NST and/or default NSST provided by the operator. However, a default slice template provided by the network slice management system 102 is fixed, and resources instantiated according to the default slice template are thus fixed. As such, the requirements of the application server 104 may not be met, especially in the case that the application server 104 is from a third party. For example, the application server 104 requires the deployment of the UPF to sink into a DN domain, and requires the UPF to have a Deep Packet Inspection (DPI) function and the like. A default slice template, however, cannot meet the requirement. In view of this, the network slice management system 102, in addition to providing a default slice template for the application server 104, further allows the application server 104 from a third party to customize the slice template according to the application requirements thereof. Customized slice templates include a customized NST and/or a customized NSST. For example, an operator may maintain two template libraries, namely a default template library 126 and a customized template library in which the default template library 126 is configured to store the default slice template provided by the operator and the customized template library 128 is configured to store a customized slice template triggered and generated by a third-party server (e.g., the application server 104 from a third party). Customized slice templates may be used alone by any service manufacturer S. For example, some dedicated slice templates are mainly used by the service manufacturer S. However, the service manufacturer S may also share some general slice templates with or authorize their use to other service manufacturers. In addition to a template identifier (ID) for identifying a customized slice template, for example, a third-party server identifier or an identifier that can represent the third party may also be managed, which is not limited thereby. For example, an identification field of a customization manufacturer may be added to the ID of a customized slice template to carry the identifier of the customization manufacturer. If the application server 104 is from a service manufacturer requesting to customize a slice template, after the network slice management system 102 generates the customized slice template for the application server 104, an identifier of the application server 104 may further be stored in the identification field of the customization manufacturer in the ID of the customized slice template, thereby establishing an association relationship among the ID of the customized slice template, the identifier of the customization manufacturer, and the identifier of the application server 104. Of course, the ID of the customized slice template may not carry the identifier of the customization manufacturer. Instead, the network slice management system 102 is responsible for associating the ID of the customized slice template with the identifier of the customization manufacturer and the identifier of the application server 104, and maintaining the association relationship among the three.

Furthermore, the network slice management system 102 also allows the application server 104 to modify a slice template customized by itself at any time according to application requirements, and allows the application server 104 to delete a slice template customized by itself according to application requirements. The application server 104 from a third party has the permission to modify or delete a slice template customized by itself. The application server deployed by an operator can modify or delete a system defaulted slice template. In view of this, when receiving a request to delete a slice template from the application server 104 from a third party, the network slice management system 102 may determine whether the slice template to be deleted is a system defaulted slice template or a customized slice template. If the slice template to be deleted is a customized slice template, the ID of the customization manufacturer may be acquired from the ID of the customized slice template to be deleted, or the ID of the customization manufacturer corresponding to the customized slice template to be deleted is acquired from the maintained association relationship between the ID of the customized slice template and the ID of the customization manufacturer. Then, whether the ID of the customization manufacturer matches with the ID of the application server 104 initiating the deletion request is determined, which means that whether the application server 104 has a permission to delete the customized slice template is determined. If the two matches, it indicates that the application server 104 has the permission to delete the customized slice template, then the operation of deleting the customized slice template is performed. If the two do not match, an error is reported, for example, by outputting deletion error information to notify that the application server does not have the permission to delete the customized slice template. In addition, if the slice template to be deleted is a system defaulted slice template, an error may also be reported to notify that the application server 104 acting as a third-party server does not have the permission to delete the system defaulted slice template. For example, a customized template and a default template may also be placed under the same template library.

That is, the requested network slice template service made by the application server 104 from a third party to the network slice management system 102 includes, but is not limited to: requesting the network slice management system 102 to customize and create a slice template therefor, requesting the network slice management system 102 to modify the slice template therefor, and requesting the network slice management system 102 to delete the slice template therefor. It should be noted that for different network slice template services, the service parameters contained in the service requests may be different accordingly. In the case of requesting the network slice management system 102 to generate a customized slice template, the service parameter contained in the service request message may include a first parameter set required for creating the customized slice template. The first parameter set includes at least one of a quality of service (QoS) parameter, a network capacity parameter, a network element configuration parameter, an application-related parameter, a geographic location of a DN, and a deployment mode of a UPF. Further, the QoS parameter may also be referred to as a network KPI parameter, examples of this include, but is not limited to, end-to-end delay, rate, bandwidth, uplink and downlink throughput, network jitter, packet loss rate, etc. Of such, the rate includes an uplink Guaranteed Bit Rate (GBR), a downlink GBR, an uplink Aggregate Maximum Bit Rate (AMBR) and a downlink AMBR, and may additionally include parameters or description information related to application types; the network capacity parameter includes, but is not limited to: the maximum number of users or the maximum number of terminal accesses, the number of activated users, the established number of the maximum Protocol Data Unit (PDU) session, area capacity, user density, etc.; and the application-related parameter includes, but is not limited to: access types, billing requirements, coverage areas, isolation, mobility support, reliability indicators, security, etc. In the case of requesting the network slice management system 102 to modify the slice template, the service parameter contained in the service request message may include: a template identifier (ID) for identifying a slice template to be modified, and a first parameter set required for modifying a template. The first parameter set required for modifying the template is identical as or similar to the first parameter set required for creating the template. Reference may be made to the previous description, and details will not be elaborated herein again. In the case of requesting the network slice management system 102 to delete a customized slice template, the service parameter contained in the service request message may include: a template identifier (ID) for identifying a slice template to be deleted.

In the process of generating a customized slice template for the application server, a customized NST may be generated for the application server and the customized NST may be associated with the NSST. The NSST associated with the customized NST may include at least one NSST customized by a service manufacturer corresponding to the application server, or may include at least one NSST customized by the service manufacturer corresponding to the application server and at least one system defaulted NSST. Additionally, the NSST may all be system defaulted NSSTs.

In the process of modifying a customized slice template for the application server, the modifying may only apply to a customized NST. For example, NST A customized by a service manufacturer P1 corresponding to the application server may be modified to NST B customized by the service manufacturer P1; and the NSST associated with the customized NST A is directly associated with the customized NST B. Alternatively, the modifying may only apply to an NSST customized by the service manufacturer P1. For example, NSST A_1 customized by the service manufacturer P1 and associated with NST A customized by the service manufacturer P1 may be modified to NSST C_1 customized by another service manufacturer P2 and authorized to the service manufacturer P1. In this case, NSST A_1 associated with NST A may be modified to NSST C_1, and the mapping relationship between NST A and NSST A_1 is modified to the mapping relationship between NST A and NSST C_1. Of course, the NST and the NSST customized by the service manufacturer P1 may also be modified at the same time. The application server may indicate whether it is the NST or the NSST or both the NST and the NSST that need to be modified through the template identifier contained in the service parameter. That is, a slice template to be modified may be the NST and/or the NSST. Accordingly, the template identifier contained in the service parameter may be an NST identifier and/or an NSST identifier.

In the process of deleting a customized slice template for the application server, the NST customized by the service manufacturer P1 corresponding to the application server and the NSST associated therewith and customized by the service manufacturer P1 may be deleted. For example, the NST A customized by the service manufacturer P1 may be deleted; and at this time point, the NSST customized by the service manufacturer P1 and associated with the customized NST A needs to be deleted. The customized NST A and the mapping relationship between the NST A and all NSSTs would also need to be deleted. It should be noted that if the customized NST A is also associated with a system defaulted NSST or NSSTs authorized by other service manufacturers, only the mapping relationships between the customized NST A and the NSSTs need to be deleted, but not the NSSTs. Alternatively, the deleting may only apply to the NSST customized by the service manufacturer P1. For example, NSST A_1 customized by the service manufacturer P1 and associated with the NST A customized by the service manufacturer P1 may be deleted. Accordingly, NSST A_1 associated with the NST A may be deleted; and the mapping relationship between the NST A and NSST A_1 may be deleted. The application server may indicate whether it is the NST or the NSST or both the NST and the NSST that need to be deleted through the template identifier contained in the service parameter. That is, a slice template to be deleted may be the NST and/or the NSST. Accordingly, the template identifier contained in the service parameter may be an NST identifier and/or an NSST identifier.

As explained herein, in the case of only modifying or deleting the NSST, the network slice management system 102 can send a query message to the application server to query whether the application server needs to modify or delete a corresponding NST. A further processing is implemented according to the response message returned by the application server regarding the query message. If the response message returned by the application server indicates that a corresponding NST does not need to be modified or deleted, then only the NSST is modified or deleted. If the response message returned by the application server indicates that a corresponding NST needs to be modified or deleted, the NST and NSST are modified or deleted at the same time.

Further, for example, when the application server requests to specifically use a customized template that does not belong to a corresponding service manufacturer of the application server, or relevant parameters in a parameter set sent by the application server have been mentioned by other third-party manufacturers and a customized template ID has been successfully generated, then the network slice management system 102 may request authorization from the manufacturer of the customized slice template. After the manufacturer of the customized slice template confirms the authorization, the ID of the customized slice template is sent to the application server; and the permission is exposed to the application server to enable the application server to specifically use a customized slice template. The ID of a customized slice template may be associated with multiple application service manufacturers to provide slice template services therefor.

Figure 3:
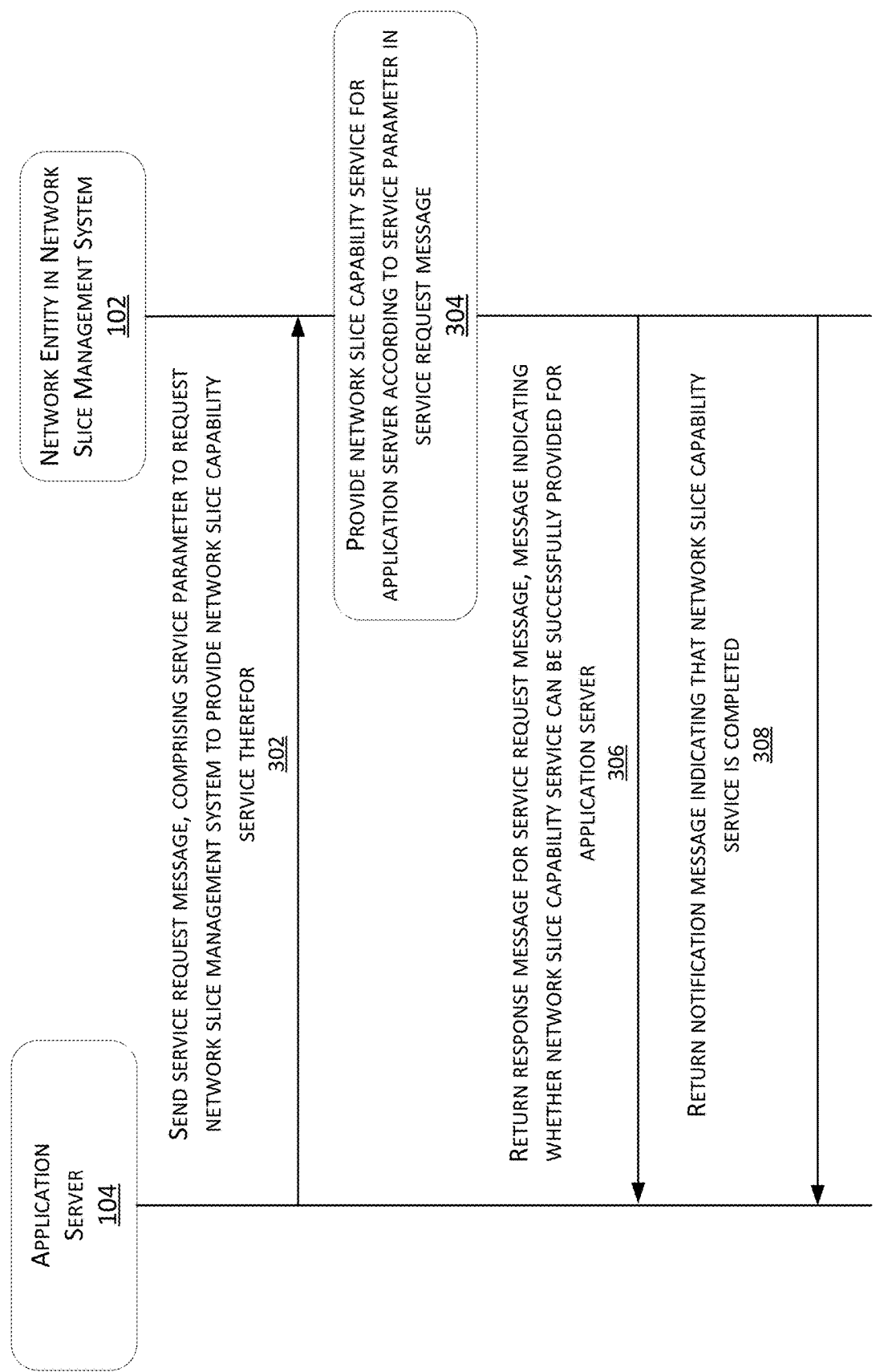
FIG. 3 shows a schematic flow diagram of an application server requesting a network slice capability service from a network slice management system according to an exemplary embodiment of the present disclosure.

In another example scenario, the application server 104 may interact with the network entity in the network slice management system 102 and request the network slice management system 102 to provide a service related to the network slice capability of the mobile communication network 106 therefor. Such a service is referred to as the network slice capability service for short, i.e., a target server may be implemented as the network slice capability service. As shown in FIG. 3, the interaction process of the application server 104 requesting the network slice capability service from the network slice management system 102 includes the following steps.

302. The application server 104 sends to the network entity in the network slice management system 102 a service request message, wherein the service request message comprises a service parameter, which is configured to request the network slice management system 102 to provide the network slice capability service therefor.

304. After receiving the service request message, the network entity in the network slice management system 102 provides the network slice capability service for the application server 104 according to the service parameter in the service request message.

306. The network entity in the network slice management system 102 returns to the application server 104 the response message for the service request message, wherein the response message carries information of whether the network slice management system 102 is capable of successfully providing the network slice capability service for the application server 104.

For example, after receiving the service request message, the network slice management system 102 may judge whether the network slice capability service can be successfully provided for the application server 104 according to the service parameter. If the network slice capability service can be successfully provided for the application server 104, a confirmation message is returned to the application server 104 as the response message for the service request, indicating that the network slice management system 102 is capable of successfully providing the network slice capability service for the application server 104. If the network slice capability service cannot be successfully provided for the application server 104, a service request error message is returned to the application server 104 as the response message, indicating that the network slice management system 102 is not able to successfully provide the network slice capability service for the application server 104. Furthermore, in the case that the service request error message is returned to the application server 104 as the response message, the response message may also carry an error cause or cause code for unavailability of the network slice capability service. The error cause may be any one of the following: 1. the application server 104 does not have the permission to perform operations related to the slice capability; and 2. the network resources of an operator in a relevant area cannot fulfill the network slice function (except for a branch requesting to deploy the network slice capability).

Further, for example, in the case that the network slice management system 102 is capable of successfully providing the network slice capability service for the application server 104, considering that the network slice management system 102 provides the network slice capability service for the application server 104 asynchronously, which means that after the application server 104 requests the network slice management system 102 to provide the slice capability service request, it might take some time to receive a notification message that the network slice management system 102 confirms the network slice capability service, then as shown in FIG. 3, the method further includes the following after step 303.

308. The network entity in the network slice management system 102 returns to the application server 104 a notification message indicating that the network slice capability service is completed.

In the embodiment, the network slice management system 102 may manage the network slice capability of the mobile communication network 106. For example, whether the mobile communication network 106 has the network slice capability may be identified. In the case that the mobile communication network 106 has the network slice capability, information such as coverage, deployment, and topology structures of the network slice capability of the mobile communication network 106 may further be managed. The mobile communication network 106 may not be equipped with the network slice capability, may only be equipped with a static network slice capability, may only be equipped with a dynamic network slice capability, or may be equipped with both the static network slice capability and the dynamic network slice capability. The static network slice capability refers to the network slices that are present and deployed in advance in the mobile communication network 106. The number of these network slices and the corresponding resources and the like are fixed. A terminal may select a corresponding static slice through a preset slice identifier (Single-Network Slice Selection Assistance Information, S-NSSAI). Or a corresponding static slice identifier may be acquired through the NSSF. The dynamic network slice capability refers to the capability of dynamically deploying the network slices in the mobile communication network 106 according to the application requirements. For example, an operator may perform slice management according to relevant network elements (such as CSMF, NSMF, and NSSMF) of the slice management system, which may include slice generation, slice modification, slice resource release, etc.

Whether the mobile communication network 106 is equipped with the dynamic network slice capability can be determined by judging whether the network slice management system 102 is deployed in the mobile communication network 106. If the network slice management system 102 is deployed therein, it is considered that the mobile communication network 106 is equipped with the dynamic network slice capability or is to have the dynamic network slice capability. For example, whether the mobile communication network 106 is equipped with the dynamic network slice capability may further be determined by taking into account of whether core network resources of an operator support the generation of new slices. Furthermore, information such as the coverage, deployment, and topology structures of the network slice capability of the mobile communication network 106 are mainly affected by the deployment architecture of the network slice management system 102. Thus, deployment architecture information of the network slice management system may be acquired. For example, information such as how many levels of management systems are deployed, how many NSMF and NSSMF are deployed in each level of the management system, and where these NSMF and NSSMF are deployed may be acquired. These pieces of information are then used to identify information such as the coverage, deployment, and topology structures of the network slice capability of the communication network 10. In the embodiment, the mobile communication network 106 equipped with the dynamic network slice capability is used as an example for description.

In addition to the above determination method, whether a network entity of the Network Slice Selection Function (NSSF) is deployed in the mobile communication network 106 may further be determined. The NSSF is mainly responsible for selecting network slices for terminals accessing the mobile communication network. If the NSSF is deployed, it indicates that the mobile communication network 106 is equipped with the network slice capability. If the NSSF is not deployed, it indicates that the mobile communication network 106 is not equipped with the network slice capability. Whether the mobile communication network 106 is equipped with the dynamic network slice capability or the static network slice capability may be identified by determining whether the NSSF is deployed in the mobile communication network 106.

By exposing the network slice capability of the mobile communication network 106, the application server 104 may query whether the mobile communication network 106 is equipped with the network slice capability through the network slice management system 102 before deploying the network slice, and may also query information such as the coverage, deployment, and topology structures of the network slice capability of the mobile communication network 106, so as to determine whether the network slice is deployed in the mobile communication network, thereby providing a good preparation for successfully deploying the network slice. In addition, with the passage of time and the development of technologies, the network slice capability of the mobile communication network 106 may change, which should also be taken into account. For example, an operator may deploy the network slice capability in some areas where no network slice capability is available previously. Another example is that an operator may integrate the network slice capabilities in some areas or even stop the network slice capabilities in some areas, etc. Thus, in order to timely understand the changes of the network slice capability of the mobile communication network 106, the application server 104 may also subscribe, from the network slice management system 102, an updating notification service for network slice capability information, which means that when a change occurs in the network slice capability of the mobile communication network 106, the network slice management system 102 provides information for the network slice capability change to the application server 104. The information may be, for example, the network slice capability information after the change or an amount of change of the network slice capability information. For example, it may be at least one of the two cases: a slice management system is added or an NSSF is added to the core network element. In addition, the network slice capability deployed by an operator in the mobile communication network 106 may not meet the network slice requirement of the application server 104. For example, the application server 104 might need to deploy the network slice in area D; the current network slice capability of the mobile communication network 106, however, does not cover area D. In this case, the application server 104 may also request the network slice management system 102 to deploy therefor the network slice capability in area D.

That is, the network slice capability service that the application server 104 may request from the network slice management system 102 includes, but is not limited to: requesting the network slice management system 102 to query the network slice capability information of the mobile communication network 106 therefor, requesting the network slice management system 102 to deploy the network slice capability in the mobile communication network 106 therefor, and subscribing to, from the network slice management system 102, the updating notification service for the network slice capability information. In the case that the network slice capability service is requested, the service parameter in the service request message includes a second parameter set, which is used for the network slice management system 102 in providing the network slice capability service. It should be noted that for different network slice capability services, second parameter sets contained in the service request messages are different. In the case that the network slice management system 102 is requested to query the network slice capability information of the mobile communication network 106, the second parameter set contained in the service request message may include designated area information, indicating that the network slice capability information of the mobile communication network 106 in the designated area needs to be queried. For example, the second parameter set may also be null, indicating that by default global network slice capability information of the mobile communication network 106 is queried. For example, the global network slice capability information may be network slice capability information of 5G networks deployed by an operator in various provinces and cities across the country. In the case that the network slice management system 102 is requested to deploy the network slice capability in the mobile communication network 106, the second parameter set contained in the service request message may include the designated area information, indicating that the network slice management system 102 is required to deploy the network slice capability in the designated area. In the case that the updating notification service for the network slice capability information is subscribed from the network slice management system 102, the second parameter set contained in the service request message may include the designated area information, indicating that the information about the change in the network slice capability of the mobile communication network 106 (such as the 5G network) in the designated area needs to be learned. For example, the second parameter set may also be null, indicating that by default the information about the change in the global network slice capability of the mobile communication network 106 needs to be learned. For example, the global network slice capability may refer to the comprehensive information about network slice capabilities of operators in various provinces and cities across the country.

In some embodiments of the present disclosure, regardless of the scenarios, the network entity in the network slice management system 102 may directly expose the capabilities thereof, then the network entity in the network slice management system 102, which interfaces with the application server 104, may be CSMF 118, NSMF 120, or NSSMF 122. That is, the application server 104 may request the network slice template service or the network slice capability service from the network slice management system 102 through CSMF 118, NSMF 120, or NSSMF 122.

In addition to the above, in other embodiments of the present disclosure, as shown in FIG. 1 a, the network system 100 may further include: a function entity responsible for exposing the slice management capability of the network slice management system 102, which is referred to as a Slice management exposure function entity 130 for short, and the name of the function entity is not limited by the embodiment. In an example embodiment, each network entity in the network slice management system 102 exposes the capabilities thereof to other objects, such as the application server 104, through the slice management exposure function entity 130. On such basis, the application server 104 may communicate with CSMF 118, NSMF 120, or NSSMF 122 in the network slice management system 102 through the slice management exposure function entity 130, so as to request the network slice template service or the network slice capability service from the network slice management system 102. For example, when requesting the network slice template service or the network slice capability service from the network slice management system 102, the application server 104 may send the service request message to the slice management exposure function entity 130, and the slice management exposure function entity 130 sends the service request message to the network entity in the network slice management system 102, such as CSMF 118, NSMF 120, or NSSMF 122. Furthermore, in the embodiment shown in FIG. 2 or FIG. 3, details of step 201 or 301 are: the application server 104 sends a service request message to the network entity in the network slice management system 102 through the slice management exposure function entity 130; details of step 203 or 303 are: the network entity in the network slice management system 102 returns the response message to the application server 104 through the slice management exposure function entity 130; and details of step 204 or 304 are: the network entity in the network slice management system 102 sends the notification message to the application server 104 through the slice management exposure function entity 130. It should be noted that the application server 104 may directly send the service request message to the slice management exposure function entity 130, and the slice management exposure function entity 130 forwards the service request message to the network entity in the network slice management system 102. Alternatively, the application server 104 and the slice management exposure function entity 130 may also agree upon which message transmission format to use; and the service request message or the response message between the application server 104 and the network entity in the network slice management system 102 is encapsulated and transmitted per the message transmission format.

Depending on network entities in the network slice management system 102 that interface with the application server 104, processes in which the application server 104 requests various network slice template services from the network slice management system 102 and requests various network slice capability services from the network slice management system 102 are also different. In some embodiments below, the application server 104 directly interfacing with CSMF 118, NSMF 120, or NSSMF 122 is used as an example, or the application server 104 interfacing with CSMF 118, NSMF 120, or NSSMF 122 through the slice management exposure function entity 130 is used as an example. The processes of the application server 104 requesting the network slice template service or the network slice capability service from the network slice management system 102 are respectively described using detailed interactive flow charts.

Figure 4A:
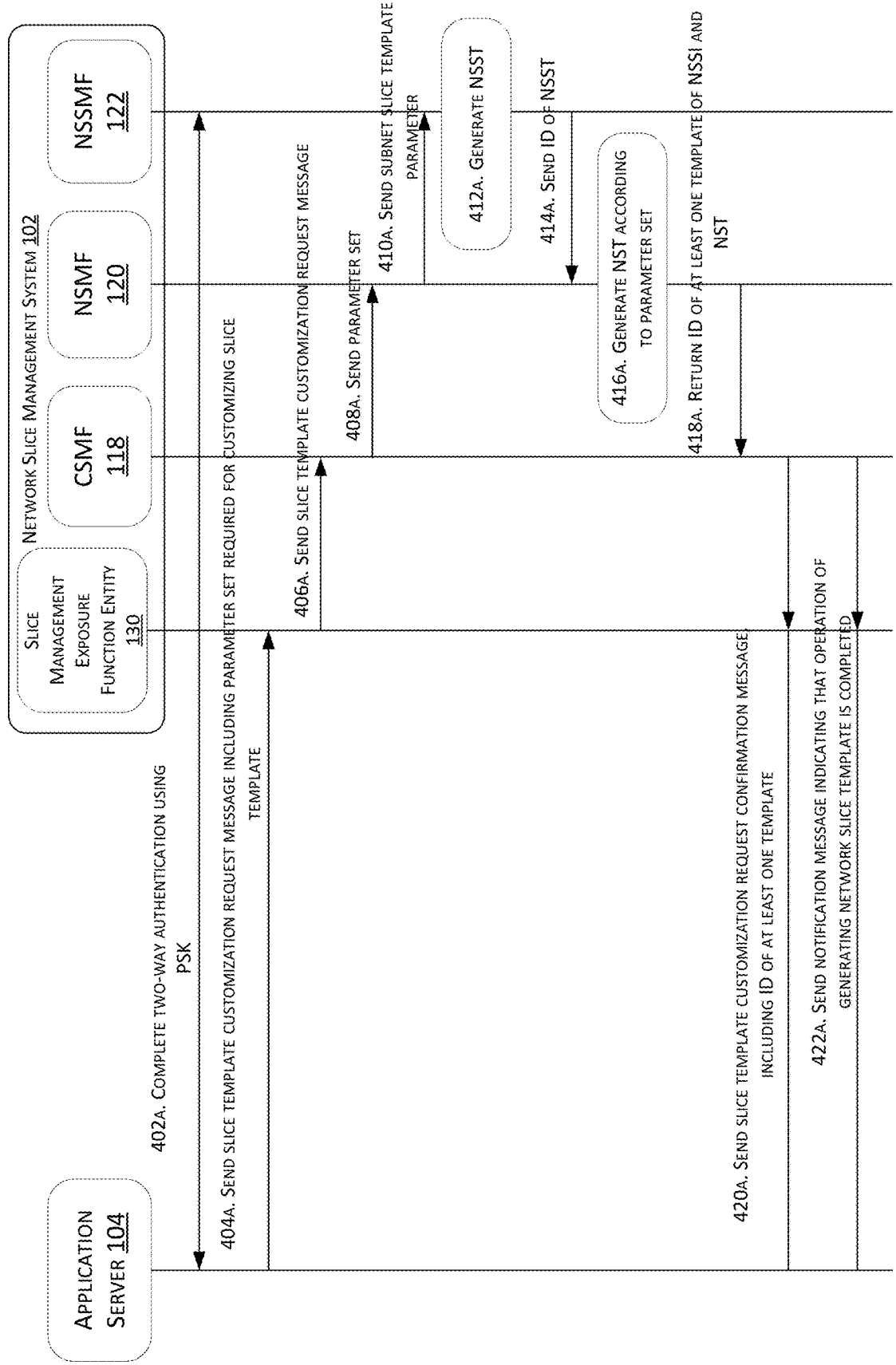
Figure 4B:
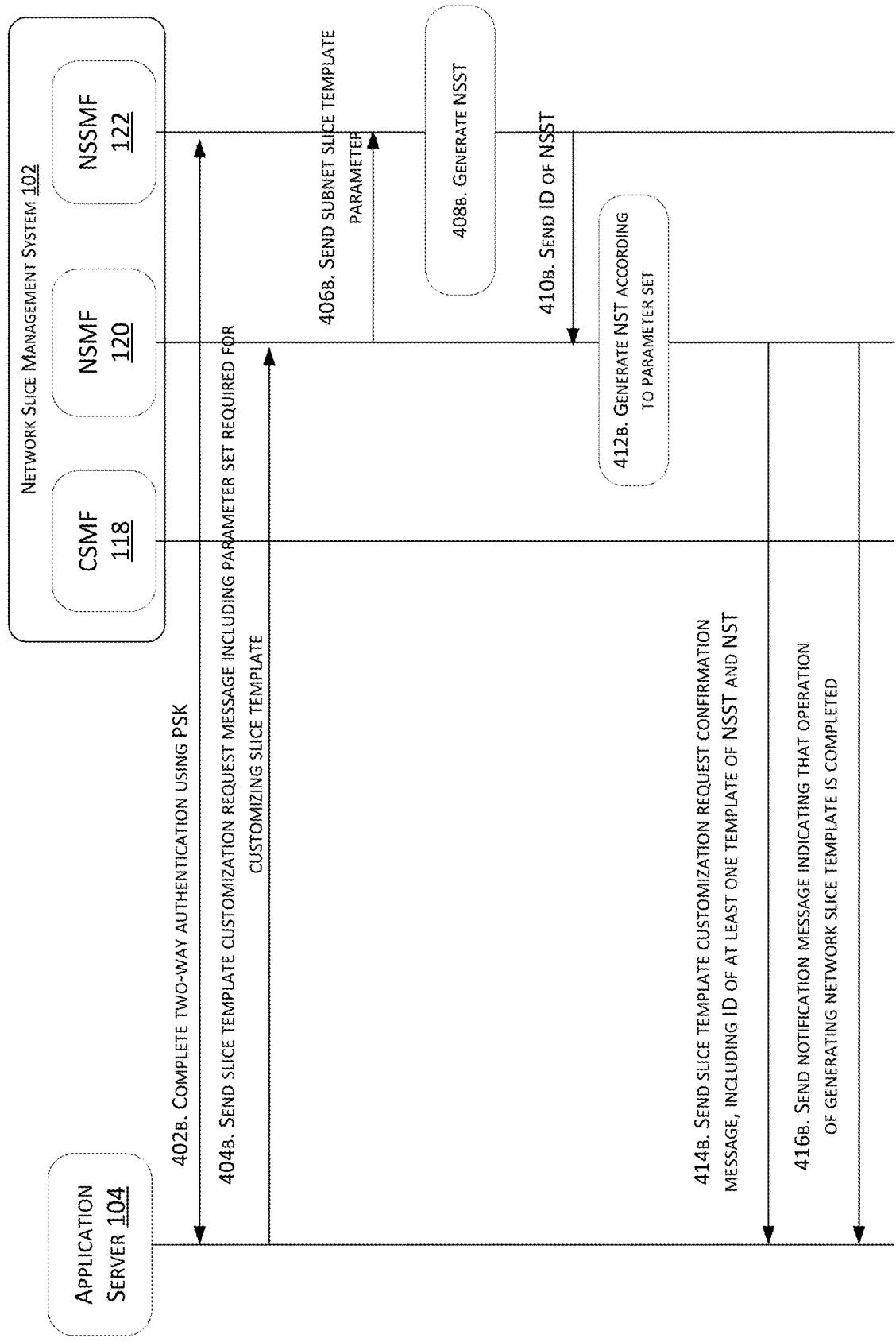

FIGS. 4*a*-4*c* show the process of requesting the service of customizing the slice template:

In an example embodiment, the process of the application server 104 interfacing with the CSMF 118 through the slice management exposure function entity 130 and requesting the service of customizing the slice template from the network slice management system 102 is shown in FIG. 4*a*, including the following steps.

402*a*. Two-way authentication between the application server and the network slice management system is completed using PSK.

404*a*. The application server sends to the slice management exposure function entity 130 a slice template customization request message to request the slice management exposure function entity 130 to send the request message to the CSMF 118 in the network slice management system.

406*a*. The slice management exposure function entity 130 sends the slice template customization request message from the application server to the CSMF 118 in the network slice management system, wherein the request message includes a parameter set required for customizing the slice template.

It should be noted that the application server may also directly interface with the CSMF and may directly send the slice template customization request message to the CSMF in the network slice management system.

For example, the parameter set includes at least one of the network KPI parameter, the application-related parameter, the network capacity parameter, the network element configuration parameter, the geographic location of the DN, and the deployment mode of the UPF. The deployment mode of the UPF may include sinking to the DN or being deployed in an operator domain.

408*a*. After receiving the slice template customization request message, the CSMF 118 sends relevant parameters in the parameter set to a corresponding NSMF 120.

For example, the application server may need to deploy network slices in the designated area, and in such case, a customized slice template may be generated in advance in that designated area. In this application scenario, the slice template customization request message sent by the application server may further carry the designated area information. For example, the area information may be used as a parameter in the parameter set. Accordingly, the CSMF 118 may select an NSMF 120 covering a designated area corresponding to the area information according to the designated area information in the slice template customization request message, and send the area information and the relevant parameters in the parameter set to the selected NSMF 120.

410*a*. The NSMF 120 decomposes the relevant parameters in the parameter set into subnet slice template parameters required for generating the NSST, and sends the subnet slice template parameters to the selected NSSMF 122 for the NSSMF 122 to generate the NSST accordingly.

For example, the NSMF 120 may send demand parameters related to a radio access (e.g., a delay requirement of a radio) to an NSSMF 122 that manages radio sub-slices. The NSMF 120 may also send demand parameters related to a core network (e.g., a 5G QoS indicator translated using a delay demand and an Allocation and Retention Priority (ARP)) to an NSSMF 122 that manages core network sub-slices.

For example, in the case that the designated area information sent by the CSMF 118 is received, the NSMF 120 may select the NSSMF 122 according to the area information, for example, selecting the NSSMF 122 deployed in a designated area corresponding to the area information. Examples of the NSSMF 122 might be the NSSMF 122 that manages the radio sub-slices and/or the NSSMF 122 that manages the core network sub-slices.

For example, the NSMF 120 determines subnet slice template parameters according to the relevant parameters in the parameter set and a decomposition strategy of these relevant parameters. The decomposition strategy is configured to decompose relevant parameters corresponding to NST (i.e., the relevant parameters in the parameter set) into subnet slice template parameters corresponding to at least one NSST. The second case may be that the NSMF 120 decomposes the relevant parameters corresponding to NST (i.e., the relevant parameters in the parameter set) into subnet slice template parameters corresponding to at least one NSST according to the decomposition strategy carried in the NST. The decomposed subnet slice template parameters include at least one of a core network slice template parameter, a transmission network slice template parameter, and an access network slice template parameter. Each subnet slice template parameter may be sent to an NSSMF 122 in a corresponding subnet.

412*a*. The NSSMF 122 generates the NSST required by the application server 104 according to the received subnet slice template parameter.

414*a*. The NSSMF 122 returns the ID of the NSST to the NSMF 120 after generating the NSST.

416*a*. The NSMF 120 generates the NST associated with the NSST according to the relevant parameters in the parameter set, and associates the ID of the NST with the ID of the NSST returned by the NSSMF 122 to form a mapping relationship between the NST and the NSST.

Further, for example, the slice template customization request message includes a customization identifier, which is used to indicate that customizing a template is requested. The CSMF 118 may further send the customization identifier to the NSMF 120. On such basis, the NSMF 120 may generate a customized NST for the application server 104 according to the customization identifier in the request message, and instruct the NSSMF 122 to generate a corresponding NSST for the application server. Alternatively, a set of third-party server identifiers with the permission to customize the slice template may be maintained in advance. On such basis, the NSMF 120 may judge whether an identifier of the application server 104 belongs to the set of the third-party server identifiers. In the case that the identifier of the application server 104 belongs to the set of the third-party server identifiers, the NSMF 120 may generate the customized NST for the application server 104, and instruct the NSSMF 122 to generate the corresponding NSST for the application server. Identifiers of the third-party server may be at least one of DNN, an IP address, and FQDN.

It should be noted that the NST may be associated with multiple customized NSSTs, or may be associated with at least one default NSST and at least one customized NSST. In other words, the NSSTs associated with the NST can all be customized NSSTs, or some can be customized NSSTs and some can be default NSSTs.

A further note is that in the embodiment, the sequence in which the application server generates the NSST and the NST is not limited. As shown in FIG. 4*a*, the NSST is generated by the NSSF first and then the NST associated with the NSST is generated by the NSMF 120, which is used as an example for illustration. The sequence, however, is not limited thereby. In addition, the NSMF 120 may first generate an NST or quote an existing NST, and then instruct the NSSMF 122 to generate the NSST associated with the NST. Alternatively, the NSMF 120 and the NSSMF 122 may also perform the operation of generating templates in parallel. The NSMF 120 finally establishes the mapping relationship between the NST and the NSST.

418*a*. The NSMF 120 maintains the mapping relationship between the NSST and the NST, and sends the ID of at least one template in the NSST and the NST to the CSMF 118 for the CSMF 118 to feed back the ID of the at least one template to the application server through the slice management exposure function entity 130.

420*a*. After receiving the ID of the at least one template returned by the NSMF 120, the CSMF 118 returns a slice template customization request confirmation message to the application server through the slice management exposure function entity 130, wherein the confirmation message contains the ID of at least one template.

422*a*. After the operation of generating the slice template is completed, the CSMF 118 sends to the application server a notification message indicating that the operation of generating the slice template is completed through the slice management exposure function entity 130.

For example, if the operation of generating the slice template by the NSMF 120 or the NSSMF 122 fails, the CSMF 118 may send to the application server a slice template customization request error message; and the error message includes a cause or cause code for the slice template generation error.

In an example embodiment, the process of the application server 104 directly interfacing with the NSMF 120 and requesting the service of customizing a slice template from the network slice management system 102 is shown in FIG. 4*b*, including the following steps.

402*b*. Two-way authentication between the application server and the network slice management system is completed using PSK.

404*b*. The application server sends to the NSMF 120 in the network slice management system a slice template customization request message, wherein the request message includes a parameter set required for customizing the slice template.

For example, the application server may also send to the slice management exposure function entity 130 a slice template customization request message, and the slice management exposure function entity 130 sends the slice template customization request message to the NSMF 120 in the network slice management system.

406*b*. The NSMF 120 decomposes the relevant parameters in the parameter set into subnet slice template parameters required for generating the NSST, and sends the subnet slice template parameters to the selected NSSMF 122 for the NSSMF 122 to generate the NSST accordingly.

For example, the slice template customization request message sent by the application server may further include the designated area information. For example, the area information may be used as a parameter in the parameter set. On such basis, the NSMF 120 may select the NSSMF 122 according to the area information, for example, selecting the NSSMF 122 deployed in the designated area corresponding to the area information.

Reference for the detailed description of decomposing the relevant parameters in the parameter set into subnet slice template parameters may be made to the embodiment shown in FIG. 4*a*, which is not elaborated herein again.

408*b*. The NSSMF 122 generates the NSST required by the application server according to the received subnet slice template parameter.

410*b*. The NSSMF 122 returns the ID of the NSST to the NSMF 120 after generating the NSST.

412b. The NSMF 120 generates the NST associated with the NSST according to the relevant parameters in the parameter set, and associates the ID of the NST with the ID of the NSST returned by the NSSMF 122 to form a mapping relationship between the NST and the NSST.

Further, for example, the slice template customization request message includes a customization identifier, which is used to indicate that customizing a template is requested. On such basis, the NSMF 120 may generate a customized NST for the application server 104 according to the customization identifier in the request message, and instruct the NSSMF 122 to generate a corresponding NSST for the application server. Alternatively, the NSMF 120 may also maintain a set of third-party server identifiers with the permission to customize the slice template in advance. On such basis, after receiving the slice template customization request message, the NSMF 120 may judge whether an identifier of the application server 104 belongs to the set of the third-party server identifiers. In the case that the identifier of the application server 104 belongs to the set of the third-party server identifiers, the NSMF 120 may generate the customized NST for the application server 104, and instruct the NSSMF 122 to generate the corresponding NSST for the application server.

It should be noted that the NST may be associated with multiple customized NSSTs, or may be associated with at least one default NSST and at least one customized NSST. In other words, the NSSTs associated with the NST can all be customized NSSTs, or some can be customized NSSTs and some can be default NSSTs.

A further note is that in the embodiment, the sequence in which the application server generates the NSST and the NST is not limited. As shown in FIG. 4b, the NSST is generated by the NSSF first and then the NST associated with the NSST is generated by the NSMF 120, which is used as an example for illustration. The sequence, however, is not limited thereby. In addition, the NSMF 120 may first generate an NST or quote an existing NST, and then instruct the NSSMF 122 to generate the NSST associated with the NST. Alternatively, the NSMF 120 and the NSSMF 122 may also perform the operation of generating templates in parallel. The NSMF 120 finally establishes the mapping relationship between the NST and the NSST.

414b. The NSMF 120 maintains the mapping relationship between the NSST and the NST, and returns the slice template customization request confirmation message to the application server, wherein the confirmation message contains the ID of at least one template of the NSST and the NST.

416b. After the operation of generating the slice template is completed, the NSMF 120 sends to the application server a notification message indicating that the operation of generating the slice template is completed.

For example, if the operation of generating the slice template by the NSMF 120 or the NSSMF 122 fails, the NSMF 120 may send to the application server a slice template customization request error message; and the error message includes a cause or cause code for the slice template generation error.

In an example embodiment, the process of the application server 104 directly interfacing with the NSSMF 122 and requesting the service of customizing a slice template from the network slice management system 102 is shown in FIG. 4c, including the following steps.

402c. Two-way authentication between the application server and the network slice management system is completed using PSK.

404c. The application server sends to the NSSMF 122 in the network slice management system a slice template customization request message, wherein the request message includes a parameter set required for customizing the slice template.

For example, the application server may also send to the slice management exposure function entity 130 a slice template customization request message, and the slice management exposure function entity 130 sends the slice template customization request message to the NSSMF 122 in the network slice management system.

406c. After receiving the slice template customization request message, the NSSMF 122 generates the NSST required by the application server according to relevant parameters in the parameter set.

It should be noted that the NSST generated by the NSSMF 122 can all be customized NSSTs, or some can be customized NSSTs and some can be default NSSTs.

Further, for example, the slice template customization request message includes a customization identifier, which is used to indicate that customizing a template is requested. On such basis, the NSSMF 122 may generate a customized NSST for the application server 104 according to the customization identifier in the request message. Alternatively, the NSSMF 122 may also maintain a set of third-party server identifiers with the permission to customize the slice template in advance. On such basis, after receiving the slice template customization request message, the NSMF 120 may judge whether an identifier of the application server 104 belongs to the set of the third-party server identifiers. In the case that the identifier of the application server 104 belongs to the set of the third-party server identifiers, the NSMF 120 may generate the customized NSST for the application server 104.

In an example mode 1, as shown in step 408c, the NSSMF 122 may directly return to the application server a slice template customization request confirmation message after generating the NSST, the confirmation message containing the ID of the NSST. Furthermore, as shown in step 45c1, after determining that the operation of generating the slice template is completed, the NSSMF 122 sends to the application server a notification message indicating that the operation of generating the slice template is completed. At this point, the service of customizing the slice template is completed. In this example mode, the service manufacturer is allowed to only customize the required NSST.

In another example mode 2, as shown in step 412c, the NSSMF 122 reports an identifier of the generated NSST to the corresponding NSMF 120 for the NSMF 120 to generate the NST corresponding to the NSST; and the process proceeds to step 45c2.

414c. The NSMF 120 generates the NST associated with the NSST according to the received identifier of the NSST, and associates the ID of the NST with the ID of the NSST returned by the NSSMF 122 to form a mapping relationship between the NST and the NSST.

416c. After generating the NST, the NSMF 120 returns the ID of the NST to the NSSMF 122; and the process proceeds to step 47c.

418c. The NSSMF 122 returns the slice template customization request confirmation message to the application server, wherein the confirmation message contains the ID of at least one template of the NSST and the NST; and the process proceeds to step 48c.

48c. After determining that the operation of generating the slice template is complete, the NSSMF 122 sends to the application server a notification message indicating that the operation of generating the slice template is completed. At this point, the service of customizing the slice template is completed.

A further note is that in the embodiment, the sequence in which the application server generates the NSST and the NST is not limited. As shown in FIG. 4c, the NSST is generated by the NSSF first and then the NST associated with the NSST is generated by the NSMF 120, which is used as an example for illustration. The sequence, however, is not limited thereby. In addition, the NSMF 120 may first generate an NST or quote an existing NST, and then instruct the NSSMF 122 to generate the NSST associated with the NST. Alternatively, the NSMF 120 and the NSSMF 122 may also perform the operation of generating templates in parallel. The NSMF 120 finally establishes the mapping relationship between the NST and the NSST.

For example, regardless of the scenarios described above, if the operation of generating the slice template by the NSMF 120 or the NSSMF 122 fails, the NSSMF 122 may send to the application server a slice template customization request error message; and the error message includes a cause or cause code for the slice template generation error.

Figure 4E:
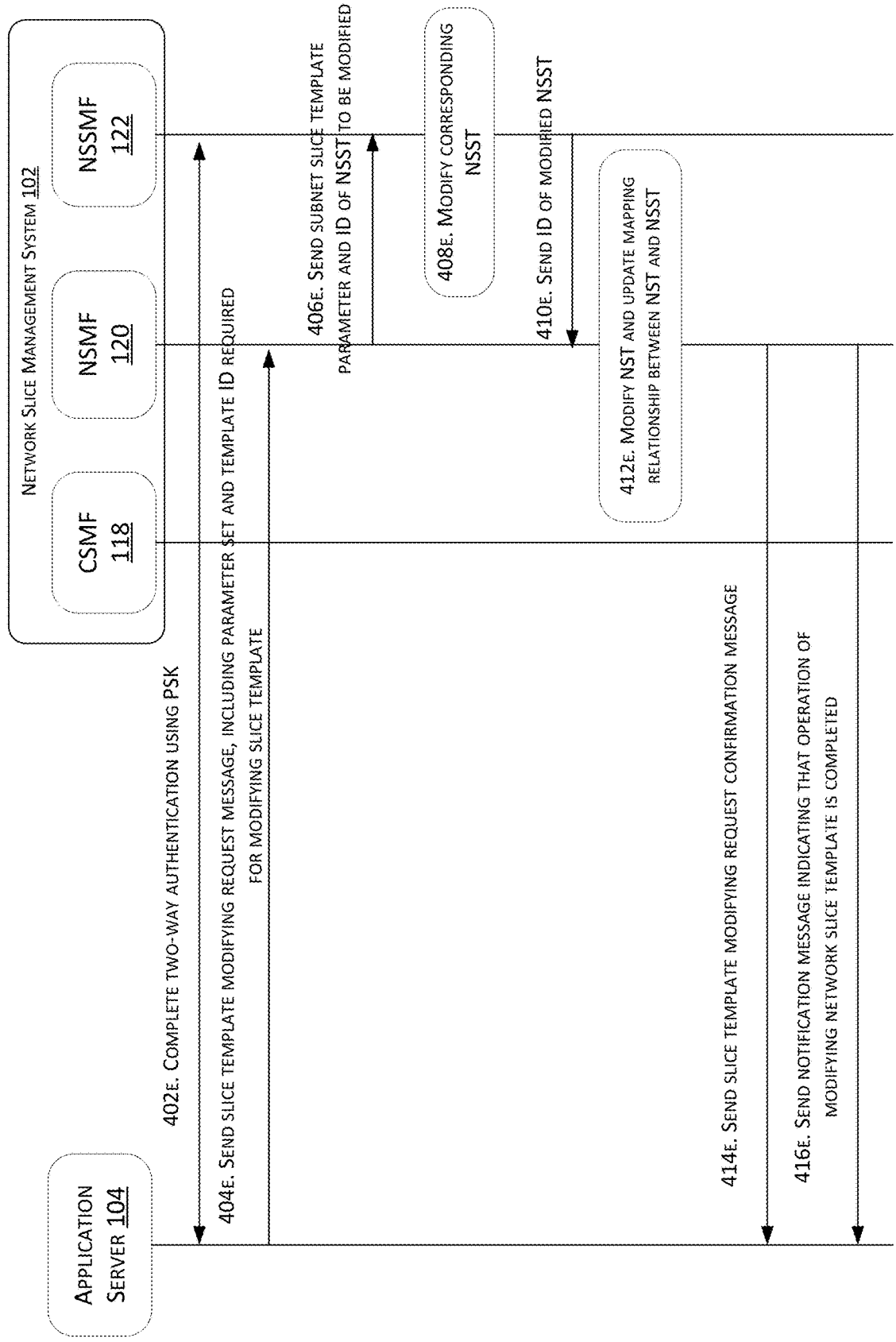
Figure 4F:
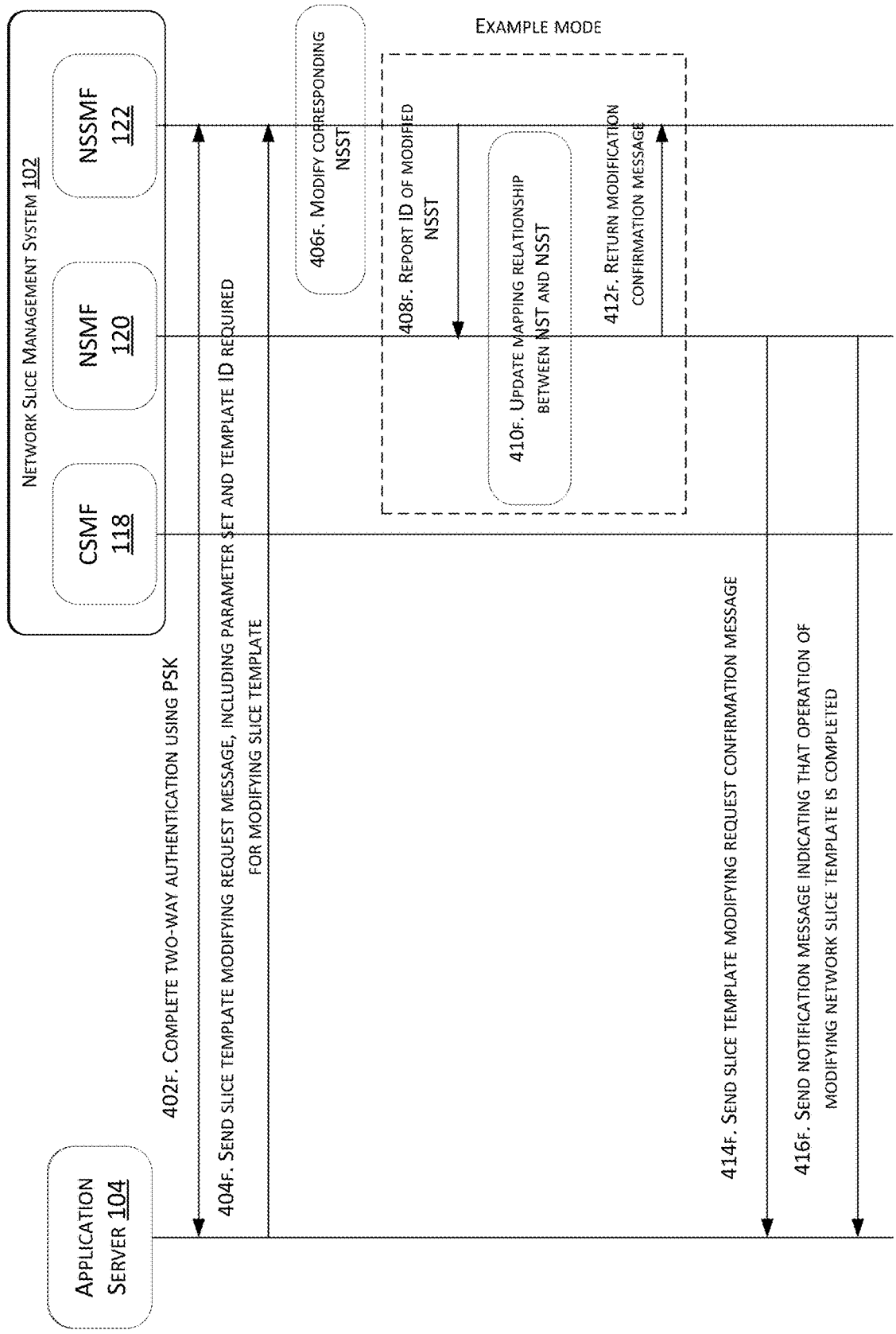

FIGS. 4d-4f show the process of requesting the service of modifying the slice template:

In an example embodiment, the process of the application server 104 interfacing with the CSMF 118 through the slice management exposure function entity 130 and requesting the service of modifying the slice template from the network slice management system 102 is shown in FIG. 4d, including the following steps.

402d. Two-way authentication between the application server and the network slice management system is completed using PSK.

404d. The application server sends to the slice management exposure function entity 130 a slice template modifying request message to request the slice management exposure function entity 130 to send the request message to the CSMF 118 in the network slice management system.

406d. The slice management exposure function entity 130 sends the slice template modifying request message from the application server to the CSMF 118 in the network slice management system, wherein the request message includes a parameter set required for modifying the slice template.

It should be noted that the application server may also directly interface with the CSMF 118 and may directly send the slice template modifying request message to the CSMF 118 in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

408d. After receiving the slice template modifying request message, the CSMF 118 sends the relevant parameters in the parameter set and the template ID indicating the slice template to be modified to the NSMF 120.

For example, the application server may need to modify the slice template in the designated area. In this case, the slice template modifying request message may also include the designated area information. For example, the designated area information may be used as a parameter in the parameter set. Accordingly, the CSMF 118 may select an NSMF 120 covering the designated area corresponding to the area information according to the designated area information carried in the slice template modifying request message, and send the area information and the relevant parameters in the parameter set to the selected NSMF 120.

410d. When determining that the NST and the NSST associated therewith need to be modified according to the template ID indicating the slice template to be modified, the NSMF 120 decomposes the relevant parameters in the parameter set into the subnet slice template parameters required for modifying the NSST, and sends the subnet slice template parameters and the ID of the NSST to be modified to the selected NSSMF 122, so as to instruct the NSSMF 122 to modify the NSST.

For example, in the case that the designated area information sent by the CSMF 118 is received, the NSMF 120 may select the NSSMF 122 according to the area information, for example, selecting the NSSMF 122 deployed in a designated area corresponding to the area information.

In the embodiment, the NST ID being the template ID indicating the slice template to be modified, and learning that the NST and the NSST associated therewith need to be modified through the NST ID are used as an example. In the case that it is determined that the NST and the NSST associated therewith need to be modified, the NSMF 120, on the one hand, queries the maintained mapping relationship between the NST and the NSST to obtain the ID of the NSST to be modified, and on the other hand, decomposes the relevant parameters in the parameter set into subnet slice template parameters required for modifying the NSST; and then the subnet slice template parameters are sent to the NSSMF 122 together with the ID of the NSST to be deleted, so as to indicate to the NSSMF 122 that a corresponding NSST is to be modified. For example, the NSSMF 122 may delete an original NSST and regenerate a new NSST according to a new subnet slice template parameter, or may change the original NSST according to the new subnet slice template parameter.

Reference for the detailed description of decomposing the relevant parameters in the parameter set into subnet slice template parameters may be made to the embodiment shown in FIG. 4a, which is not elaborated herein again.

412d. The NSSMF 122 modifies the corresponding NSST according to the received subnet slice template parameter and the ID of the NSST to be modified.

414d. After modifying the NSST, the NSSMF 122 returns the ID of the modified NSST to the NSMF 120.

416d. The NSMF 120 modifies the NST corresponding to the NST ID according to the received ID of the modified NSST, then updates the mapping relationship between the NST and the NSST, and returns a modification confirmation message to the CSMF 118, as shown in step 418d.

Furthermore, in the case that the application server is a third-party server, before the NSST is modified, whether the NST or NSST to be modified is a customized NST or a customized NSST may further be determined according to the template ID indicating the slice template to be modified.

If the NST or the NSST to be modified is a customized NST or a customized NSST, an identifier of the corresponding customization manufacturer may be acquired from the template ID indicating the slice template to be modified; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two matches, the operation of modifying the customized NST or the customized NSST associated therewith and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 104 does not have the permission to modify the system defaulted NST or the system defaulted NSST. The identifier of the application server and the identifier of the customization manufacturer may be in one-to-one correspondence by means of the mapping relationship. For example, identifiers of the third-party application server may be at least one of DNN, an IP address, and FQDN. The identifier of a customization manufacturer may be represented by several bits. For example, if the identifier of an application manufacturer A is 01011, and the identifier of an application server thereof is marked as IP address 1, then the 01011 and the IP address 1 form a mapping relationship. In this way, when the IP address of the application server is 1 and the identifier of the customization manufacturer is 01011, the two matches; otherwise, the two do not match.

The mapping relationship between the NST and the NSST is updated. For example, the updating may be changing from a customized NST corresponding to a default NSST1 and a customized NSST1 to the customized NST corresponding to a customized NSST1 and a customized NSST2, or the updating may be changing the customized NSTA corresponding to a default NSST1 and a customized NSST1 to a customized NSI template B corresponding to a default NSST1, a customized NSST1, and a customized NSST2. These are examples of updating the mapping relationship between the NST and the NSST.

It should be noted that if the slice template customized by the service manufacturer corresponding to the application server only contains the NSST, the NSMF 120 may directly return the modification confirmation message to the CSMF 118 after receiving the ID of the modified NSST without performing the operation of updating the mapping relationship between the NST and the NSST.

420d. After receiving the modification confirmation message returned by the NSMF 120, the CSMF 118 returns the slice template modifying request confirmation message to the application server through the slice management exposure function entity 130.

422d. After determining that the operation of modifying the slice template is completed, the CSMF 118 sends to the application server a notification message indicating that the operation of modifying the slice template is completed through the slice management exposure function entity 130.

For example, if the operation of modifying the slice template fails, the CSMF 118 may send to the application server a slice template modifying request error message; and the error message includes a cause or cause code for the slice template modification error.

In the embodiment shown in FIG. 4d, the ID of the NST being the template ID indicating the slice template to be modified, and the NST and the NSST associated therewith needing to be modified are used as an example to illustrate the process of modifying the slice template. In the process of modifying the slice template, modifying the NST or the NSST first is not limited. FIG. 4d shows an illustration of using the NSST being modified first by the NSSMF 122, and the NSMF 120 modifying the NST and updating the mapping relationship between the NST and the NSST later as an example. In addition, the NSMF 120 may also modify the NST first. After the NSSMF 122 is instructed to modify the NSST and the NSST is modified, the NSMF 120 updates the mapping relationship between the NST and the NSST. Alternatively, the NSMF 120 and the NSSMF 122 may also perform the modifying operation in parallel. The NSMF 120 finally updates the mapping relationship between the NST and the NSST.

In an example embodiment, when the template ID of the slice template to be modified is the NST ID and only the NST needs to be modified, then in the embodiment shown in FIG. 4d, after receiving the relevant parameters in the parameter set and the NST ID, the NSMF 120 may modify the NST corresponding to the NST ID according to the relevant parameters in the parameter set, and update the mapping relationship between the NST and the NSST after the NST is modified. For example, if the original NST A is modified to a new NST B, the ID of the NST A in the mapping relationship between the NST and the NSST needs to be modified to the ID of the NST B. Furthermore, the ID of the new NST B may also be sent to the NSSMF 122, such that the NSSMF 122 may learn that the NST associated with the NSST is modified and learn about the ID of the new NST B after the modification. After updating the mapping relationship between the NST and the NSST, the NSMF 120 may return a modification confirmation message to the CSMF 118.

In another example embodiment, when the template ID of the slice template to be modified is the NSST ID, it means that the NSST needs to be modified. Then in the embodiment shown in FIG. 4d, after receiving the relevant parameters in the parameter set and the NST ID, the NSMF 120 decomposes the relevant parameters in the parameter set into subnet slice template parameters required for modifying the NSST, and sends the subnet slice template parameters and the NSST ID to the selected NSSMF 122 to enable the NSSMF 122 to modify the NSST. The NSSMF 122 modifies the corresponding NSST according to the subnet slice template parameters and the NSST ID. For example, NSST A_1 is modified to NSST A_2; the ID of the modified NSST A_2 is returned to the NSMF 120; the NSMF 120 updates the mapping relationship between the NST and the NSST according to the received ID of the modified NSST, i.e., the ID of the original NSST A_1 in the mapping relationship is updated to the ID of the NSST A_2 after the modification. After updating the mapping relationship between the NST and the NSST, the NSMF 120 may return a modification confirmation message to the CSMF 118.

Similarly, in the two example embodiments, in the case that the application server is a third-party server, before modifying the NST or NSST, whether the NST or NSST to be modified is a customized NST or customized NSST may further be determined. If the NST or NSST to be modified is a customized NST or customized NSST, an identifier of the customization manufacturer may be acquired. Whether the identifier of the application server and the identifier of the customization manufacturer match is determined. If the two matches, the operation of modifying the customized NST or the customized NSST and the mapping relationship between the NST and the NSST is performed. If the two do not match, a modification error message is outputted.

In an example embodiment, the process of the application server 104 directly interfacing with the NSMF 120 and requesting the service of modifying a slice template from the network slice management system 102 is shown in FIG. 4e, including the following steps.

402e. Two-way authentication between the application server and the network slice management system is completed using PSK.

404e. The application server sends to the NSMF 120 in the network slice management system a slice template modifying request message, wherein the request message includes the template ID indicating the slice template to be modified and the parameter set required for modifying the slice template.

For example, the application server may also send to the slice management exposure function entity 130 a slice template modifying request message, and the slice management exposure function entity 130 sends the slice template modifying request message to the NSMF 120 in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

406e. When determining that the NST and the NSST associated therewith need to be modified according to the template ID indicating the slice template to be modified, the NSMF 120 decomposes the relevant parameters in the parameter set into the subnet slice template parameters required for modifying the NSST, and sends the subnet slice template parameters and the ID of the NSST to be modified to the selected NSSMF 122, so as to instruct the NSSMF 122 to modify the NSST.

For example, the application server may need to modify the slice template in the designated area. In this case, the slice template modifying request message may also include the designated area information. For example, the designated area information may be used as a parameter in the parameter set. Accordingly, the NSMF 120 may select the NSSMF 122 according to the area information, for example, selecting the NSSMF 122 deployed in the designated area corresponding to the area information.

In the embodiment, the NST ID being the template ID of the slice template to be modified, and learning that the NST and the NSST associated therewith need to be modified through the NST ID are used as an example. In the case that it is determined that the NST and the NSST associated therewith need to be modified, the NSMF 120, on the one hand, queries the maintained mapping relationship between the NST and the NSST to obtain the ID of the NSST to be modified, and on the other hand, decomposes the relevant parameters in the parameter set into subnet slice template parameters required for modifying the NSST; and then the subnet slice template parameters are sent to the NSSMF 122 together with the ID of the NSST to be deleted, so as to indicate to the NSSMF 122 that a corresponding NSST is to be modified. For example, the NSSMF 122 may delete an original NSST and regenerate a new NSST according to a new subnet slice template parameter, or may change the original NSST according to the new subnet slice template parameter.

408e. The NSSMF 122 modifies the corresponding NSST according to the received subnet slice template parameter and the ID of the NSST to be modified.

410e. After modifying the NSST, the NSSMF 122 returns the ID of the modified NSST to the NSMF 120.

412e. The NSMF 120 modifies the NST corresponding to the NST ID according to the received ID of the modified NSST, then updates the mapping relationship between the NST and the NSST, and returns the slice template modifying request confirmation message to the application server, which can be seen in step 414e.

Furthermore, in the case that the application server is a third-party server, before the NSST is modified, whether the NST or NSST to be modified is a customized NST or a customized NSST may further be determined according to the template ID indicating the slice template to be modified. If the NST or the NSST to be modified is a customized NST or a customized NSST, an identifier of the corresponding customization manufacturer may be acquired from the template ID indicating the slice template to be modified; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of modifying the customized NST or the customized NSST associated therewith and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 104 does not have the permission to modify the system defaulted NST or the system defaulted NSST.

The mapping relationship between the NST and the NSST is updated. For example, the updating may be changing from a customized NST corresponding to a default NSST1 and a customized NSST1 to the customized NST corresponding to a customized NSST1 and a customized NSST2, or the updating may be changing the customized NSTA corresponding to a default NSST1 and a customized NSST1 to a customized NSTB corresponding to a default NSST1, a customized NSST1, and a customized NSST2. These are examples of updating the mapping relationship between the NST and the NSST.

It should be noted that if the slice template customized by the service manufacturer corresponding to the application server only contains the NSST, the NSMF 120 may directly return the slice template modifying request confirmation message to the application server after receiving the ID of the modified NSST without performing the operation of updating the mapping relationship between the NST and the NSST.

416e. After determining that the operation of modifying the slice template is complete, the NSMF 120 sends to the application server a notification message indicating that the operation of modifying the slice template is completed.

For example, if the operation of modifying the slice template fails, the NSMF 120 may send to the application server a slice template modifying request error message; and the error message includes a cause or cause code for the slice template modification error.

In the embodiment shown in FIG. 4e, the ID of the NST being the template ID indicating the slice template to be modified, and the NST and the NSST associated therewith needing to be modified are used as an example to illustrate the process of modifying the template. In the process of modifying the template, modifying the NST or the NSST first is not limited. FIG. 4e shows an illustration of using the NSST being modified first by the NSSMF 122, and the NSMF 120 modifying the NST and updating the mapping relationship between the NST and the NSST later as an example. In addition, the NSMF 120 may also modify the NST first. After the NSSMF 122 is instructed to modify the NSST and the NSST is modified, NSMF 120 updates the mapping relationship between the NST and the NSST. Alternatively, the NSMF 120 and the NSSMF 122 may also perform the modifying operation in parallel. The NSMF 120 finally updates the mapping relationship between the NST and the NSST.

In an example embodiment, when the template ID indicating the slice template to be modified is the NST ID and only the NST needs to be modified, then in the embodiment shown in FIG. 4e, after receiving the slice template change request message, the NSMF 120 may modify the NST corresponding to the NST ID according to the relevant parameters in the parameter set included in the request message, and update the mapping relationship between the NST and the NSST after the NST is modified. For example, if the original NST A is modified to the new NST B, the ID of the NST A in the mapping relationship between the NST and the NSST needs to be modified to the ID of the NST B. Furthermore, the ID of the new NST B may also be sent to the NSSMF 122, such that the NSSMF 122 may learn that the NST associated with the NSST is modified and learn about the ID of the new NST B after the modification. After updating the mapping relationship between the NST and the NSST, the NSMF 120 returns the slice template modifying request confirmation message to the application server.

In another example embodiment, when the template ID of the slice template to be modified is the NSST ID, it means that the NSST needs to be modified. Then in the embodiment shown in FIG. 4e, after receiving the slice template modifying request message, the NSMF 120 decomposes the relevant parameters in the parameter set included in the request message into subnet slice template parameters required for modifying the NSST, and sends the subnet slice template parameters and the NSST ID to the selected NSSMF 122 to enable the NSSMF 122 to modify the NSST. The NSSMF 122 modifies the corresponding NSST according to the subnet slice template parameters and the NSST ID. For example, NSST A_1 is modified to NSST A_2; the ID of the modified NSST A_2 is returned to the NSMF 120; the NSMF 120 updates the mapping relationship between the NST and the NSST according to the received ID of the modified NSST, i.e., the ID of the original NSST A_1 in the mapping relationship is updated to the ID of the NSST A_2 after the modification. After updating the mapping relationship between the NST and the NSST, the NSMF 120 returns the slice template modifying request confirmation message to the application server.

Similarly, in the two example embodiments, in the case that the application server is a third-party server, before modifying the NST or NSST, whether the NST or NSST to be modified is a customized NST or customized NSST may further be determined. If the NST or NSST to be modified is a customized NST or customized NSST, an identifier of the customization manufacturer may be acquired. Whether the identifier of the application server and the identifier of the customization manufacturer match is determined. If the two match, the operation of modifying the customized NST or the customized NSST and the mapping relationship between the NST and the NSST is performed. If the two do not match, a modification error message is outputted.

In an example embodiment, the process of the application server 104 directly interfacing with the NSSMF 122 and requesting the service of modifying a slice template from the network slice management system 102 is shown in FIG. 4f, including the following steps.

402f. Two-way authentication between the application server and the network slice management system is completed using PSK.

404f. The application server sends to the NSSMF 122 in the network slice management system a slice template modifying request message, wherein the request message includes the template ID indicating the slice template to be modified and the parameter set required for modifying the slice template.

For example, the application server may also send to the slice management exposure function entity 130 a slice template modifying request message, and the slice management exposure function entity 130 sends the slice template modifying request message to the NSSMF 122 in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

406f. The NSSMF 122 determines whether the NSST needs to be modified according to the template ID indicating the slice template to be modified. For example, in the case that the template ID is the NSST ID, the corresponding NSST needing to be modified is determined. Then, the NSST corresponding to the NSST ID is modified according to the relevant parameters in the parameter set.

In the embodiment shown in FIG. 4f, NSST needing to be modified is used as an example. For example, if the template ID indicating the slice template to be modified contains the NSST ID, the NSSMF 122 may directly use the contained NSST ID as the ID of the NSST to be modified, and modify the corresponding NSST accordingly. Alternatively, if the template ID indicating the slice template to be modified contains only the NST ID, and it is indicated that the NST and the NSST associated therewith need to be modified at the same time, then the NSSMF 122 may report the NST ID to the NSMF 120. The NSMF 120 may query the maintained mapping relationship between the NST and the NSST according to the NST ID, so as to acquire the ID of the NSST to be modified and return the ID to the NSSMF 122. The NSSMF 122 then modifies the corresponding NSST accordingly.

In an example mode, at 408f, after modifying the corresponding NSST, the NSSMF 122 may further report the ID of the modified NSST to the NSMF 120 to enable the NSMF 120 to update the mapping relationship between the NST and the NSST according to the ID of the modified NSST.

410f. The NSMF 120 updates the mapping between the NST and the NSST according to the ID of the modified NSST reported by the NSSMF 122. For example, when the NSSMF 122 modifies NSSTA_1 to NSSTA_2, then the NSMF 120 may update the ID of NSSTA_1 in the mapping relationship to the ID of NSSTA_2.

412f. After updating the mapping relationship between the NST and the NSST, the NSMF 120 returns the modification confirmation message to the NSSMF 122.

For example, if only the NSST needs to be modified, for example, in the case that the template ID indicating the slice template to be modified is the NSST ID, the NSMF 120 only needs to modify the mapping relationship between the NST and the NSST after receiving the ID of the modified NSST reported by the NSSMF 122. Further, for example, if not only the NSST but also the NST need to be modified, for example, in the case that the template ID indicating the slice template to be modified is the NST ID or includes both the NSST ID and the NST ID, then in addition to modifying the corresponding NSST according to the relevant parameters in the parameter set and the template ID, the NSSMF 122 further needs to report the parameter set and the template ID to the corresponding NSMF 120. The NSMF 120 needs to modify the corresponding NST according to the relevant parameters in the parameter set and he template ID, and then further updates the mapping relationship between the NST and the NSST. For example, when the NSSMF 122 modifies NSST A_1 to NSST B_1 and the NSMF 120 modifies NST A to NST B, the mapping relationship between the NST A and NSST A_1 needs to be updated to the mapping relationship between the NST B and NSST B_1.

Furthermore, in the case that the application server is a third-party server, before the NST or NSST is modified, whether the NST or NSST to be modified is a customized NST or a customized NSST may further be determined according to the template ID. If the NST or the NSST to be modified is a customized NST or a customized NSST, an identifier of the corresponding customization manufacturer may be acquired from the template ID; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of modifying the customized NST or the customized NSST and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 104 does not have the permission to modify the system defaulted NST or the system defaulted NSST. Refer to the previous embodiments for the mapping between the identifier of the application server and the identifier of the customization manufacturer.

The mapping relationship between the NST and the NSST is updated. For example, the updating may be changing the customized NST corresponding to a default NSST1 and a customized NSST1 to the customized NST corresponding to a customized NSST1 and a customized NSST2. These are examples of updating the mapping relationship between the NST and the NSST.

414f. After receiving the modification confirmation message returned by the NSMF 120, the NSSMF 122 returns the slice template modifying request confirmation message to the application server.

416f. After determining that the operation of modifying the slice template is complete, the NSSMF 122 sends to the application server a notification message indicating that the operation of modifying the slice template is completed.

For example, if the operation of modifying the slice template fails, the NSSMF 122 may send to the application server a slice template modifying request error message; and the error message includes a cause or cause code for the slice template modification error.

In the embodiment shown in FIG. 4f, detailed description of only modifying the NSST or modifying both the NSST and the NST is provided. In an example embodiment, when the template ID indicating the slice template to be modified is the NST ID and only the NST needs to be modified, then in the embodiment shown in FIG. 4f, after receiving the slice template modifying request message, the NSSMF 122 may report the parameter set in the request message and the NST ID to the NSMF 120 for the NSMF 120 to modify the corresponding NST and update the mapping relationship between the NST and the NSST after the NST is modified. After the NSMF 120 receives the parameter set and the NST ID, the NST corresponding to the NST ID is modified according to the relevant parameters in the parameter set. For example, if the original NST A is modified to the new NST B, the ID of the NST A in the mapping relationship between the NST and the NSST needs to be modified to the ID of the NST B. Furthermore, the ID of the new NSTB may be sent to the NSSMF 122 through the modification confirmation message, such that the NSSMF 122 may learn that the NST associated with the NSST is modified and learn about the ID of the new NST B after the modification. After receiving the modification confirmation message returned by the NSMF 120, the NSSMF 122 returns the slice template modifying request confirmation message to the application server.

Similarly, in an example embodiment, in the case that the application server is a third-party server, before modifying the NST, whether the NST to be modified is a customized NST may further be determined. If the NST to be modified is a customized NST, an identifier of the customization manufacturer may be acquired. Whether the identifier of the application server and the identifier of the customization manufacturer match is determined. If the two match, the operation of modifying the customized NST and the mapping relationship between the NST and the NSST is performed. If the two do not match, a modification error message is outputted.

In the embodiment shown in FIG. 4f, in the case that the NST and the NSST associated with the NST need to be modified, modifying the NST or the NSST first is not limited. FIG. 4*f* shows an illustration of using the NSST being modified first by the NSSMF 122, and the NSMF 120 modifying the NST and updating the mapping relationship between the NST and the NSST later as an example. In addition, the NSSMF 122 may also request the NSMF 120 to modify the NST first, and then the NSSMF 122 modifies the NST. Further, the NSMF 120 updates the mapping relationship between the NST and the NSST after the NSST is modified. Alternatively, the NSMF 120 and the NSSMF 122 may also perform the modifying operation in parallel. The NSMF 120 finally updates the mapping relationship between the NST and the NSST.

Figure 4G:
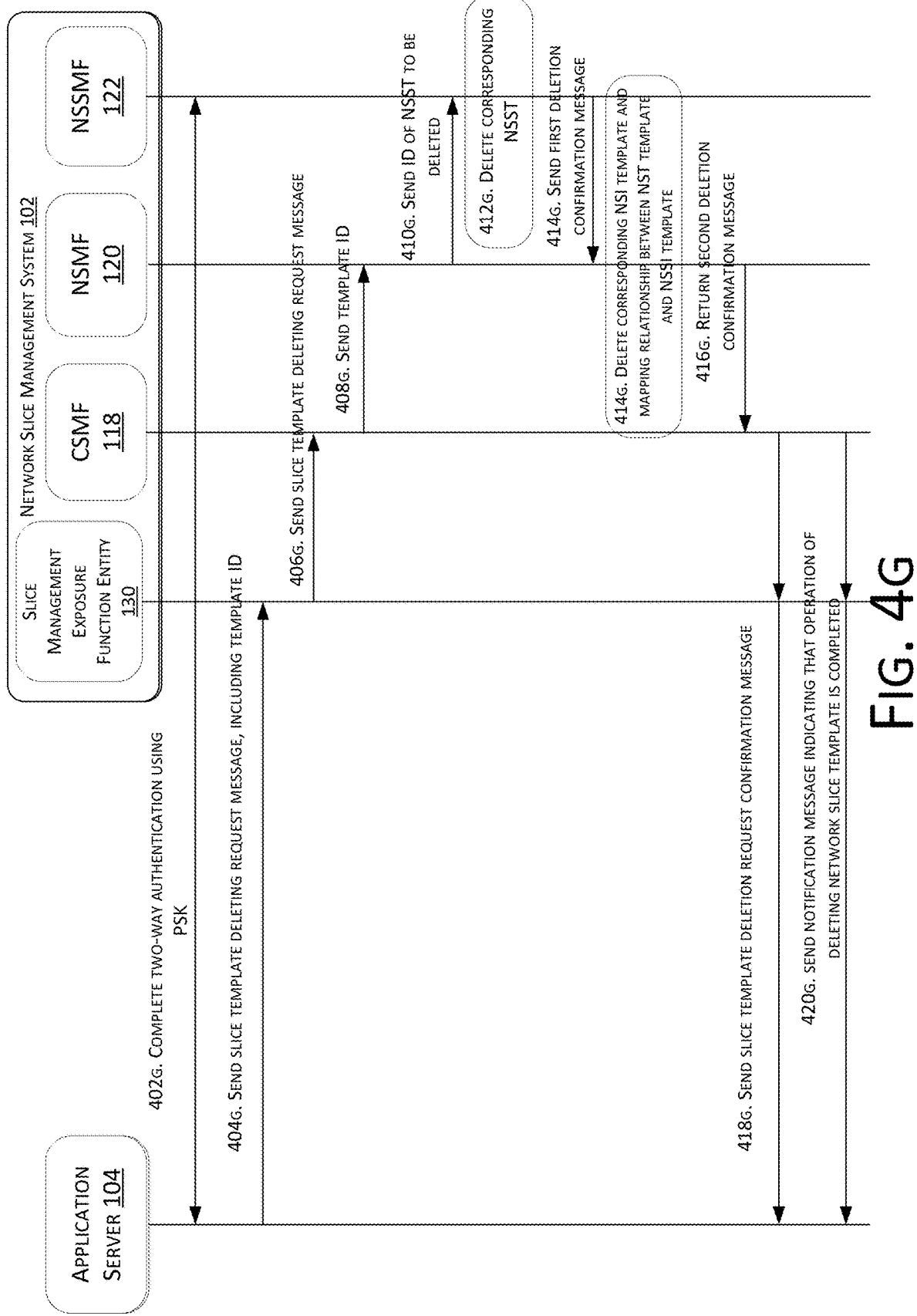
FIGS. 4g-4i show schematic flow diagrams of requesting a service of deleting a slice template respectively through CSMF, NSMF, and NSSMF according to an embodiment of the present disclosure.
Figure 4H:
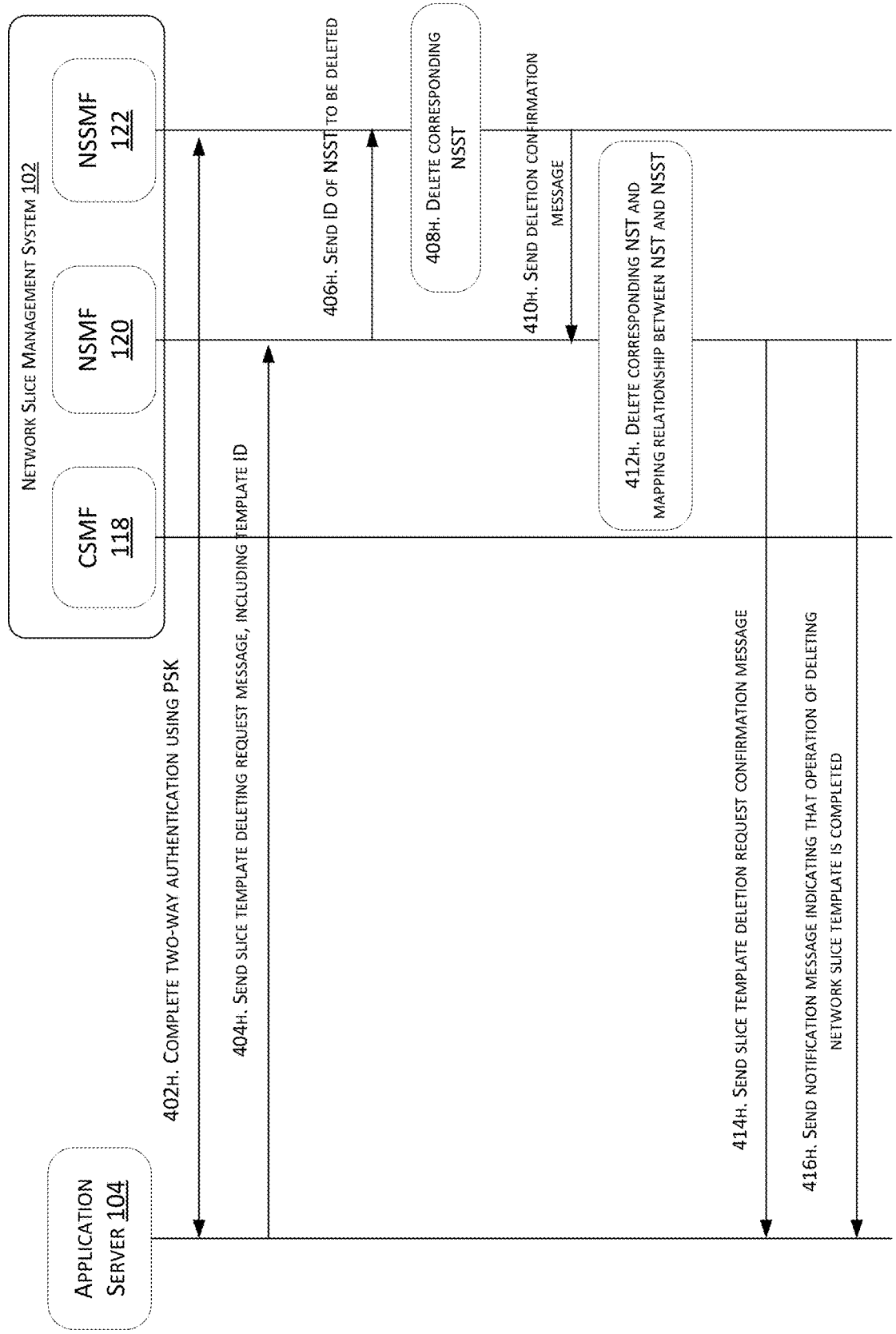
Figure 4I:
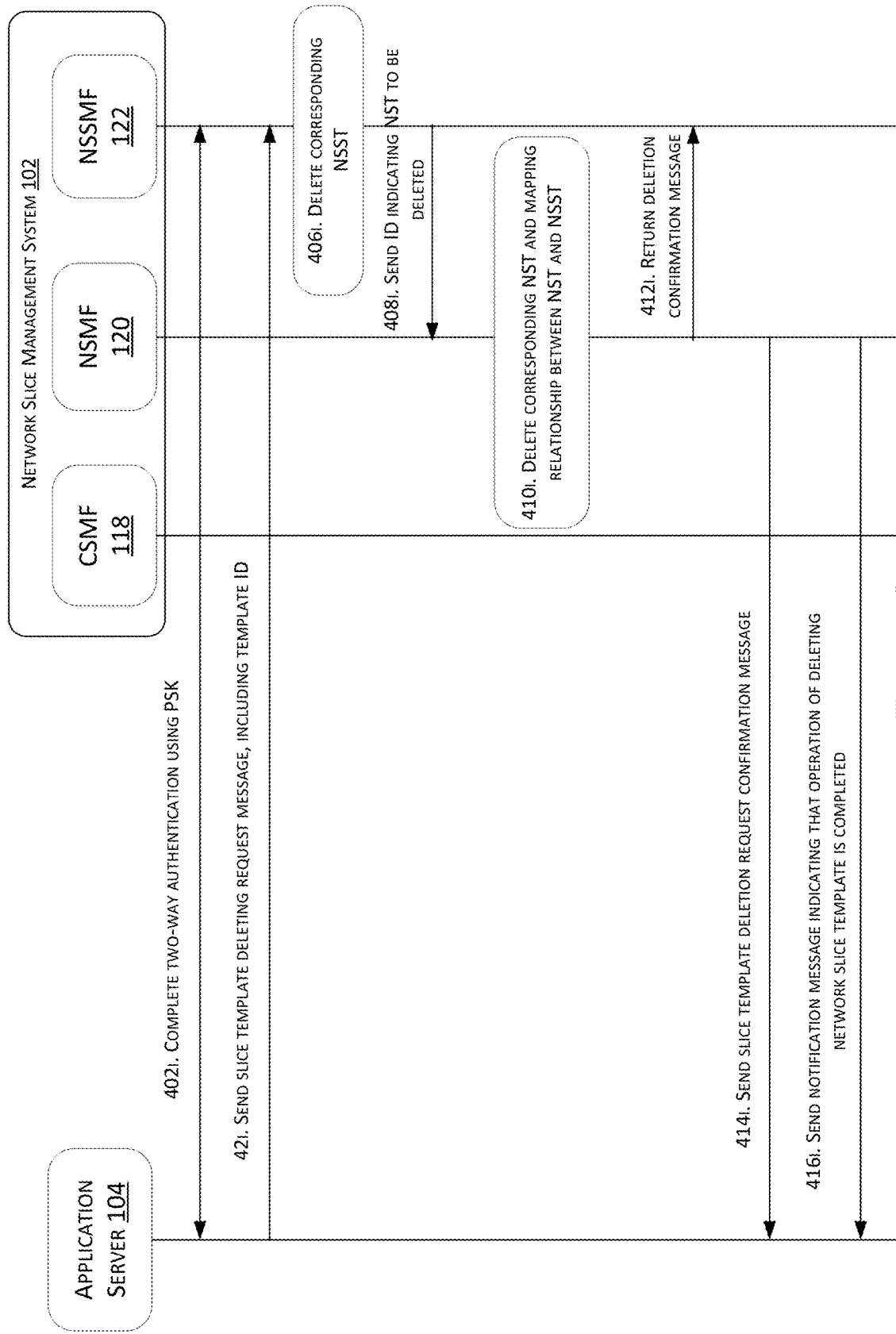

FIGS. 4*g*-4*i* show the process of requesting the service of deleting the slice template:

In an example embodiment, the process of the application server 104 interfacing with the CSMF 118 through the slice management exposure function entity 130 and requesting the service of deleting the slice template from the network slice management system 102 is shown in FIG. 4*g*, including the following steps.

402*g*. Two-way authentication between the application server and the network slice management system is completed using PSK.

404*g*. The application server sends to the slice management exposure function entity 130 a slice template deleting request message to request the slice management exposure function entity 130 to send the request message to the CSMF 118 in the network slice management system.

406*g*. The slice management exposure function entity 130 sends the slice template deleting request message from the application server to the CSMF 118 in the network slice management system, wherein the request message includes a template ID indicating a slice template to be deleted.

It should be noted that the application server may also directly interface with the CSMF 118 and may directly send the slice template deleting request message to the CSMF 118 in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Furthermore, in the case that the application server 104 is a third-party server, the slice template deletion request from the application server 104 may only request to delete the customized NST and the customized NSST, but cannot delete the system defaulted NST nor the default NSST. In such case, the template ID indicating the slice template to be deleted may be a customized NST ID and/or a customized NSST ID. Of course, if the application server 104 is from an operator, the application server 104 may then delete the system defaulted NST and the system defaulted NSST. That is, different application servers have different template deletion permissions. Each embodiment of the present disclosure focuses on the case that the application server 104 is a third-party server.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

408*g*. After receiving the slice template deleting request message, the CSMF 118 sends the template ID indicating the slice template to be deleted to the NSMF 120.

For example, the application server may need to delete the slice template in the designated area. In this case, the slice template deleting request message may also include the designated area information. Accordingly, the CSMF 118 may select an NSMF 120 covering the area information according to the designated area information in the request message, and send the area information and the template ID to the selected NSMF 120.

410*g*. The NSMF 120 selects the NSSMF 122 and sends the ID of the NSST to be deleted to NSSMF 122 to instruct the selected NSSMF 122 to delete the corresponding NSST.

For example, in the case that the designated area information sent by the CSMF 118 is received, the NSMF 120 may select the NSSMF 122 according to the area information, for example, selecting the NSSMF 122 deployed in a designated area corresponding to the area information.

For example, if the template ID indicating the slice template to be deleted contains the NSST ID, the contained NSST ID may be directly sent to the NSSMF 122 as the ID of the NSST to be deleted. If the template ID indicating the slice template to be deleted only contains the NST ID, the maintained mapping relationship between the NST and the NSST may be queried according to the contained NST ID, so as to acquire the ID of the NSST to be deleted. The ID is then sent to the NSSMF 122.

412*g*. The NSSMF 122 deletes the corresponding NSST according to the received ID of the NSST to be deleted, and returns a first deletion confirmation message to the NSMF 120, as shown in step 46*g*.

In the embodiment, the network slice management system may provide a default NSST; and a service manufacturer corresponding to the application server may also customize the NST and the NSST. In the case that the NST is customized by a service manufacturer corresponding to the application server, the customized NST may be associated with the NSST customized by the manufacturer corresponding to the application server, or may be associated with the system defaulted NSST. However, in the case that the application server 104 is a third-party server, the slice template deletion request from the application server 104 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, if the application server 104 is a third-party server, before the corresponding NSST is deleted, whether the NSST is a customized NSST or a system defaulted NSST may be determined. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. Of course, if the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

414g. After receiving the first deletion confirmation message returned by the NSSMF 122, the NSMF 120 deletes the mapping relationship between the NST and the NSST, deletes the NST, and returns a second deletion confirmation message to the CSMF 118, as shown in step 416g.

It should be noted that the operation of determining whether the identifier of the application server and the identifier of the customization manufacturer match may be performed by the NSSMF 122 in the process of deleting the NSST, or by the NSMF 120 in the process of deleting the NST. Alternatively, after receiving the template ID indicating the slice template to be deleted, the NSMF 120 may first perform a determination. That is, before the NSST and the NSST are deleted, the NSMF 120 may determine whether the NST to be deleted is a customized NST according to the template ID indicating the slice template to be deleted. If the NST to be deleted is a customized NST, an identifier of the customization manufacturer may be acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST, the NST, and the mapping relationship between the NST and the NSST is performed. If the two do not match, a deletion error message is outputted, and the operation of deleting the template ends.

418g. After receiving the second deletion confirmation message returned by the NSMF 120, the CSMF 118 returns the slice template deletion request confirmation message to the application server through the slice management exposure function entity 130.

420g. After determining that the operation of deleting the slice template is completed, the CSMF 118 sends to the application server a notification message indicating that the operation of deleting the slice template is completed through the slice management exposure function entity 130.

For example, if the operation of deleting the slice template fails, the CSMF 118 may send to the application server a slice template deletion request error message; and the error message includes a cause or cause code for the slice template deletion error.

In the embodiment shown in FIG. 4g, an indication of deleting the NST and the NSST associated with the NST is used as an example to illustrate the process of deleting the template. In the process of deleting the template, deleting the NST or the NSST first is not limited. FIG. 4g shows an illustration of the NSST being deleted first by the NSSMF 122, the NSMF 120 deleting the mapping relationship between the NST and the NSST later, then the NST being further deleted as an example. In addition, the NSMF 120 may also delete the NST first. Afterwards, the NSMF 122 is instructed to delete the NSST. After the NST and the NSST are deleted, the NSMF 120 deletes the mapping relationship between the NST and the NSST. Alternatively, the NSMF 120 may delete the mapping relationship between the NST and the NSST first, then delete the NST, and further instruct the NSSMF 122 to delete the NSST. Alternatively, the NSMF 120 and the NSSMF 122 may also perform the deletion operation in parallel. The NSMF 120 finally deletes the mapping relationship between the NST and the NSST.

In an example embodiment, the template ID indicating the slice template to be deleted may be the NSST ID for instructing the deletion of the NSST. Then in the embodiment shown in FIG. 4g, after receiving the NSST ID, the NSMF 120 can directly send the NSST ID to the selected NSSMF 122 to enable the NSSMF 122 to delete the corresponding NSST, for example, deleting NSSTA_1; the first deletion confirmation message is returned to the NSMF 120. After receiving the deletion confirmation message, the NSMF 120 updates the mapping relationship between the NST and the NSST, which means that the ID of NSST A_1 corresponding to the NST in the mapping relationship is deleted. After deleting the mapping relationship corresponding to the deleted NSST, the NSMF 120 returns a second deletion confirmation message to the CSMF 118, such that the CSMF 118 returns a slice template deletion request confirmation message to the application server. Similarly, in an example embodiment, in the case that the application server is a third-party server, before deleting the NSST, whether the NSST to be deleted is a customized NSST may further be determined. If the NSST to be deleted is a customized NSST, an identifier of the customization manufacturer may be acquired. Whether the identifier of the application server and the identifier of the customization manufacturer match is determined. If the two match, the operation of deleting the customized NSST and the mapping relationship between the NST and the NSST is performed. If the two do not match, a modification error message is outputted.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4g, before deleting the NST, the NSSMF 122 determines that the NSSTs are all system defaulted NSSTs and/or NSSTs customized by other manufacturers, which means that these NSSTs cannot be deleted. A notification message that the NSST cannot be deleted may be returned to the NSMF 120. After receiving the notification message returned by NSSMF 122 that the NSST cannot be deleted, the NSMF 120 may delete the mapping relationship between the NST and the NSST, delete the NST, and return a deletion confirmation message to the CSMF 118, such that the CSMF 118 may return a slice template deletion request confirmation message to the application server.

In an example embodiment, the process of the application server 104 directly interfacing with the NSMF 120 and requesting the service of deleting a slice template from the network slice management system 102 is shown in FIG. 4h, including the following steps.

402h. Two-way authentication between the application server and the network slice management system is completed using PSK.

404h. The application server sends to the NSMF 120 in the network slice management system a slice template deleting request message, wherein the request message includes the template ID indicating the slice template to be deleted.

For example, the application server may also send to the slice management exposure function entity 130 a slice template deleting request message, and the slice management exposure function entity 130 sends the slice template deleting request message to the NSMF 120 in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Further, in the case that the application server 104 is a third-party server, the slice template deletion request from the application server 104 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, the template ID indicating the slice template to be deleted may be a customized NST ID and/or a customized NSST ID.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

406h. The NSMF 120 selects the NSSMF 122 and sends the ID of the NSST to be deleted to the NSSMF 122 to instruct the selected NSSMF 122 to delete the corresponding NSST.

For example, the application server may need to delete the slice template in the designated area. In this case, the slice template deleting request message may also include the designated area information. Accordingly, the NSMF 120 may select an NSSMF 122 according to the designated area information in the request message.

For example, if the template ID indicating the slice template to be deleted contains the NSST ID, the contained NSST ID may be directly sent to the NSSMF 122 as the ID of the NSST to be deleted. If the template ID indicating the slice template to be deleted only contains the NST ID, the maintained mapping relationship between the NST and the NSST may be queried according to the contained NST ID, so as to acquire the ID of the NSST to be deleted. The ID is then sent to the NSSMF 122.

408h. The NSSMF 122 deletes the corresponding NSST according to the received ID of the NSST to be deleted, and returns a deletion confirmation message to the NSMF 120, as shown in step 410h.

In the embodiment, the network slice management system may provide a default NSST; and a service manufacturer corresponding to the application server may also customize the NST and the NSST. In the case that the NST is customized by a service manufacturer corresponding to the application server, the customized NST may be associated with the NSST customized by the service manufacturer, or may be associated with the system defaulted NSST. However, in the case that the application server 104 is a third-party server, the slice template deletion request from the application server 104 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, before the corresponding NSST is deleted, whether the NSST is a customized NSST or a system defaulted NSST may be determined. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. If the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

412h. After receiving the deletion confirmation message returned by the NSSMF 122, the NSMF 120 deletes the mapping relationship between the NST and the NSST, deletes the NST, and returns a slice template deletion request confirmation message to the application server, as shown in step 414h.

It should be noted that the operation of determining whether the identifier of the application server and the identifier of the customization manufacturer match may be performed by the NSSMF 122 in the process of deleting the NSST, or by the NSMF 120 in the process of deleting the NST. Alternatively, the NSMF 120 may also perform the determination first. That is, after receiving the slice template deletion request message and before deleting the NSST and the NSST, the NSMF 120 performs the determination; and the execution process is the same, which will not be described again herein. For example, in each embodiment, in the process of deleting the NSST, the NSSMF 122 may determine whether a manufacturer identifier of the customized NSST matches with the ID of the application server. In the process of deleting the NST, the NSMF 120 may determine whether a manufacturer identifier of the customized NST matches with the ID of the application server.

416h. After determining that the operation of deleting the slice template is complete, the NSMF 120 sends to the application server a notification message indicating that the operation of deleting the slice template is completed.

For example, if the operation of deleting the slice template fails, the NSMF 120 may send to the application server a slice template deletion request error message; and the error message includes a cause or cause code for the slice template deletion error.

In the embodiment shown in FIG. 4h, an indication of deleting the NST and the NSST associated with the NST is used as an example to illustrate the process of deleting the template. In the process of deleting the template, deleting the NST or the NSST first is not limited. FIG. 4h shows an illustration of the NSST being deleted first by the NSSMF 122, the NSMF 120 deleting the mapping relationship between the NST and the NSST later, then the NST being further deleted as an example. In addition, the NSMF 120 may also delete the NST first. Afterwards, the NSSMF 122 is instructed to delete the NSST. After the NST and the NSST are deleted, the NSMF 120 deletes the mapping relationship between the NST and the NSST. Alternatively, the NSMF 120 may delete the mapping relationship between the NST and the NSST first, then delete the NST, and further instruct the NSSMF 122 to delete the NSST. Alternatively, the NSMF 120 and the NSSMF 122 may also perform the deletion operation in parallel. The NSMF 120 finally deletes the mapping relationship between the NST and the NSST.

In an example embodiment, the template ID indicating the slice template to be deleted may be the NSST ID for instructing the deletion of the NSST. Then in the embodiment shown in FIG. 4h, after receiving the slice template deleting request message, the NSMF 120 can directly send the NSST ID to the selected NSSMF 122 to enable the NSSMF 122 to delete the corresponding NSST, for example, deleting NSST A_1; the deletion confirmation message is returned to the NSMF 120. After receiving the deletion confirmation message, the NSMF 120 updates the mapping relationship between the NST and the NSST, which means that the ID of NSST A_1 corresponding to the NST in the mapping relationship is deleted. After deleting the mapping relationship corresponding to the deleted NSST, the NSMF 120 returns a slice template deletion request confirmation message to the application server. Similarly, in an example embodiment, in the case that the application server is a third-party server, before deleting the NSST, whether the NSST to be deleted is a customized NSST may further be determined. If the NSST to be deleted is a customized NSST, an identifier of the customization manufacturer may be acquired. Whether the identifier of the application server and the identifier of the customization manufacturer match is determined. If the two match, the operation of deleting the customized NSST and the mapping relationship between the NST and the NSST is performed. If the two do not match, a modification error message is outputted.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4h, before deleting the NSST, the NSSMF 122 determines that the NSSTs are all system defaulted NSSTs and/or NSSTs customized by other manufacturers, which means that these NSSTs cannot be deleted. A notification message that the NSST cannot be deleted may be returned to the NSMF 120. After receiving the notification message returned by NSSMF 122 that the NSST cannot be deleted, the NSMF 120 may delete the mapping relationship between the NST and the NSST, delete the NST, and return a slice template deletion request confirmation message to the application server.

In an example embodiment, the process of the application server 104 directly interfacing with the NSSMF 122 and requesting the service of deleting a slice template from the network slice management system 102 is shown in FIG. 4i, including the following steps.

402i. Two-way authentication between the application server and the network slice management system is completed using PSK.

404i. The application server sends to the NSSMF 122 in the network slice management system a slice template deleting request message, wherein the request message includes the template ID indicating the slice template to be deleted.

For example, the application server may also send to the slice management exposure function entity 130 a slice template deleting request message, and the slice management exposure function entity 130 sends the slice template deleting request message to the NSSMF 122 in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Further, in the case that the application server 104 is a third-party server, the slice template deletion request from the application server 104 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, the template ID indicating the slice template to be deleted may be a customized NST ID and/or a customized NSST ID.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

406i. The NSSMF 122 deletes the corresponding NSST according to the template ID indicating the slice template to be deleted.

408i. The NSSMF 122 reports the ID indicating the NST to be deleted to the corresponding NSMF 120.

410i. The NSMF 120 deletes the corresponding NST and the mapping relationship between the NST and the NSST according to the ID indicating the NST to be deleted, and returns a deletion confirmation message to the NSSMF 122, as shown in step 412*i*.

For example, if the template ID indicating the slice template to be deleted contains the NSST ID, the NSSMF 122 may directly delete the NSST corresponding to the ID, and send the NSST ID to the NSMF 120 as the ID indicating the NST to be deleted, such that the NSMF 120 may query the maintained mapping relationship between the NST and the NSST according to the ID and acquire the ID of the NST to be deleted. The NST corresponding to the ID and the mapping relationship between the NST and the NSST are deleted. If the template ID indicating the slice template to be deleted contains the NST ID, the NSSMF 122 may report the NST ID to the NSMF 120 as the ID indicating the NST to be deleted. The NSMF 120 may query the maintained mapping relationship between the NST and the NSST to acquire the ID of the NSST to be deleted and returns the ID to the NSSMF 122. The NSSMF 122 deletes the corresponding NSST accordingly. The NSMF 120 deletes the corresponding NST and the mapping relationship between the NST and the NSST according to the ID of the NST reported by the NSSMF 122.

Further, for example, the fact that the customized NST of a service manufacturer corresponding to the application server may be associated with the NSST customized by the manufacturer, may be associated with the system defaulted NSST, and may possibly be associated with NSSTs customized by other manufacturers needs to be considered. However, in the case that the application server 104 is a third-party server, the slice template deletion request from the application server 104 may only request to delete the NST and the NSST customized by the service manufacturer corresponding to the application server, but cannot delete the system defaulted NST nor the default NSST. In such case, NST and NSST customized by other service manufacturers cannot be deleted, either. In view of this, before deleting the corresponding NSST, the NSSMF 122 may determine whether the NSST is a customized NSST or a system defaulted NSST. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. If the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

It should be noted that the operation of determining whether the identifier of the application server and the identifier of the customization manufacturer match may be performed by the NSSMF 122 in the process of deleting the NSST, or by the NSMF 120 in the process of deleting the NST. Alternatively, the two deletion processes are performed by the NSSMF 122 or NSMF 120 respectively. As the execution processes are the same, details will not be elaborated further herein.

414*i*. After receiving the deletion confirmation message returned by the NSMF 120, the NSSMF 122 returns the slice template deletion request confirmation message to the application server.

416*i*. After determining that the operation of deleting the slice template is complete, the NSSMF 122 sends to the application server a notification message indicating that the operation of deleting the slice template is completed.

For example, if the operation of deleting the slice template fails, the NSSMF 122 may send to the application server a slice template deletion request error message; and the error message includes a cause or cause code for the slice template deletion error.

In the embodiment shown in FIG. 4*i*, an indication of deleting the NST and the NSST associated with the NST is used as an example to illustrate the process of deleting the template. In the process of deleting the template, deleting the NST or the NSST first is not limited. FIG. 4*i* shows an illustration of the NSST being deleted first by the NSSMF 122, the NSMF 120 deleting the mapping relationship between the NST and the NSST later, then the NST being further deleted as an example. In addition, the NSMF 120 may also request the NSMF 120 to delete the NST first. Afterwards, the NSSMF 122 deletes the NSST. After the NST and the NSST are deleted, the NSMF 120 deletes the mapping relationship between the NST and the NSST. Alternatively, the NSMF 120 may first delete the mapping relationship between the NST and the NSST according to the request of the NSSMF 122, then delete the NST. Afterwards, the NSSMF 122 deletes the NSST. Alternatively, the NSMF 120 and the NSSMF 122 may also perform the deletion operation in parallel. The NSMF 120 finally deletes the mapping relationship between the NST and the NSST.

In an example embodiment, the template ID indicating the slice template to be deleted may be the NSST ID for instructing the deletion of the NSST. Then in the embodiment shown in FIG. 4*i*, after receiving the slice template deleting request message, the NSSMF 122 may directly delete the corresponding NSST according to the NSST ID, for example, deleting NSST A_1. The NSST ID is then reported to the NSMF 120. After receiving the deletion confirmation message, the NSMF 120 updates the mapping relationship between the NST and the NSST, which means that the ID of NSST A_1 corresponding to the NST in the mapping relationship is deleted. After deleting the mapping relationship corresponding to the deleted NSST, the NSMF 120 returns a deletion confirmation message to the NSSMF 122, such that the NSSMF 122 returns a slice template deletion request confirmation message to the application server.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4*i*, after receiving the slice template deletion request message and before performing the operation of deleting the NSST, the NSSMF 122 determines that the NSSTs are all system defaulted NSSTs and/or NSSTs customized by other manufacturers, which means that these NSSTs cannot be deleted. The NSSMF 122, on the one hand, sends to the NSMF 120 a notification message that the NSST cannot be deleted, and on the other hand, sends to the NSMF 120 an ID indicating the NST to be deleted. After receiving the notification message sent by the NSSMF 122 that the NSST cannot be deleted, the NSMF 120 may delete the mapping relationship between the NST and the NSST and delete the NST according to the ID indicating the NST to be deleted, and return the deletion confirmation message to the NSSMF 122, such that the NSSMF 122 may return the slice template deletion request confirmation message to the application server.

It is to be noted that in the embodiment above, the slice template customization request message, the slice template modifying request message, and the slice template deleting request message may be carried using an HTTP message or HTTPs message, and may also be carried by a message format customized by the network slice management system, which is not limited thereby. In addition, titles of the messages are only examples. All message titles that can implement corresponding functions are applicable in the embodiments of the present disclosure. For example, the messages may also be simply named as a first request message, a second request message, a third request message, and the like.

Figure 5B:
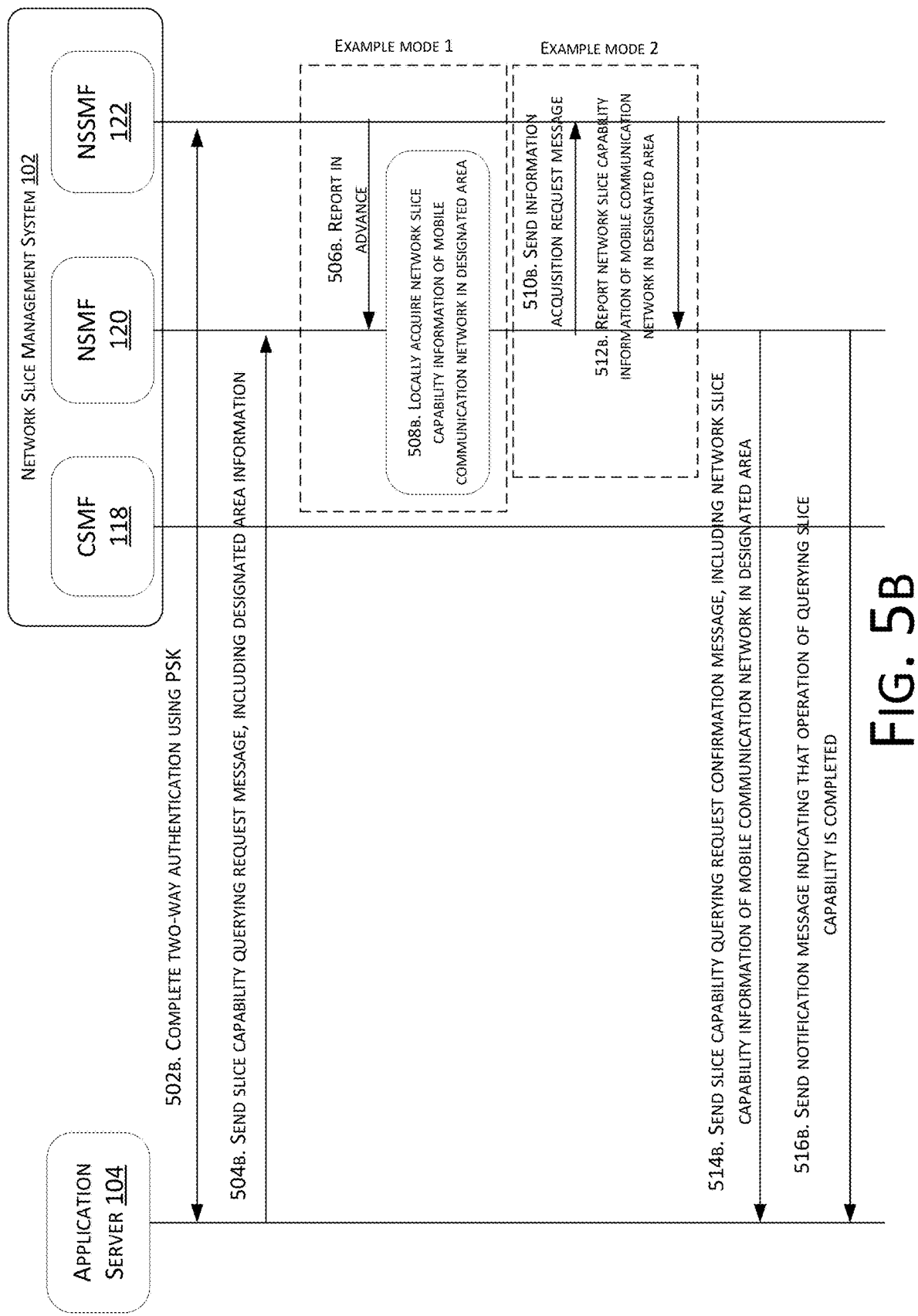
Figure 5C:
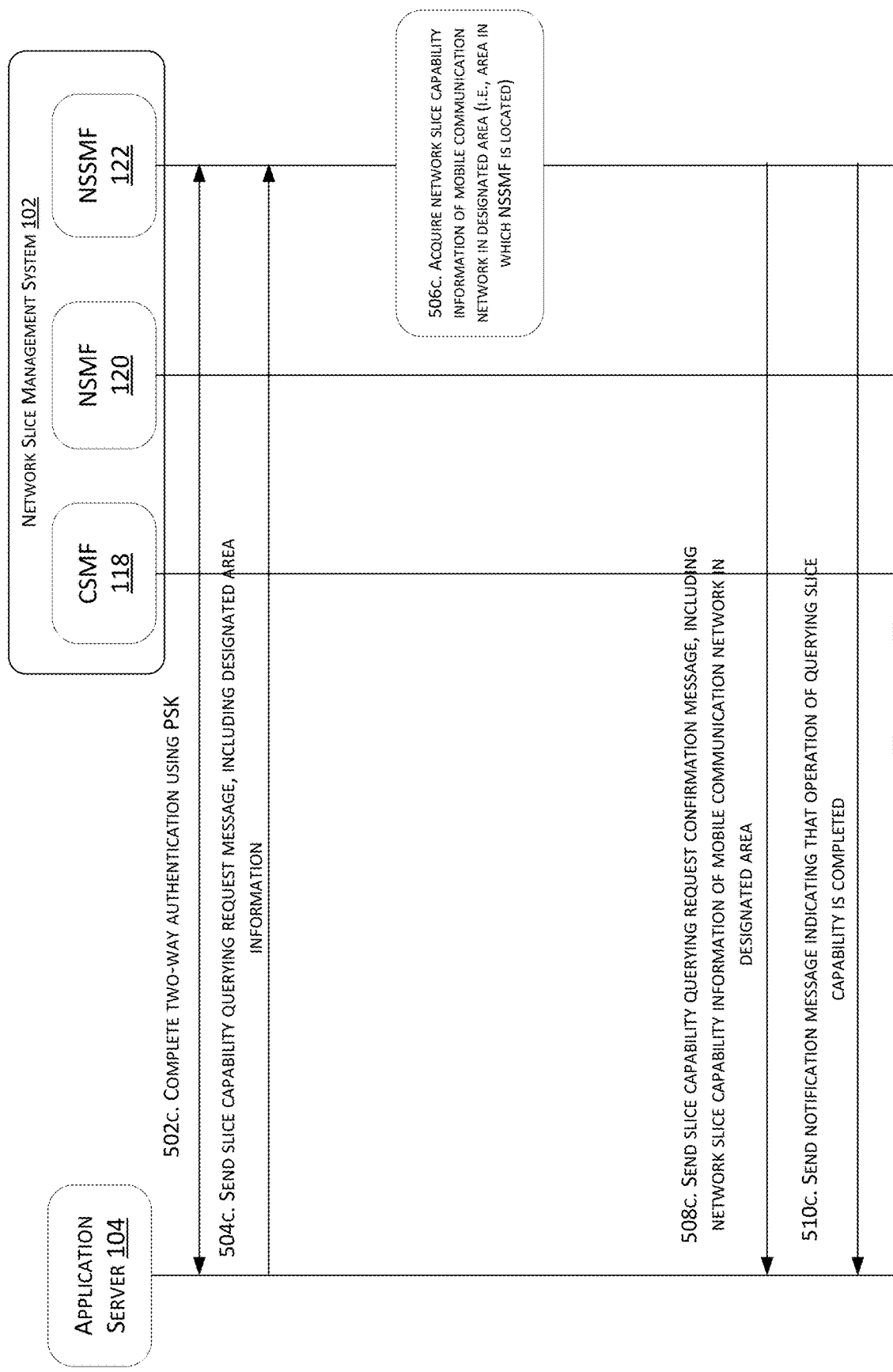

FIGS. 5a-5c show the process of requesting the service of querying network slice capability information:

In an example embodiment, the process of the application server 104 interfacing with the CSMF through the slice management exposure function entity 130 and requesting the service of querying the network slice capability information from the network slice management system 102 is shown in FIG. 5a, including the following steps.

502a. Two-way authentication between the application server and the network slice management system is completed using PSK.

504a. The application server 104 sends to the slice management exposure function entity 130 a slice capability querying request message to request the slice management exposure function entity 130 to send the request message to the CSMF 118 in the network slice management system.

506a. The slice management exposure function entity 130 sends the slice capability querying request message from the application server 104 to the CSMF 118 in the network slice management system, wherein the request message includes the designated area information.

508a. After receiving the slice capability querying request message, the CSMF 118 sends the designated area information to the NSMF 120.

For example, the CSMF 118 may select an NSMF 120 covering the area information according to the designated area information, and send the area information to the selected NSMF 120.

510a. The NSMF 120 cooperates with the NSSMF 122 corresponding to the designated area information, so as to acquire the network slice capability information of the mobile communication network in the designated area. The NSSMF 122 reports in advance to NSMF 120.

In an example embodiment, as shown in step 512a, the NSSMF 122 in each area may report to the NSMF 120 in real time the network slice capability information of the mobile communication network in the area of the NSSMF 122. The NSMF 120 locally maintains the network slice capability information of the mobile communication network in areas covered by the NSMF 120. On such basis, after receiving the designated area information sent by the CSMF 118, the NSMF 120 may directly acquire the network slice capability information of the mobile communication network in the designated area locally. The designated area information points to the designated area.

In another example embodiment, the NSSMF 122 in each area does not report to the NSMF 120 in real time the network slice capability information of the mobile communication network in the area of the NSSMF 122. Instead, the NSMF 120 acquires in real time, from the NSSMF 122, the network slice capability information of the mobile communication network in the area of the NSSMF 122 according to demands. On such basis, as shown in steps 514a, after receiving the designated area information sent by the CSMF 118, the NSMF 120 may select the NSSMF 122 according to the area information, and send an information acquisition request message to the selected NSSMF 122 to request the NSSMF 122 to report the network slice capability information of the mobile communication network in the designated area at 516a. The NSMF 120 then receives the network slice capability information of the mobile communication network in the designated area reported by the NSSMF 122.

518a. The NSMF 120 sends the network slice capability information of the mobile communication network in the designated area to the CSMF 118.

520a. After receiving the network slice capability information of the mobile communication network in the designated area returned by the NSMF 120, the CSMF 118 returns the slice capability querying request confirmation message to the application server 104 through the slice management exposure function entity 130, wherein the confirmation message contains the network slice capability information of the communication network in the designated area.

522a. After determining that the operation of querying the slice capability is completed, the CSMF 118 sends to the application server 104 a notification message indicating that the operation of querying the slice capability is completed through the slice management exposure function entity 130.

For example, if the operation of querying the slice capability fails, the CSMF 118 may send to the application server 104 a slice capability querying request error message; and the error message includes a cause or cause code for the slice capability querying error.

In an example embodiment, the process of the application server 104 directly interfacing with the NSMF 120 and requesting the service of querying the network slice capability information from the network slice management system 102 is shown in FIG. 5b, including the following steps.

502b. Two-way authentication between the application server 104 and the network slice management system is completed using PSK.

504b. The application server 104 sends to the NSMF 120 in the network slice management system a slice capability querying request message, wherein the request message includes the designated area information.

For example, the application server 104 may also send to the slice management exposure function entity 130 the slice capability querying request message, and the slice management exposure function entity 130 sends the slice capability querying request message to the NSMF 120 in the network slice management system.

506b. The NSMF 120 cooperates with the NSSMF 122 corresponding to the designated area information, so as to acquire the network slice capability information of the mobile communication network in the designated area. The NSSMF 122 reports in advance to NSMF 120.

In an example mode, as shown in step 508b, the NSSMF 122 in each area may report to the NSMF 120 in real time the network slice capability information of the mobile communication network in the area of the NSSMF 122. The NSMF 120 locally maintains the network slice capability information of the mobile communication network in areas covered by the NSMF 120. On such basis, after receiving the designated area information sent by the CSMF 118, the NSMF 120 may directly acquire the network slice capability information of the mobile communication network in the designated area locally. The designated area information points to the designated area.

In another example mode, the NSSMF 122 in each area does not report to the NSMF 120 in real time the network slice capability information of the mobile communication network in the area of the NSSMF 122. Instead, the NSMF 120 acquires in real time, from the NSSMF 122, the network slice capability information of the mobile communication network in the area of the NSSMF 122 according to demands. On such basis, as shown in step 510*b*, after receiving the designated area information sent by the CSMF 118, the NSMF 120 may select the NSSMF 122 according to the area information, and send an information acquisition request message to the selected NSSMF 122 to request the NSSMF 122 to report the network slice capability information of the mobile communication network in the designated area at step 512*b*. The NSMF 120 then receives the network slice capability information of the mobile communication network in the designated area reported by the NSSMF 122.

514*b*. The NSMF 120 returns the slice capability querying request confirmation message to the application server 104, wherein the confirmation message contains the network slice capability information of the mobile communication network in the designated area.

516*b*. After determining that the operation of querying the slice capability is completed, the NSMF 120 sends to the application server 104 a notification message indicating that the operation of querying the slice capability is completed.

For example, if the operation of querying the slice capability fails, the NSMF 120 may send to the application server 104 a slice capability querying request error message; and the error message includes a cause or cause code for the slice capability querying error.

In an example embodiment, the process of the application server 104 directly interfacing with the NSSMF 122 and requesting the service of querying the network slice capability information from the network slice management system 102 is shown in FIG. 5*c*, including the following steps.

502*c*. Two-way authentication between the application server 104 and the network slice management system is completed using PSK.

504*c*. The application server 104 sends to the NSMF 120 in the network slice management system a slice capability querying request message, wherein the request message includes the designated area information.

For example, the application server 104 may also send to the slice management exposure function entity 130 the slice capability querying request message, and the slice management exposure function entity 130 sends the slice capability querying request message to the NSSMF 122 in the network slice management system.

506*c*. The NSSMF 122 acquires the network slice capability information of the mobile communication network in the designated area according to the designated area information.

508*c*. The NSSMF 122 returns the slice capability querying request confirmation message to the application server 104, wherein the confirmation message contains the network slice capability information of the mobile communication network in the designated area.

510*c*. After determining that the operation of querying the slice capability is completed, the NSMF 120 sends to the application server 104 a notification message indicating that the operation of querying the slice capability is completed.

For example, if the operation of querying the slice capability fails, the NSSMF 122 may send to the application server 104 a slice capability querying request error message; and the error message includes a cause or cause code for the slice capability querying error.

Figure 5D:
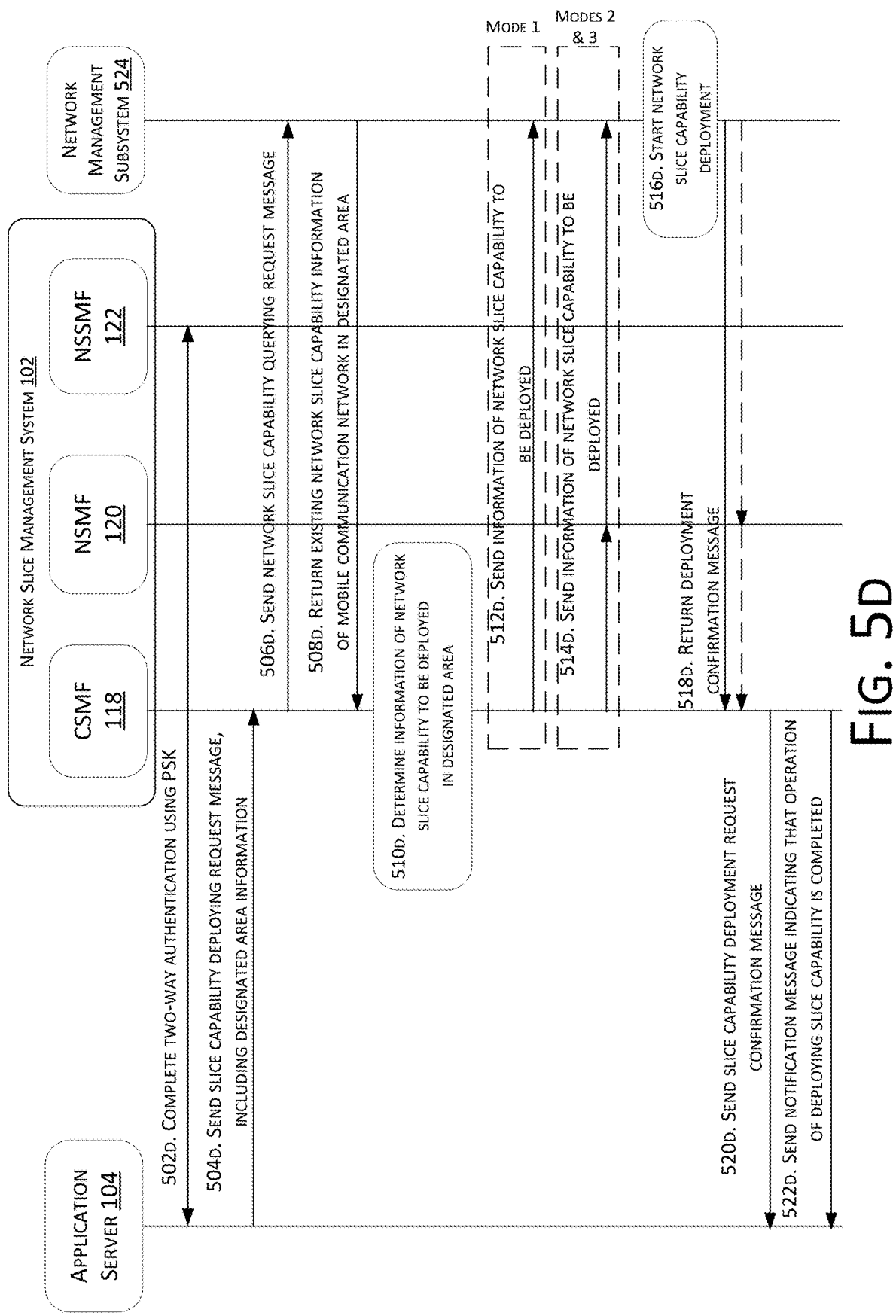
FIGS. 5d-5f show schematic flow diagrams of requesting a service of deploying network slice capability respectively through CSMF, NSMF, and NSSMF according to an embodiment of the present disclosure.
Figure 5E:
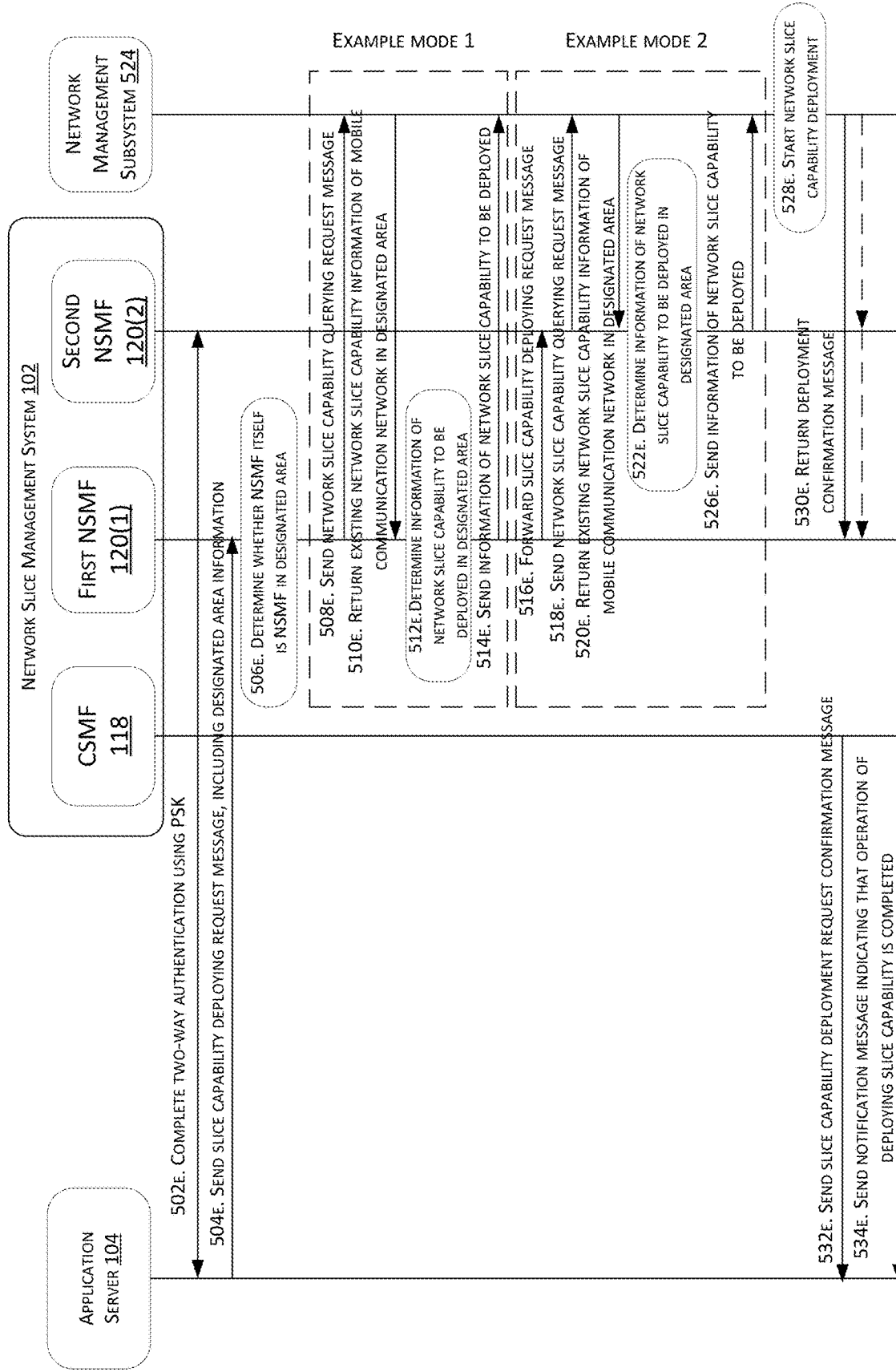
Figure 5F:
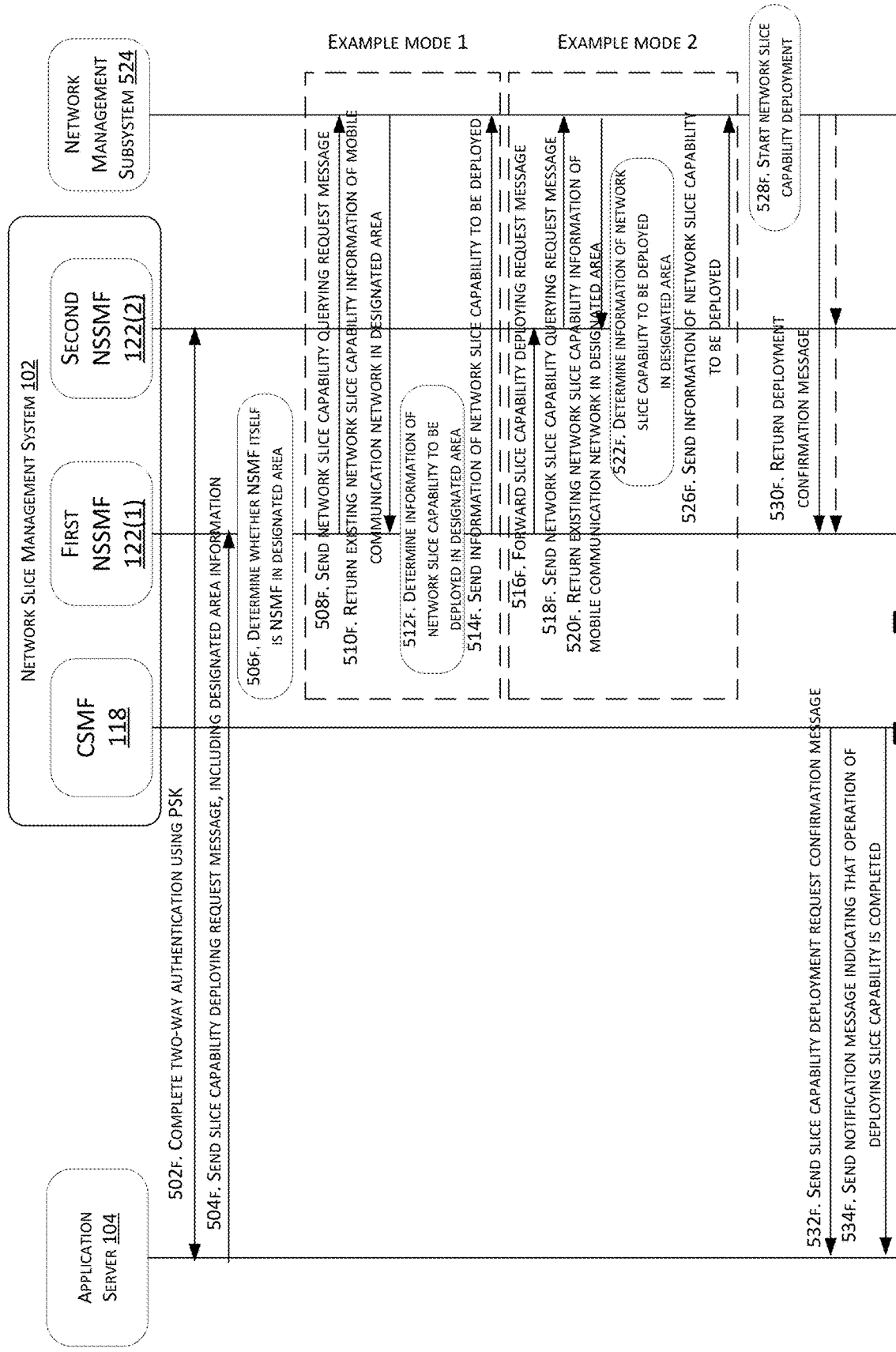

FIGS. 5*d*-5*f* show the process of requesting a service of deploying a network slice capability:

In an example embodiment, the process of the application server 104 directly interfacing with the CSMF 118 and requesting, from the network slice management system 102, and the service of deploying the network slice capability therefor is shown in FIG. 5*d*, including the following steps.

502*d*. Two-way authentication between the application server 104 and the network slice management system is completed using PSK.

504*d*. The application server 104 sends to the CSMF 118 in the network slice management system a slice capability deploying request message, wherein the request message includes the designed area information.

For example, the application server 104 may also send to the slice management exposure function entity 130 the slice capability deploying request message, and the slice management exposure function entity 130 sends the slice capability deploying request message to the CSMF 118 in the network slice management system.

506*d*. After receiving the slice capability deploying request message, the CSMF 118 sends the network slice capability querying request message to the corresponding network management subsystem 524 according to the designated area information, so as to query existing network slice capability information of the mobile communication network in the designated area.

The designated area information points to the designated area. The network management subsystem 524 is a network management system of the designated area, which may manage various information of a mobile communication network in the designated area.

508*d*. The CSMF 118 receives the existing network slice capability information of the mobile communication network in the designated area returned by the network management subsystem 524.

510*d*. The CSMF 118 determines information of the network slice capability to be deployed in the designated area according to the existing network slice capability information of the mobile communication network in the designated area.

It is to be noted that the CSMF 118 may use the method described in steps 53*d* and 54*d*, i.e., querying the existing network slice capability information of the mobile communication network, to determine the information of the network slice capability to be deployed in the designated area, which is not limited thereto. The information of the network slice capability to be deployed in the designated area may also be determined using other methods.

The CSMF 118 sends the information of the network slice capability to be deployed to the network management subsystem 524, such that the network management subsystem 524 may deploy the network slice capability to be deployed in the designated area accordingly.

The CSMF 118 may query the network management subsystem 524 whether the NSMF 120 and the NSSMF 122 of corresponding levels exist in the designated area, and may also query whether the NSSF exists in the core network of the designated area.

In an example mode 1, if the NSMF 120 and the NSSMF 122 are not present in the designated area, and the NSSF is not present in the core network of the designated area, the NSMF 120 and the NSSMF 122 of corresponding levels need to be deployed in the designated area. The NSSF needs to be deployed in the core network of the designated area. The NSMF 120, the NSSMF 122, and the NSSF are the information of the network slice capability to be deployed. In such case, as shown in step 512*d*, the CSMF 118 directly sends the information of the network slice capability to be deployed to the network management subsystem 524.

In an example mode 2, if the NSMF 120, but not the NSSMF 122, is present in the designated area, and the NSSF is not present in the core network of the designated area, the NSSMF 122 of a corresponding level need to be deployed in the designated area. The NSSF needs to be deployed in the core network of the designated area. In this case, the NSSMF 122 and the NSSF are the information of the network slice capability to be deployed.

In another example mode 3, if the NSMF 120, but not the NSSMF 122, is present in the designated area, and the NSSF is present in the core network of the designated area, the NSSMF 122 of a corresponding level needs to be deployed in the designated area. In this case, the NSSMF 122 is the information of the network slice capability to be deployed.

For the example modes 2 and 3, as shown in step 514*d*, the CSMF 118 may send the information of the network slice capability to be deployed to the network management subsystem 524 through the NSMF 120.

For example, the CSMF 118 may select an NSMF 120 covering the area information according to the designated area information in the request message, and send the designated area information to the selected NSMF 120.

516*d*. After receiving the information of the network slice capability to be deployed, the network management subsystem 524 starts network slice capability deployment.

518*d*. The network management subsystem 524 directly returns a deployment confirmation message to the CSMF 118 or through the NSMF 120.

520*d*. After receiving the deployment confirmation message, the CSMF 118 returns the slice capability deployment request confirmation message to the application server 104 through the slice management exposure function entity 130.

522*d*. After determining that the operation of deploying the slice capability is completed, the CSMF 118 sends to the application server 104 a notification message indicating that the operation of deploying the slice capability is completed through the slice management exposure function entity 130.

For example, if the operation of deploying the slice capability fails, the CSMF 118 may send to the application server 104 a slice capability deploying request error message; and the error message includes a cause or cause code for the slice capability deployment error.

In an example embodiment, the process of the application server 104 directly interfacing with the NSMF 120 and requesting, from the network slice management system 102, the service of deploying the network slice capability therefor is shown in FIG. 5*e*, including the following steps.

502*e*. Two-way authentication between the application server 104 and the network slice management system is completed using PSK.

504*e*. The application server 104 sends to a first NSMF 120(1) in the network slice management system a slice capability deploying request message, wherein the request message includes the designed area information. The designated area information points to the designated area.

For example, the application server 104 may also send to the slice management exposure function entity 130 the slice capability deploying request message, and the slice management exposure function entity 130 sends the slice capability deploying request message to the first NSMF 120 in the network slice management system.

506*e*. After receiving the slice capability deploying request message, the first NSMF 120(1) determines whether it is an NSMF 120 in the designated area; if so, steps 508*e*-514*e* in the example mode 1 are executed; if not, and the first NSMF 120(1) is an NSMF 120 of a previous or next level, steps 516*e*-524*e* in the example mode 2 are executed.

508*e*. The first NSMF 120(1) sends the network slice capability querying request message to the network management subsystem 524 to query the existing network slice capability information of the mobile communication network in the designated area.

510*e*. The first NSMF 120(1) receives the existing network slice capability information of the mobile communication network in the designated area returned by the network management subsystem 524.

512*e*. The first NSMF 120(1) determines the information of the network slice capability to be deployed in the designated area according to the existing network slice capability information of the mobile communication network in the designated area.

514*e*. The first NSMF 120(1) sends the information of the network slice capability to be deployed to the network management subsystem 524, such that the network management subsystem 524 may deploy the network slice capability to be deployed accordingly.

516*e*. The first NSMF 120(1) forwards the slice capability deploying request message to a second NSMF 120(2) in the designated area to enable the second NSMF 120(2) to cooperate with the corresponding network management subsystem 524 to complete the deployment of the network slice capability in the designated area.

518*e*. The second NSMF 120(2) sends the network slice capability querying request message to the network management subsystem 524 according to the slice capability deploying request message, so as to query the existing network slice capability information of the mobile communication network in the designated area.

520*e*. The second NSMF 120(2) receives the existing network slice capability information of the mobile communication network in the designated area returned by the network management subsystem 524.

522*e*. The second NSMF 120(2) determines the information of the network slice capability to be deployed in the designated area according to the existing network slice capability information of the mobile communication network in the designated area.

526*e*. The second NSMF 120(2) sends the information of the network slice capability to be deployed to the network management subsystem 524, such that the network management subsystem 524 may deploy the network slice capability to be deployed accordingly.

In the process above, it is indicated that the NSMF 120 is included in the existing network slice capability in the designated area; and the network slice capability to be deployed may include the NSSMF 122 and/or the NSSF.

It is to be noted that the first NSMF 120(1) or the second NSMF 120(2) may query the existing network slice capability information of the mobile communication network to determine the information of the network slice capability to be deployed in the designated area, which is not limited thereto. The information of the network slice capability to be deployed in the designated area may also be determined using other methods.

528*e*. After receiving the information of the network slice capability to be deployed, the network management subsystem 524 starts network slice capability deployment.

530*e*. The network management subsystem 524 directly returns a deployment confirmation message to the first NSMF 120(1) or to the first NSMF 120(1) through the second NSMF 120(2).

532*e*. After receiving the deployment confirmation message, the first NSMF 120(1) returns the slice capability deployment request confirmation message to the application server 104.

534*e*. After determining that the operation of deploying the slice capability is completed, the first NSMF 120(1) sends to the application server 104 a notification message indicating that the operation of deploying the slice capability is completed.

For example, if the operation of deploying the slice capability fails, the first NSMF 120(1) may send to the application server 104 a slice capability deploying request error message; and the error message includes a cause or cause code for the slice capability deployment error.

In an example embodiment, the process of the application server 104 directly interfacing with the NSSMF 122 and requesting, from the network slice management system 102, the service of deploying the network slice capability therefor is shown in FIG. 5*f*, including the following steps.

502*f*. Two-way authentication between the application server 104 and the network slice management system is completed using PSK.

504*f*. The application server 104 sends to a first NSSMF 122(1) in the network slice management system a slice capability deploying request message, wherein the request message includes the designed area information.

For example, the application server 104 may also send to the slice management exposure function entity 130 the slice capability deploying request message, and the slice management exposure function entity 130 sends the slice capability deploying request message to the first NSSMF 122(1) in the network slice management system.

506*f*. After receiving the slice capability deploying request message, the first NSSMF 122(1) determines whether it is an NSSMF 122 in the designated area; if so, steps 508*f*-514*f* in the example mode 1 are executed; and if not, steps 516*f*-526*f* in the example mode 2 are executed.

508*f*. The first NSSMF 122(1) sends the network slice capability querying request message to the network management subsystem 524 in the designated area to query the existing network slice capability information of the mobile communication network in the designated area.

510*f*. The first NSSMF 122(1) receives the existing network slice capability information of the mobile communication network in the designated area returned by the network management subsystem 524.

512*f*. The first NSSMF 122(1) determines the information of the network slice capability to be deployed in the designated area according to the existing network slice capability information of the mobile communication network in the designated area.

514*f*. The first NSSMF 122(1) sends the information of the network slice capability to be deployed to the network management subsystem 524, such that the network management subsystem 524 may deploy the network slice capability to be deployed accordingly.

516*f*. The first NSSMF 122(1) forwards the slice capability deploying request message to the second NSSMF 122(2) in the designated area through the corresponding first NSMF 120 and second NSMF 120.

The first NSMF 120 is the NSMF 120 corresponding to the first NSSMF 122(1), and the second NSMF 120 is the NSMF 120 corresponding to the second NSSMF 122(2).

518*f*. The second NSSMF 122(2) sends the network slice capability querying request message to the network management subsystem 524 to query the existing network slice capability information of the mobile communication network in the designated area.

520*f*. The second NSSMF 122(2) receives the existing network slice capability information of the mobile communication network in the designated area returned by the network management subsystem 524.

522*f*. The second NSSMF 122(2) determines the information of the network slice capability to be deployed in the designated area according to the existing network slice capability information of the mobile communication network in the designated area.

526*f*. The second NSSMF 122(2) sends the information of the network slice capability to be deployed to the network management subsystem 524, such that the network management subsystem 524 may deploy the network slice capability to be deployed accordingly.

It is to be noted that the first NSSMF 122(1) or the second NSSMF 122(2) may query the existing network slice capability information of the mobile communication network to determine the information of the network slice capability to be deployed in the designated area, which is not limited thereto. The information of the network slice capability to be deployed in the designated area may also be determined using other methods.

528*f*. After receiving the information of the network slice capability to be deployed, the network management subsystem 524 starts network slice capability deployment.

530*f*. The network management subsystem 524 directly returns a deployment confirmation message to the first NSSMF 122(1) or to the first NSSMF 122(1) through the first NSSMF 122(1).

532*f*. After receiving the deployment confirmation message, the first NSMF 120 returns the slice capability deployment request confirmation message to the application server 104.

534*f*. After determining that the operation of deploying the slice capability is completed, the first NSSMF 122(1) sends to the application server 104 a notification message indicating that the operation of deploying the slice capability is completed.

For example, if the operation of deploying the slice capability fails, the first NSSMF 122(1) may send to the application server 104 a slice capability deploying request error message; and the error message includes a cause or cause code for the slice capability deployment error.

Figure 5G:
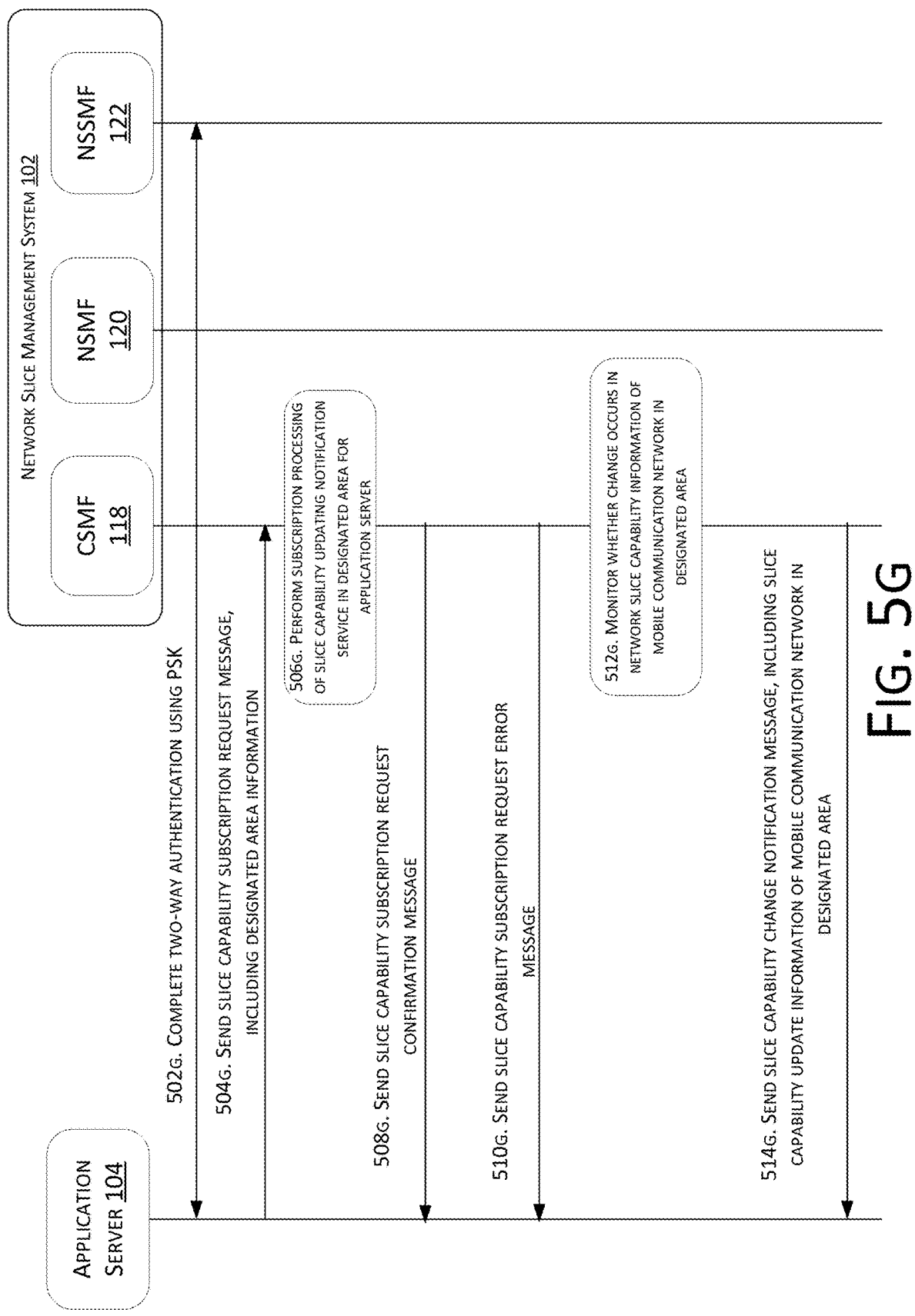
FIGS. 5g-5i show schematic flow diagrams of requesting to subscribe a network slice capability information updating notification service respectively through CSMF, NSMF, and NSSMF according to an embodiment of the present disclosure.
Figure 5H:
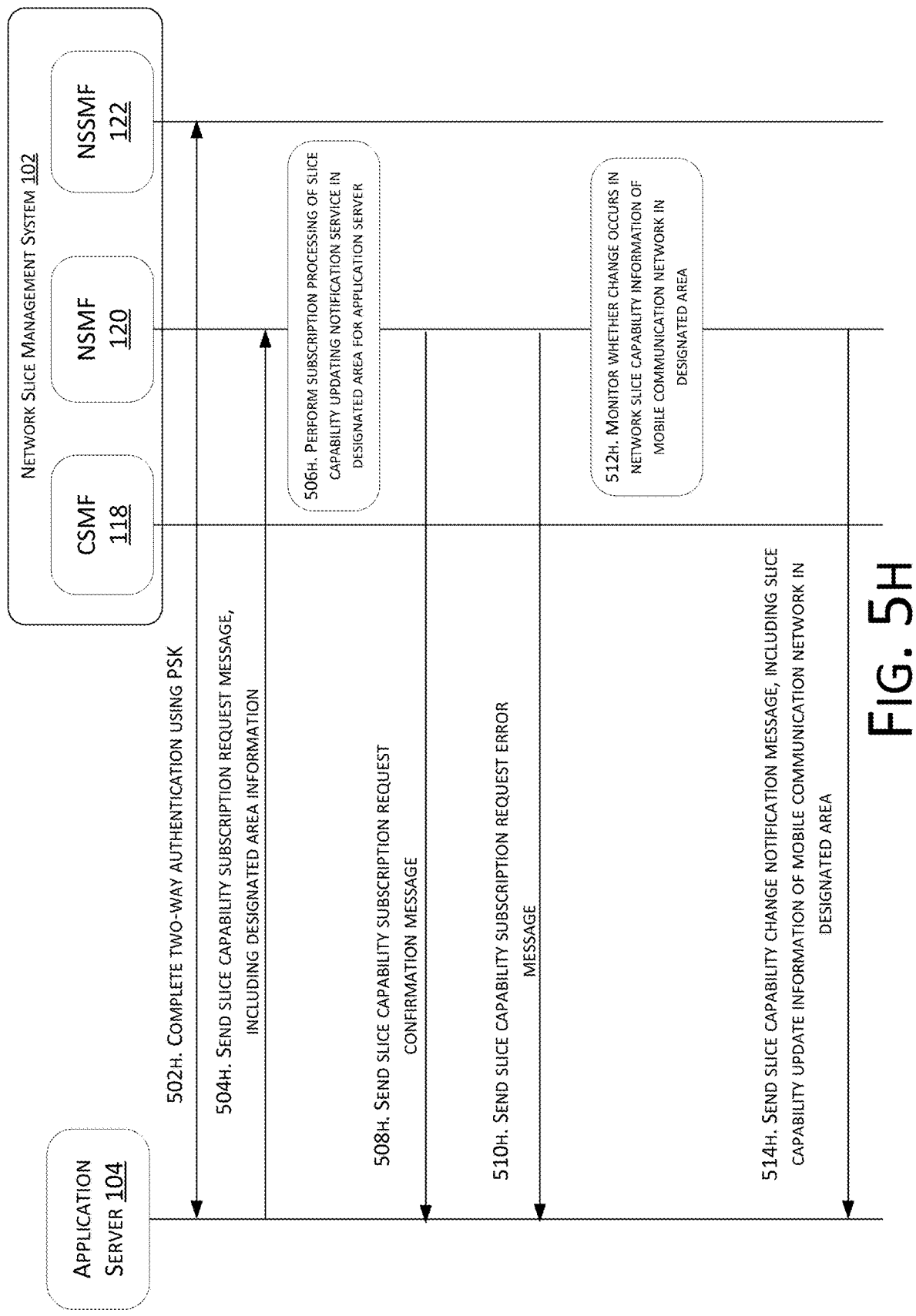
Figure 5I:
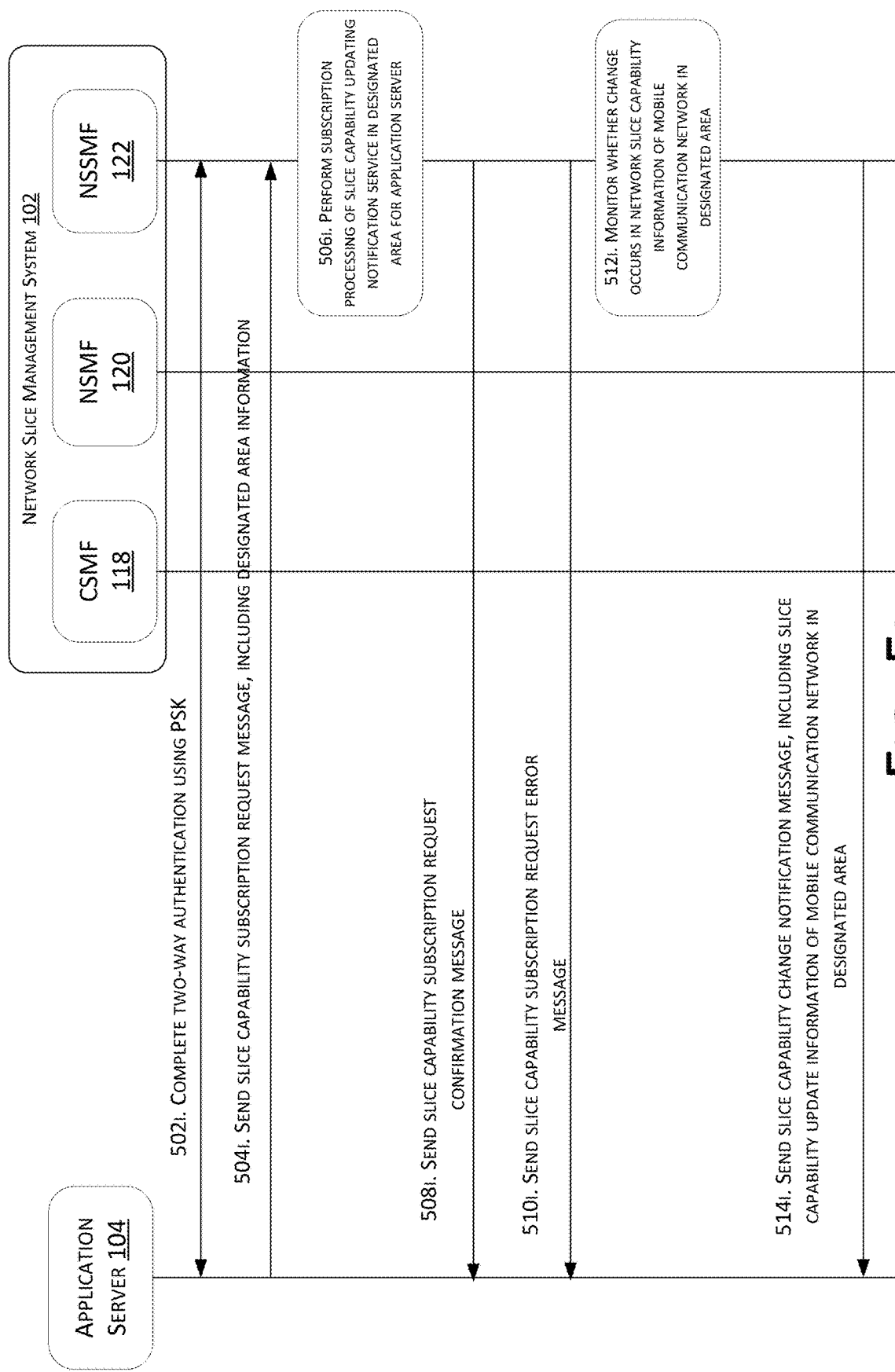

FIGS. 5*g*-5*i* show the process of subscribing to a network slice capability information updating notification service:

In an example embodiment, the process of the application server 104 directly interfacing with the CSMF 118 and requesting subscribing to the network slice capability information updating notification service from the network slice management system 102 is shown in FIG. 5*g*, including the following steps.

502*g*. Two-way authentication between the application server 104 and the network slice management system is completed using PSK.

504*g*. The application server 104 sends to the CSMF 118 in the network slice management system a slice capability subscription request message, wherein the request message includes the designed area information. The designated area information points to the designated area.

For example, the application server 104 may also send to the slice management exposure function entity 130 the slice capability subscription request message, and the slice management exposure function entity 130 sends the slice capability subscribing request message to the CSMF 118 in the network slice management system.

506g. After receiving the slice capability subscription request message, the CSMF 118 performs the subscription processing of the slice capability updating notification service in the designated area for the application server 104.

508g. If the subscription processing of the slice capability updating notification service is successful, the CSMF 118 sends a slice capability subscription request confirmation message to the application server 104.

510g. If the subscription processing of the slice capability updating notification service fails, the CSMF 118 may send to the application server 104 a slice capability subscription request error message; and the error message includes a cause or cause code for the slice capability subscription error.

512g. In the case that the subscription processing of the slice capability updating notification service is successful, the CSMF 118 cooperates with the NSMF 120 corresponding to the designated area and NSSMF 122 to monitor whether a change occurs in the network slice capability information of the mobile communication network in the designated area.

514g. In the case that it is monitored that a change occurs in the network slice capability information, the CSMF 118 sends the slice capability change notification message to the application server 104 through the slice management exposure function entity 130, wherein the notification message includes the slice capability updating information of the mobile communication network in the designated area.

In an example embodiment, the process of the application server 104 directly interfacing with the NSMF 120 and requesting subscribing to the network slice capability information updating notification service from the network slice management system 102 is shown in FIG. 5h, including the following steps.

502h. Two-way authentication between the application server 104 and the network slice management system is completed using PSK.

504h. The application server 104 sends to the NSMF 120 in the network slice management system a slice capability subscription request message, wherein the request message includes the designed area information. The designated area information points to the designated area.

For example, the application server 104 may also send to the slice management exposure function entity 130 the slice capability subscription request message, and the slice management exposure function entity 130 sends the slice capability subscribing request message to the NSMF 120 in the network slice management system.

506h. After receiving the slice capability subscription request message, the NSMF 120 performs the subscription processing of the slice capability updating notification service for the application server 104.

508h. If the subscription processing of the slice capability updating notification service is successful, the NSMF 120 sends a slice capability subscription request confirmation message to the application server 104.

510h. If the subscription processing of the slice capability updating notification service fails, the NSMF 120 may send to the application server 104 a slice capability subscription request error message; and the error message includes a cause or cause code for the slice capability subscription error.

512h. In the case that the subscription processing of the slice capability updating notification service is successful, the NSMF 120 cooperates with the NSSMF 122 corresponding to the designated area to monitor whether a change occurs in the network slice capability information of the mobile communication network in the designated area.

514h. In the case that it is monitored that a change occurs in the network slice capability information, the NSMF 120 sends the slice capability change notification message to the application server 104, wherein the notification message includes the slice capability updating information of the mobile communication network in the designated area.

In an example embodiment, the process of the application server 104 directly interfacing with the NSSMF 122 and requesting subscribing to the network slice capability information updating notification service from the network slice management system 102 is shown in FIG. 5i, including the following steps.

502i. Two-way authentication between the application server 104 and the network slice management system is completed using PSK.

504i. The application server 104 sends to the NSSMF 122 in the network slice management system a slice capability subscription request message, wherein the request message includes the designed area information. The designated area information points to an area where the NSSMF 122 is located.

For example, the application server 104 may also send to the slice management exposure function entity 130 the slice capability subscription request message, and the slice management exposure function entity 130 sends the slice capability subscribing request message to the NSSMF 122 in the network slice management system.

506i. After receiving the slice capability subscription request message, the NSSMF 122 performs the subscription processing of the slice capability updating notification service for the application server 104.

508i. If the subscription processing of the slice capability updating notification service is successful, the NSSMF 122 sends a slice capability subscription request confirmation message to the application server 104.

510i. If the subscription processing of the slice capability updating notification service fails, the NSSMF 122 may send to the application server 104 a slice capability subscription request error message; and the error message includes a cause or cause code for the slice capability subscription error.

512i. In the case that the subscription processing of the slice capability updating notification service is successful, the NSSMF 122 monitors whether a change occurs in the network slice capability information of the mobile communication network in the designated area.

514i. In the case that it is monitored that a change occurs in the network slice capability information, the NSSMF 122 sends the slice capability change notification message to the application server 104, wherein the notification message includes the slice capability updating information of the mobile communication network in the designated area.

It is to be noted that in the embodiment above, the slice capability querying request message, the slice capability deploying request message, and the slice capability subscription request message may be carried using an HTTP message or HTTPs message, and may also be carried by a message format customized by the network slice management system, which is not limited thereby. In addition, titles of the messages are only examples. All message titles that can implement corresponding functions are applicable in the embodiments of the present disclosure. For example, the messages may also be simply named as a fourth request message, a fifth request message, a sixth request message, and the like.

It should be noted that the execution body in each step of the method provided in the embodiment may be the same device, or the method may use different devices as execution bodies. For example, the execution body of step 201 to step 204 can be a device A. For another example, the execution body of step 201 can be a device A, the execution body of step 202 can be a device B, etc.

In addition, in some of the processes described in the embodiments and accompany drawings, multiple operations shown in a specific order are included. It is to be understood that these operations may be performed not in the order in which they occur herein or may be performed in parallel. Step numbers of the operations, such as 201 and 202, are merely used to distinguish different operations. The numbers themselves do not represent any execution order. In addition, these processes may include more or fewer operations, and these operations may be performed sequentially or in parallel. It should be noted that the description of "first," "second," and the like herein is configured to distinguish different messages, devices, modules, and the like, and does not represent a sequence, nor does it define that "first" and "second" are different types.

Figure 6:
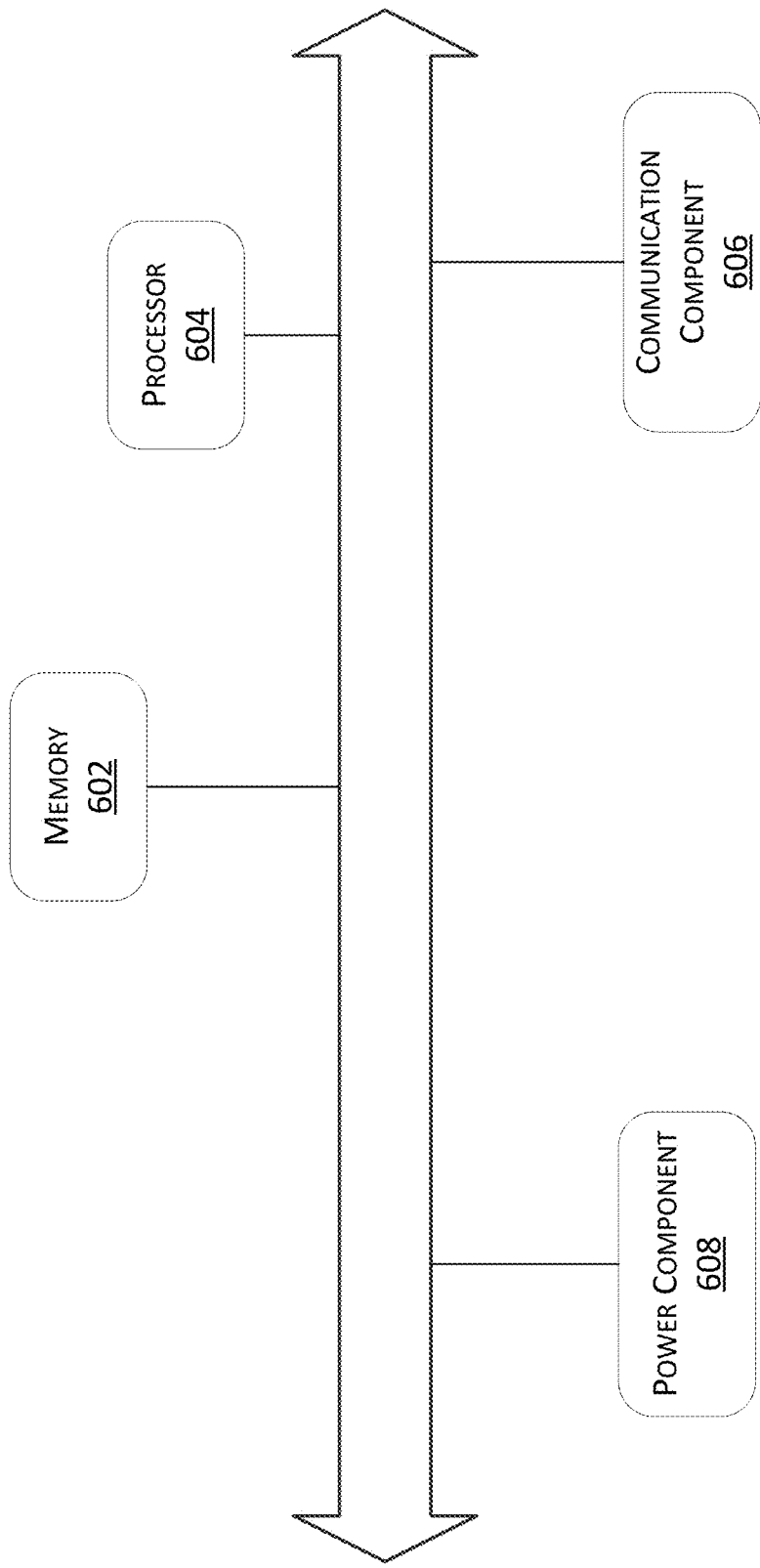
FIG. 6 shows a structural schematic diagram of an application server according to an embodiment of the present disclosure.

FIG. 6 shows a structural schematic diagram of the application server 104 according to an embodiment of the present disclosure. As shown in FIG. 6, the application server 104 includes: a memory 602 and a processor 604,
  wherein the memory 602 is configured to store a computer program and configured to store other various data so as to support operations on the application server 104. Examples of these data include instructions for any applications or methods configured to operate on the application server 104.

The memory 602 may be implemented by any type of volatile or non-volatile memory device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The processor 604 is coupled with the memory 602 and is configured to execute the computer program in the memory 602 to: send to a network entity in a network slice management system a service request message, wherein the service request message comprises a service parameter to request the network slice management system to provide a target service therefor; the target service comprises a slice template service or a network slice capability service; and receive a response message returned by the network entity for the service request message, the response message carrying information of whether the network slice management system is capable of successfully providing the target service for the application server 104.

In an example embodiment, in the case that the result message is a positive result message, the processor 604 is further configured to: receive a notification message returned by the network entity indicating that the target service is completed.

In an example embodiment, when sending the service request message to the network entity in the network slice management system, the processor 604 is specifically configured to: send to a slice management exposure function entity 130 the service request message to enable an exposure network entity to send the service request message to the network entity in the network slice management system.

In an example embodiment, in the case that the target service is the network slice template service, the service parameter at least comprises one of a first parameter set and a template identifier to enable the network slice management system to perform a creating, modifying, or deleting operation on a slice template.

In an example embodiment, when the service request message is a slice template customization request message, then the service parameter includes the first parameter set; or when the service request message is a slice template modifying request message, then the service parameter includes the first parameter set and a template identifier; or when the service request message is a slice template deleting request message, then the service parameter includes the template identifier. The first parameter set includes: at least one of the service quality parameter, the network element configuration parameter, the application-related parameter, the geographic location of the data network DN, the deployment manner of the user plane function UPF, and the network capacity parameter.

In an example embodiment, in the case that the target service is the network slice capability service, the service parameter comprises a second parameter set to enable the network slice management system to perform a querying, subscribing, or deploying operation on network slice capability of a mobile communication network.

In an example embodiment, the service request message is a slice capability querying request message, a slice capability deploying request message, or a slice capability subscription request message. The second parameter set includes: designated area information.

Further, as shown in FIG. 6, the application server 104 further includes: a communication component 606, a power supply component 608, and other components. Only some components are shown schematically in FIG. 6, which does not mean that the application server 104 only includes the components shown in FIG. 6.

Correspondingly, the embodiment of the present disclosure further provides a computer-readable storage medium having a computer program stored therein. When the computer program is executed, the steps executable by the application server 104 in the service request method embodiments may be implemented.

Correspondingly, the embodiment of the present disclosure further provides a computer program product, comprising a computer program or an instruction. When the computer program or the instruction is executed by a processor, the steps executable by the application server 104 in the service request method embodiments may be implemented.

Figure 7:
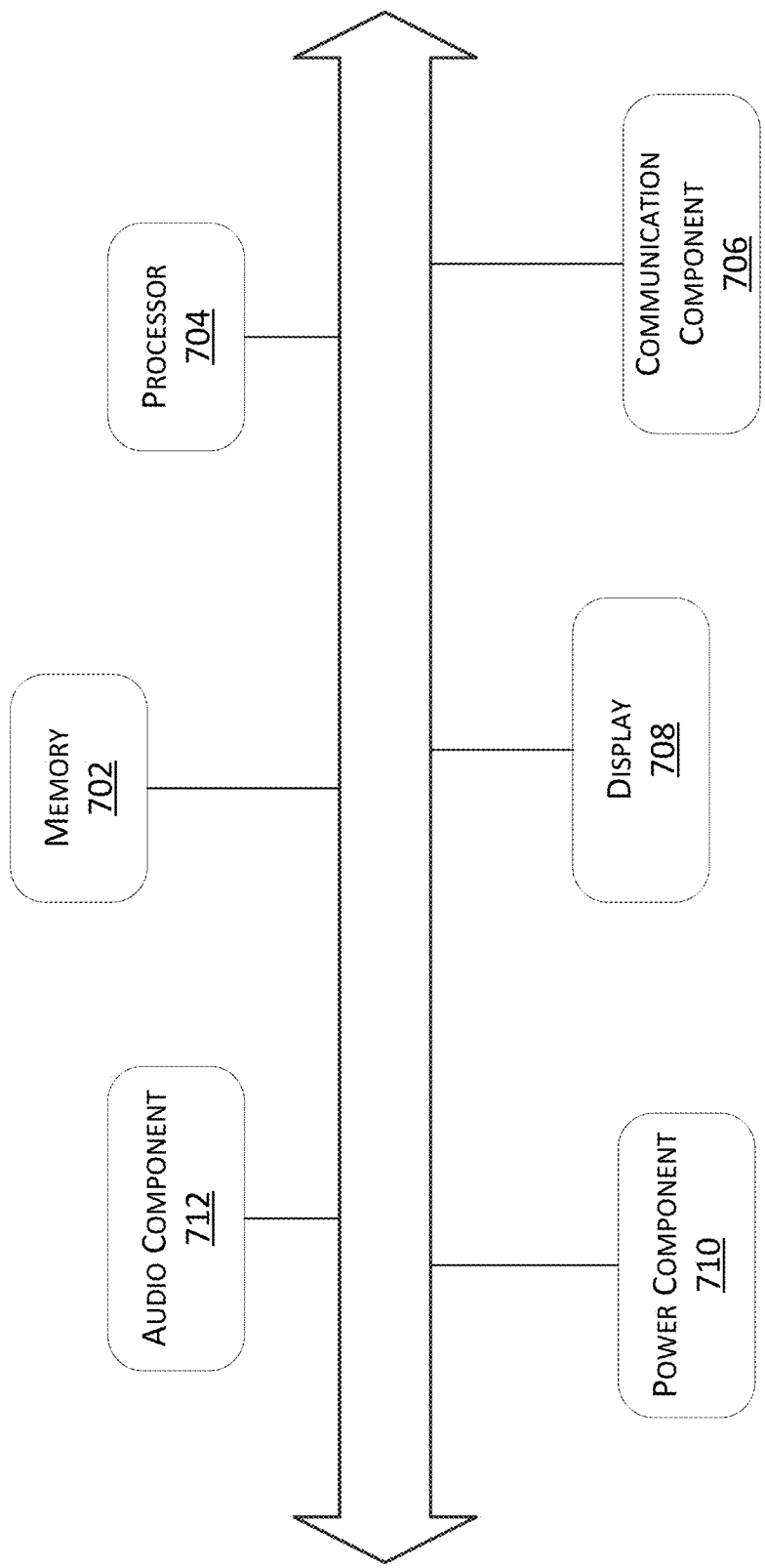
FIG. 7 shows a structural schematic diagram of a network entity according to an embodiment of the present disclosure.

FIG. 7 shows a structural schematic diagram of a network entity according to an embodiment of the present disclosure. As shown in FIG. 7, the network entity includes: a memory 702 and a processor 704,
  wherein the memory 702 is configured to store a computer program and configured to store other various data so as to support operations on the network entity. Examples of these data include instructions for any applications or methods configured to operate on the network entity.

The memory 702 may be implemented by any type of volatile or non-volatile memory device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The processor 704 is coupled with the memory 702 and is configured to execute the computer program in the memory 702 to: receive a service request message sent by an application server, wherein the service request message comprises a service parameter to request a target service from the network slice management system; provide the target service for the application server according to the service parameter, wherein the target service comprises a network slice template service or a network slice capability service; and return a response message to the application server, the response message carrying information of whether the network slice management system is capable of successfully providing the target service for the application server.

In an example embodiment, the processor 704 is further configured to: return to the application server the notification message indicating that the target service is completed in the case that the result message is a positive result message.

In an example embodiment, when receiving the service request message sent by the application server, the processor 704 is specifically configured to: receive the service request message from the application server sent by the slice management exposure function entity 130.

In an example embodiment, in the case that the target service is the network slice template service, the service parameter includes at least one of the first parameter set and the template identifier. When providing the target service for the application server according to the service parameter, the processor 704 is specifically configured to: perform the operation of creating, changing, or deleting the slice template according to one of the first parameter set and the template identifier at least included in the service parameter.

In an example embodiment, when the service request message is a slice template customization request message, and the service parameter includes the first parameter set, then when performing the operation of creating, modifying, or deleting the slice template according to one of the first parameter set and the template identifier at least included in the service parameter, the processor 704 is specifically configured to: perform the operation of creating the slice template according to the first parameter set; or when the service request message is the slice template modifying request message, and the service parameter includes the first parameter set and the template identifier, then the performing the operation of creating, modifying, or deleting the slice template according to one of the first parameter set and the template identifier at least included in the service parameter specifically comprises: performing the operation of modifying the network slice template according to the template identifier and the first parameter set; or when the service request message is the slice template deleting request message, and the service parameter includes the template identifier, then the performing the operation of creating, modifying, or deleting the slice template according to one of the first parameter set and the template identifier at least included in the service parameter specifically comprises: performing the operation of deleting the slice template according to the template identifier. The first parameter set includes: at least one of the service quality parameter, the network element configuration parameter, the application-related parameter, the geographic location of a data network DN, the deployment manner of a user plane function UPF, and the network capacity parameter. The template identifier includes at least one of the NST identifier and the NSST identifier.

In an example embodiment, when the network entity is an SMF in the network slice management system, then when performing the operation of creating the slice template according to the first parameter set, the processor 704 is specifically configured to: send the first parameter set to the corresponding NSMF to enable the NSMF to send to the selected NSSMF the subnet slice template parameter required for generating the NSST according to the first parameter set, and generate the NST associated with the NSST; and receive the identifier of at least one template of the NST and the NSST sent by the NSMF, wherein the identifier of the NSST is returned by the NSSMF after the NSST is generated according to the subnet slice template parameter. The response message is the slice template customization request confirmation message and is returned to the application server by the CSMF. The slice template customization request confirmation message includes an identifier of at least one template of the NST and the NSST.

In an example embodiment, when the network entity is the NSMF in the network slice management system, then when performing the operation of creating the slice template according to the first parameter set, the processor 704 is specifically configured to: send to the selected NSSMF the subnet slice template parameter required for generating the NSST according to the first parameter set and generate the NST associated with the NSST; and receive the identifier of the NSST returned by the NSSMF after the NSST is generated according to the subnet slice template parameter, wherein the response message is the slice template customization request confirmation message and is returned to the application server by the NSMF. The slice template customization request confirmation message includes the identifier of at least one template of the NST and the NSST.

In an example embodiment, when the network entity is the NSSMF in the network slice management system, then when performing the operation of creating the slice template according to the first parameter set, the processor 704 is specifically configured to: generate the NSST according to the first parameter set, and report the identifier of the NSST to the corresponding NSMF to enable the NSMF to generate the NST corresponding to the NSST; and receive the identifier of the NST returned by the NSMF after generating the NST, wherein the response message is the slice template customization request confirmation message and is returned to the application server by NSSMF. The slice template customization request confirmation message includes the identifier of at least one template of the NST and the NSST.

In an example embodiment, the generated NST is a customized NST, and the NSST includes at least one customized NSST. Further, an identifier of the customized NST or the customized NSST contains an identifier field of a customization manufacturer; or the identifier of the customized NST or the customized NSST is associated with an identifier of the customization manufacturer.

Further, for example, the slice template customization request message comprises a customization identifier, or the application server belongs to a set of pre-maintained third-party servers having a permission to customize the slice template.

In an example embodiment, when the network entity is the CSMF in the network slice management system, then when performing the operation of modifying the slice template according to the template identifier and the first parameter set, the processor 704 is specifically configured to: send the first parameter set and template identifier to the corresponding NSMF to enable the NSMF to modify the NST according to the first parameter set and the template identifier and/or send the subnet slice template parameter to the selected NSSMF to enable the selected NSSMF to modify the NSST accordingly; update the mapping relationship between the NST and the NSST after the NST and/or the NSST are modified; and receive the modification confirmation message returned by the NSMF, wherein the response message is the slice template modifying request confirmation message and is returned to the application server by the CSMF.

In an example embodiment, when the network entity is the NSMF in the network slice management system, then when performing the operation of modifying the slice template according to the template identifier and the first parameter set, the processor 704 is specifically configured to: modify the NST according to the first parameter set and the template identifier and/or send the subnet slice template parameter to the selected NSSMF to enable the selected NSSMF to modify the NSST accordingly; and update the mapping relationship between the NST and the NSST after the NST and/or NSST are modified, wherein the response message is the slice template modifying request confirmation message and is returned to the application server by the NSMF.

In an example embodiment, in the case that the template identifier is the NST identifier and the network entity is embodied as the NSMF, the processor 704 is specifically configured to: modify the NST corresponding to the NST identifier according to the first parameter set, and update the mapping relationship between the NST and the NSST after the NST is modified;

or in the case that the template identifier is the NST identifier and the network entity is embodied as the NSMF, the processor 704 is specifically configured to: modify the NST according to the first parameter set, send to the selected NSSMF the subnet slice template parameter to enable the NSSMF to modify the NSST, and update the mapping relationship between the NST and the NSST after the NST and the NSST are modified.

In an example embodiment, in the case that the template identifier is the NSST identifier and the network entity is embodied as the NSMF, the processor 704 is specifically configured to: send to the selected NSSMF the subnet slice template parameter and the NSST identifier to enable the NSSMF to modify the NSST, and update the mapping relationship between the NST and the NSST after the NSST is modified.

In an example embodiment, when the network entity is the NSSMF in the network slice management system, then when performing the operation of modifying the slice template according to the template identifier and the first parameter set, the processor 704 is specifically configured to: in the case that the template identifier is the NSST identifier, modify the NSST according to the first parameter set and the template identifier, and report an identifier of the modified NSST to the corresponding NSMF for the NSMF to update the mapping relationship between the NST and the NSST, wherein the response message is the slice template modifying request confirmation message and is returned to the application server by the NSSMF.

In an example embodiment, in the case that the template identifier is the NST identifier, the processor 704 is specifically configured to: report the first parameter set and the NST identifier to the corresponding NSMF for the NSMF to modify the NST and update the mapping relationship between the NST and the NSST;

or in the case that the template identifier is the NST identifier, the processor 704 is specifically configured to: modify the NSST according to the first parameter set and the template identifier, and report the first parameter set and the NST identifier to the corresponding NSMF for the NSMF to | modify the NST and update the mapping relationship between the NST and the NSST.

In an example embodiment, in the case that the network entity is the CSMF, the NSMF, or the NSSMF in the network slice management system, the processor 704 is further configured to: if the template identifier identifies a customized NST and/or a customized NSST, acquire an identifier of the customization manufacturer corresponding to the customized NST according to the template identifier. If the identifier of the application server matches with the identifier of the customization manufacturer, the operation of modifying the customized NST and/or customized NSST and the mapping relationship between the NST and the NSST is performed.

Further, for example, the processor 704 is further configured to: if the template identifier identifies a system defaulted NST and/or a system defaulted NSST, or the identifier of the application server and the identifier of the customization manufacturer do not match, output modification error information.

In an example embodiment, the first parameter set further includes: designated area information for the CSMF to determine the corresponding NSMF or for the NSMF to select the NSSMF.

In an example embodiment, when the network entity is the CSMF in the network slice management system, then when performing the operation of deleting the slice template according to the template identifier, the processor 704 is specifically configured to: send the template identifier to the corresponding NSMF for the NSMF to delete the corresponding NST and/or instruct the selected NSSMF to delete the corresponding NSST accordingly, and delete the mapping relationship corresponding to the deleted NST and/or NSST in the mapping relationship between the NST and the NSST; and receive the first deletion confirmation message returned by the NSMF, wherein the response message is the slice template deletion request confirmation message and is returned to the application server by the CSMF.

In an example embodiment, when the network entity is the NSMF in the network slice management system, then when performing the operation of deleting the slice template according to the template identifier, the processor 704 is specifically configured to: delete the NST and/or instruct the NSSMF to delete the corresponding NSST according to the template identifier; and delete the mapping relationship corresponding to the deleted NST and/or NSST in the mapping relationship between the NST and the NSST, wherein the response message is the slice template deletion request confirmation message and is returned to the application server by the NSMF.

In an example embodiment, in the case that the template identifier is the NSST identifier and the network entity is embodied as the NSMF, the processor 704 is specifically configured to: send to the selected NSSMF the NSST identifier corresponding to the NST identifier for the NSSMF to delete the corresponding NSST; and delete the NST corresponding to the NST identifier and the mapping relationship between the NST and the NSST; or in the case that the template identifier is the NSST identifier and the network entity is embodied as the NSMF, the processor 704 is specifically configured to: send to the selected NSSMF the NSST identifier for the NSSMF to delete the corresponding NSST, and delete the mapping relationship corresponding to the deleted NSST in the mapping relationship between the NST and the NSST corresponding to the NSST identifier.

In an example embodiment, when the network entity is the NSSMF in the network slice management system, then when performing the operation of deleting the slice template according to the template identifier, the processor 704 is specifically configured to: delete the corresponding NSST according to the template identifier; report the template identifier to the corresponding NSMF for the NSMF to delete the mapping relationship corresponding to the deleted NSST in the mapping relationship between the NST and the NSST; and receive a third deletion confirmation message returned by the NSMF, wherein the response message is the slice template deletion request confirmation message and is returned to the application server by the NNSMF.

Further, for example, before deleting the mapping relationship corresponding to the deleted NST and/or NSST, the processor 704 is further configured to: if the template identifier identifies a customized NST and/or a customized NSST, acquire an identifier of the customization manufacturer corresponding to the customized NST according to the template identifier. If the identifier of the application server matches with the identifier of the customization manufacturer, then delete the customized NST and/or customized NSST and the mapping relationship between the NST and the NSST corresponding to the deleted customized NST and/or customized NSST.

Further, for example, the processor 704 is further configured to: if the template identifier identifies a system defaulted NST and/or a system defaulted NSST, or the identifier of the application server and the identifier of the customization manufacturer do not match, output deletion error information.

In an example embodiment, in the case that the target service is the network slice capability service, the service parameter includes the second parameter set. Accordingly, when providing the target service for the application server according to the service parameter, the processor 704 is specifically configured to: perform the operation of querying, subscribing to, or deploying the network slice capability of the mobile communication network according to the second parameter set.

In an example embodiment, the second parameter set includes: designated area information. When the service request message is the slice capability querying request message, then when performing the operation of querying, subscribing to, or deploying the network slice capability of the mobile communication network according to the second parameter set, the processor 704 is specifically configured to: perform the operation of querying the network slice capability of the mobile communication network according to the designated area information; or when the service request message is the slice capability deploying request message, then when performing the operation of querying, subscribing to, or deploying the network slice capability of the mobile communication network according to the second parameter set, the processor 704 is specifically configured to: perform the operation of deploying the network slice capability of the mobile communication network according to the designated area information; or when the service request message is the slice capability subscription request message, then when performing the operation of querying, subscribing to, or deploying the network slice capability of the mobile communication network according to the second parameter set, the processor 704 is specifically configured to: perform the operation of subscribing to the network slice capability of the mobile communication network according to the designated area information.

In an example embodiment, when the network entity is the CSMF in the network slice management system, then when performing the operation of querying the network slice capability of the mobile communication network according to the designated area information, the processor 704 is specifically configured to: send the designated area information to the corresponding NSMF for the NSMF to acquire the network slice capability information of the mobile communication network in the designated area locally or from the NSSMF corresponding to the designated area information, and return the network slice capability information to the CSMF; and receive the network slice capability information of the mobile communication network in the designated area returned by the NSMF, wherein the response message is the slice capability querying request confirmation message and is returned to the application server by the CSMF. The slice capability querying request confirmation message includes the network slice capability information of the mobile communication network in the designated area.

In an example embodiment, when the network entity is the NSMF in the network slice management system, then when performing the operation of querying the network slice capability of the mobile communication network according to the designated area information, the processor 704 is specifically configured to: acquire the network slice capability information of the mobile communication network in the designated area locally or from the NSSMF corresponding to the designated area information. The response message is the slice capability querying request confirmation message and is returned to the application server by the NSMF. The slice capability querying request confirmation message includes the network slice capability information of the mobile communication network in the designated area.

In an example embodiment, when the network entity is the NSSMF in the network slice management system, then when performing the operation of querying the network slice capability of the mobile communication network according to the designated area information, the processor 704 is specifically configured to: acquire the network slice capability information of the mobile communication network in the designated area according to the designated area information. The response message is the slice capability querying request confirmation message and is returned to the application server by the NSSMF. The slice capability querying request confirmation message includes the network slice capability information of the mobile communication network in the designated area.

In an example embodiment, when the network entity is the CSMF in the network slice management system, then when performing the operation of deploying the network slice capability of the mobile communication network according to the designated area information, the processor 704 is specifically configured to: determine the information of the network slice capability to be deployed in the designated area according to the designated area information; send the information of the network slice capability to be deployed to the network management subsystem to enable the network management subsystem to deploy the network slice capability to be deployed in the designated area; and receive the deployment confirmation message returned by the network management subsystem. The response message is the slice capability deployment request confirmation message and is returned to the application server by the CSMF.

In an example embodiment, when the network entity is the first NSMF in the network slice management system, then when performing the operation of deploying the network slice capability of the mobile communication network according to the designated area information, the processor 704 is specifically configured to: in the case that the first NSMF is an NSMF in the designated area, determine the information of the network slice capability to be deployed in the designated area according to the designated area information, and send the network slice capability information to the network management subsystem to enable the network management subsystem to deploy the network slice capability to be deployed in the designated area accordingly; and receive the deployment confirmation message returned by the network management subsystem; and in the case that the first NSMF is not an NSMF in the designated area, forward the slice capability deploying request message to the second NSMF in the designated area to enable the second NSMF to cooperate with the corresponding network management subsystem to complete the deployment of the network slice capability in the designated area; and receive the deployment confirmation message returned by the network management subsystem through the second NSMF. The response message is the slice capability deployment request confirmation message and is returned to the application server by the CSMF.

In an example embodiment, when the network entity is the first NSSMF in the network slice management system, then when performing the operation of deploying the network slice capability of the mobile communication network according to the designated area information, the processor 704 is specifically configured to: in the case that the first NSSMF is an NSSMF in the designated area, determine the information of the network slice capability to be deployed in the designated area according to the designated area information, and send the network slice capability information to the network management subsystem to enable the network management subsystem to deploy the network slice capability to be deployed in the designated area accordingly; and receive the deployment confirmation message returned by the network management subsystem; and in the case that the first NSSMF is not an NSSMF in the designated area, forward the slice capability deploying request message to the second NSSSMF in the designated area to enable the second NSMF to cooperate with the corresponding network management subsystem to complete the deployment of the network slice capability in the designated area; and receive the deployment confirmation message returned by the network management subsystem through the second NSSMF. The response message is the slice capability deployment request confirmation message and is returned to the application server by the CSMF.

In an example embodiment, when the network entity is the CSMF, the NSMF, or the NSSMF in the network slice management system, then when performing the operation of subscribing to the network slice capability of the mobile communication network according to the designated area information, the processor 704 is specifically configured to: perform subscription processing on the network slice capability updating notification service in the designated area for the application server according to the designated area information; and return the slice capability change notification message to the application server in the case that the subscription is successful and a change occurs in the network slice capability information of the mobile communication network in the designated area, wherein the notification message includes the slice capability updating information of the mobile communication network in the designated area.

Further, as shown in FIG. 7, the network entity further includes: other components such as a communication component 706, a display 708, a power component 710, and an audio component 712. Only some components are shown schematically in FIG. 7, which does not mean that the network entity only includes the components shown in FIG. 7.

Correspondingly, the embodiment of the present disclosure further provides a computer-readable storage medium having a computer program stored therein. When the computer program is executed, the steps executable by the network entity in the network slice management system in the above service provision method embodiments may be implemented.

Correspondingly, the embodiment of the present disclosure further provides a computer program product, comprising a computer program or an instruction. When the computer program or the instruction is executed by a processor, the steps executable by the network entity in the network slice management system in the above service provision method embodiments may be implemented.

Communication components shown in FIG. 6 and FIG. 7 are configured to facilitate wired or radio communications between devices on which the communication components are arranged with other devices. The device on which the communication components are arranged may access radio networks based on communication standards, such as mobile communication networks like WiFi, 2G, 3G, 4G/LTE, and 5G, or combinations thereof. In an exemplary embodiment, the communication components receive, through a broadcast channel, broadcast signals or broadcast-related information from an external broadcast management system. In an exemplary embodiment, the communication components further comprise a near field communication (NFC) module to facilitate short range communications. For example, the NFC module can be implemented based on the radio frequency identifier (RFID) technology, the infrared data association (IrDA) technology, the ultra-wideband (UWB) technology, the Bluetooth (BT) technology, and other technologies.

The display shown in FIG. 7 includes a screen, which may include a liquid crystal display (LCD) and a touch panel (TP). If the screen includes the touch panel, the screen may be implemented as a touch screen to receive input signals from a user. The touch panel includes one or more touch sensors to sense touch, swipe, and gestures on the touch panel. The touch sensor may not only sense the boundary of a touch or swipe action, but also detect the duration and pressure related to the touch or swipe operation.

In FIG. 6 and FIG. 7, the power supply components, which are arranged on the device, provide power for various components of the device. The power supply components may include a power management system, one or more power supplies, and other components associated with generating, managing, and distributing power for the device on which the power supply components are arranged.

An audio component shown in FIG. 7 may be configured to output and/or input audio signals. For example, the audio component includes a microphone (MIC) configured to receive an external audio signal when the device on which the audio component is arranged is in an operating mode, for example, in a call mode, a recording mode, and a voice recognition mode. The received audio signal may be further stored in a memory or sent through a communication component. In some embodiments, the audio component further includes a speaker for outputting an audio signal.

Those skilled in the art should understand that the embodiments of the present disclosure may be provided as a method, a system, or a computer program product. Therefore, the present disclosure may take a form of an entirely hardware embodiment, an entirely software embodiment, or an embodiment combining software and hardware elements. Furthermore, the embodiment of the present disclosure may take the form of a computer program product which is embodied on one or more computer-usable storage media (including, but not limited to, disk storage, CD-ROM, optical storage, and so forth) having computer-usable program code included therein.

The present disclosure is described with reference to flow charts and/or block diagrams of methods, devices (systems) and computer program products according to embodiments of the present disclosure. It should be understood that computer program instructions may be used to implement each process and/or each block in the flow charts and/or the block diagrams and a combination of a process and/or a block in the flow charts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or another programmable device to generate computer-implemented processing. Therefore, the instructions executed on the computer or another programmable device are used to provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a volatile memory on a computer-readable medium, a random-access memory (RAM) and/or a non-volatile memory, and the like, such as a read-only memory (ROM) or a flash random access memory (flash RAM). The memory is an example of the computer-readable media.

Computer-readable storage media further include non-volatile and volatile, removable, and non-removable media employing any method or technique to achieve information storage. The information may be computer readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices or any other non-transmission medium, which may be used to store information that can be accessed by a computing device. As defined herein, the computer-readable storage media do not include transitory media, such as modulated data signals and carriers It should be further noted that the terms "include," "comprise," or any other variants thereof are intended to encompass non-exclusive inclusion, so that a process, method, product, or device that involves a series of elements comprises not only those elements, but also other elements not explicitly listed, or elements that are inherent to such a process, method, product, or device. Unless more limitations are stated, an element defined by the phrase "including a . . . " does not exclude the existence of another identical element in the process, method, product, or device that includes the element.

The above are only embodiments of the present disclosure and are not intended to limit the present disclosure. For those skilled in the art, there may be various modifications and changes to the present disclosure. Any modification, equivalent substitution, improvement, etc. made within the spirit and principle of the application shall be included in the scope of the claims of the present disclosure.

The present disclosure may further be understood with clauses as follows.

Clause 1. A service request method, applicable to an application server, comprising:

sending to a network entity in a network slice management system a service request message, wherein the service request message comprises a service parameter to request the network slice management system to provide target services therefor, the target services comprising a network slice template service or a network slice capability service; and receiving a response message returned by the network entity for the service request message, wherein the response message carries information indicating whether the network slice management system is capable of successfully providing the target service for the application server.

Clause 2. The method according to clause 1, wherein in response to determining that the network slice management system is capable of successfully providing the target service for the application server, the method further comprises: receiving a notification message returned by the network entity indicating that the target service is completed.

Clause 3. The method according to clause 1, wherein the sending to the network entity in the network slice management system the service request message comprises:

sending to a slice management exposure function entity the service request message to enable an exposure network entity to send the service request message to the network entity in the network slice management system.

Clause 4. The method according to any one of clauses 1-3, wherein in response to determining that the target service is the network slice template service, the service parameter at least comprises one of a first parameter set and a template identifier to enable the network slice management system to perform a creating, modifying, or deleting operation on a slice template.

Clause 5. The method according to clause 4, wherein the service request message is a slice template customization request message, then the service parameter comprises the first parameter set;

the service request message is a slice template modification request message, then the service parameter comprises the first parameter set and the template identifier; or the service request message is a slice template deletion request message, then the service parameter comprises the template identifier, wherein the first parameter set comprises: at least one of a service quality parameter, a network element configuration parameter, an application-related parameter, a geographic location of a data network (DN), a deployment manner of a user plane function (UPF), and a network capacity parameter; and the template identifier comprises at least one of a network slice template (NST) identifier and a network slice subnet template (NSST) identifier.

Clause 6. The method according to any one of clauses 1-3, wherein in response to determining that the target service is the network slice capability service, the service parameter comprises a second parameter set to enable the network slice management system to perform a querying, subscribing, or deploying operation on network slice capability of a mobile communication network.

Clause 7. The method according to clause 6, wherein the service request message is a slice capability query request message, a slice capability deploying request message, or a slice capability subscription request message; and the second parameter set comprises: designated area information.

Clause 8. A service provision method, applicable to a network entity in a network slice management system, comprising:

receiving a service request message transmitted by an application server, the service request message comprising a service parameter to request a target service from the network slice management system;

providing, according to the service parameter, the target service for the application server, the target service comprising a network slice template service or a network slice capability service; and returning a response message to the application server, the response message carrying information of whether the network slice management system is capable of successfully providing the target service for the application server.

Clause 9. The method according to clause 8, further comprising:

in response to determining that a result message is a positive result message, returning to the application server a notification message indicating that the target service is completed.

Clause 10. The method according to clause 8, wherein the receiving the service request message transmitted by the application server comprises:

receiving the service request message from the application server sent by the slice management exposure function entity.

Clause 11. The method according to clause 8, wherein:

in response to determining that the target service is the network slice template service, the service parameter at least comprises one of a first parameter set and a template identifier; and correspondingly, the providing, according to the service parameter, the target service for the application server comprises performing an operation of creating, modifying, or deleting a slice template according to one of the first parameter set and the template identifier at least comprised in the service parameter.

Clause 12. The method according to clause 11, wherein:

the service request message is a slice template customization request message, the service parameter comprises the first parameter set, then the performing the operation of creating, modifying, or deleting the slice template according to one of the first parameter set and the template identifier at least comprised in the service parameter specifically comprises: performing an operation of creating the slice template according to the first parameter set;

the service request message is a slice template modification request message, the service parameter comprises the first parameter set and the template identifier, then the performing the operation of creating, modifying, or deleting the slice template according to one of the first parameter set and the template identifier at least comprised in the service parameter specifically comprises: performing an operation of modifying the slice template according to the template identifier and the first parameter set; or the service request message is a slice template deletion request message, the service parameter comprises the template identifier, then the performing the operation of creating, modifying, or deleting the slice template according to one of the first parameter set and the template identifier at least comprised in the service parameter specifically comprises: performing an operation of deleting the slice template according to the template identifier, wherein the first parameter set comprises: at least one of a service quality parameter, a network element configuration parameter, an application-related parameter, a geographic location of a data network (DN), a deployment manner of a user plane function (UPF), and a network capacity parameter; and the template identifier comprises at least one of a network slice template (NST) identifier and a network slice subnet template (NSST) identifier.

Clause 13. The method according to clause 12, wherein the network entity is a communication service management function (CSMF) in the network slice management system, then the performing the operation of creating the slice template according to the first parameter set comprises:

sending the first parameter set to a corresponding network slice management function NSMF to enable the NSMF to send, according to the first parameter set, to a selected network slice subnet management function (NSSMF) a subnet slice template parameter required for generating an NSST and to generate an NST associated with the NSST; and receiving an identifier of at least one template of the NST and the NSST sent by the NSMF, wherein the identifier of the NSST is returned after the NSSMF generates the NSST according to the subnet slice template parameter, wherein the response message is a slice template customization request confirmation message and is returned to the application server by the CSMF; and the slice template customization request confirmation message comprises the identifier of at least one template of the NST and the NSST.

Clause 14. The method according to clause 12, wherein the network entity is the NSMF in the network slice management system, then the performing the operation of creating the slice template according to the first parameter set comprises:

sending to the selected NSSMF the subnet slice template parameter required for generating the NSST according to the first parameter set and generating the NST associated with the NSST; and receiving the identifier of the NSST returned after the NSSMF has generated the NSST according to the subnet slice template parameter, wherein the response message is the slice template customization request confirmation message and is returned to the application server by the NSMF; and the slice template customization request confirmation message comprises the identifier of at least one template of the NST and the NSST.

Clause 15. The method according to clause 12, wherein the network entity is the NSSMF in the network slice management system, then the performing the operation of creating the slice template according to the first parameter set comprises:

generating the NSST according to the first parameter set, and reporting the identifier of the NSST to a corresponding NSMF to enable the NSMF to generate the NST corresponding to the NSST; and receiving the identifier of the NST returned after the NSMF has generated the NST, wherein the response message is the slice template customization request confirmation message and is returned to the application server by the NSSMF; and the slice template customization request confirmation message comprises the identifier of at least one template of the NST and the NSST.

Clause 16. The method according to any one of clauses 13-15, wherein:

the NST is a customized NST; the NSST comprises at least one customized NSST; and an identifier of the customized NST or the customized NSST contains an identifier field of a customization manufacturer; or the identifier of the customized NST or the customized NSST is associated with an identifier of the customization manufacturer.

Clause 17. The method according to clause 16, wherein the slice template customization request message comprises a customization identifier, or an identifier of the application server belongs to a set of pre-maintained third-party server identifiers having a permission to customize the slice template.

Clause 18. The method according to clause 12, wherein the network entity is the CSMF in the network slice management system, then performing the operation of modifying the slice template according to the template identifier and the first parameter set comprises:

sending the first parameter set and the template identifier to a corresponding NSMF to enable the NSMF to modify the NST and/or send the subnet slice template parameter to the selected NSSMF to enable the NSSMF to modify the NSST according to the first parameter set and the template identifier, and updating a mapping relationship between the NST and the NSST after the NST and/or the NSST has been modified; and receiving a modification confirmation message returned by the NSMF, wherein the response message is a slice template modifying request confirmation message and is returned to the application server by the CSMF.

Clause 19. The method according to clause 12, wherein the network entity is the NSMF in the network slice management system, then the performing the operation of modifying the slice template according to the template identifier and the first parameter set comprises:

according to the first parameter set and the template identifier, modifying the NST and/or sending to the selected NSSMF the subnet slice template parameter to enable the NSSMF to modify the NSST; and updating the mapping relationship between the NST and the NSST after the NST and/or the NSST has been modified, wherein the response message is the slice template modifying request confirmation message and is returned to the application server by the NSMF.

Clause 20. The method according to clause 18 or 19, wherein in response to determining that the template identifier is the NST identifier, the NSMF modifies the NST corresponding to the NST identifier according to the first parameter set, and updates the mapping relationship between the NST and the NSST after the NST has been modified; or in response to determining that the template identifier is the NST identifier, the NSMF modifies the NST according to the first parameter set, sends to the selected NSSMF the subnet slice template parameter to enable the NSSMF to modify the NSST, and updates the mapping relationship between the NST and the NSST after the NST and the NSST have been modified.

Clause 21. The method according to clause 18 or 19, wherein in response to determining that the template identifier is the NSST identifier, the NSMF sends to the selected NSSMF the subnet slice template parameter and the NSST identifier to enable the NSSMF to modify the NSST, and updates the mapping relationship between the NST and the NSST after the NSST has been modified.

Clause 22. The method according to clause 12, wherein the network entity is the NSSMF in the network slice management system, then the performing the operation of modifying the slice template according to the template identifier and the first parameter set comprises:

in response to determining that the template identifier is the NSST identifier, modifying the NSST according to the first parameter set and the template identifier, and reporting an identifier of the modified NSST to the corresponding NSMF for the NSMF to update the mapping relationship between the NST and the NSST, wherein the response message is the slice template modifying request confirmation message and is returned to the application server by the NSSMF.

Clause 23. The method according to clause 22, further comprising:

in response to determining that the template identifier is the NST identifier, reporting the first parameter set and the NST identifier to the corresponding NSMF for the NSMF to modify the NST and update the mapping relationship between the NST and the NSST; or in response to determining that the template identifier is the NST identifier, modifying the NSST according to the first parameter set and the template identifier, and reporting the first parameter set and the NST identifier to the corresponding NSMF for the NSMF to| modify the NST and update the mapping relationship between the NST and the NSST.

Clause 24. The method according to clause 18, 19, 22, or 23, further comprising:

in response to determining that the template identifier identifies a customized NST and/or customized NSST, acquiring an identifier of a customization manufacturer corresponding to the customized NST and/or customized NSST according to the template identifier; and in response to determining that the identifier of the application server and the identifier of the customization manufacturer match, performing the operations of modifying the customized NST and/or customized NSST and for the mapping relationship between the NST and the NSST.

Clause 25. The method according to clause 24, further comprising:
in response to determining that the template identifier identifies a system defaulted NST and/or a system defaulted NSST, or the identifier of the application server and the identifier of the customization manufacturer do not match, outputting modification error information.

Clause 26. The method according to clause 13, 14, 18, or 19, wherein the first parameter set further comprises: designated area information for the CSMF to determine the corresponding NSMF or for the NSMF to select the NSMF.

Clause 27. The method according to clause 12, wherein the network entity is the CSMF in the network slice management system, then performing the operation of deleting the slice template according to the template identifier comprises:
sending the template identifier to the corresponding NSMF for the NSMF to delete the NST and/or instruct the selected NSSMF to delete the corresponding NSST, and deleting the mapping relationship corresponding to the deleted NST and/or NSST in the mapping relationship between the NST and the NSST; and
receiving a first deletion confirmation message returned by the NSMF, wherein the response message is a slice template deletion request confirmation message and is returned to the application server by the CSMF.

Clause 28. The method according to clause 12, wherein the network entity is the NSMF in the network slice management system, then the performing the operation of deleting the slice template according to the template identifier comprises:
deleting, according to the template identifier, the NST and/or instructing the NSSMF to delete the corresponding NSST, and deleting the mapping relationship corresponding to the deleted NST and/or NSST in the mapping relationship between the NST and the NSST, wherein the response message is the slice template deletion request confirmation message and is returned to the application server by the NSMF.

Clause 29. The method according to clause 27 or 28, wherein
in response to determining that the template identifier is the NST identifier, the NSMF sends to the selected NSSMF the NSST identifier corresponding to the NST identifier for the NSSMF to delete the corresponding NSST, and deletes the NST corresponding to the NST identifier and the mapping relationship between the NST and the NSST; and
in response to determining that the template identifier is the NSST identifier, the NSMF sends to the selected NSSMF the NSST identifier for the NSSMF to delete the corresponding NSST, and deletes the mapping relationship corresponding to the deleted NSST in the mapping relationship between the NST and the NSST corresponding to the NSST identifier.

Clause 30. The method according to clause 12, wherein the network entity is the NSSMF in the network slice management system, then performing the deleting operation on the slice template according to the template identifier comprises:
deleting the corresponding NSST according to the template identifier, and reporting the template identifier to the corresponding NSMF for the NSMF to delete a mapping relationship corresponding to the deleted NSST in the mapping relationship between the NST and the NSST; and
receiving a third deletion confirmation message returned by the NSMF, wherein the response message is the slice template deletion request confirmation message and is returned to the application server by the NNSMF.

Clause 31. The method according to clause 27, 28, or 30, wherein prior to the deleting the mapping relationship corresponding to the deleted NST and/or NSST, the method further comprises:
in response to determining that the template identifier identifies a customized NST and/or a customized NSST, acquiring an identifier of a customization manufacturer corresponding to the customized NST according to the template identifier; and
in response to determining that the identifier of the application server and the identifier of the customization manufacturer match, performing the operation of deleting the customized NST and/or customized NSST and the mapping relationship corresponding to the deleted customized NST and/or customized NSST in the mapping relationship between the NST and the NSST.

Clause 32. The method according to clause 31, further comprising:
in response to determining that the template identifier identifies a system defaulted NST and/or a system defaulted NSST, or the identifier of the application server and the identifier of the customization manufacturer do not match, outputting deletion error information.

Clause 33. The method according to clause 8, wherein in response to determining that the target service is the network slice capability service, the service parameter comprises a second parameter set; and
correspondingly, the providing, according to the service parameter, the target service for the application server comprises performing an operation of querying, subscribing to, or deploying the network slice capability of a mobile communication network according to the second parameter set.

Clause 34. The method according to clause 33, wherein:
the second parameter set comprises: the designated area information; and
the service request message is the slice capability query request message, then the performing the operation of querying, subscribing to, or deploying the network slice capability of the mobile communication network according to the second parameter set comprises: performing an operation of querying the network slice capability of the mobile communication network according to the designated area information;
the service request message is a slice capability deploying request message, then the performing the operation of querying, subscribing to, or deploying the network slice capability of the mobile communication network according to the second parameter set comprises: performing an operation of deploying the network slice capability of the mobile communication network according to the designated area information; or
the service request message is a slice capability subscription request message, then the performing the operation of querying, subscribing to, or deploying the network slice capability of the mobile communication network according to the second parameter set comprises: performing an operation of subscribing to the network slice capability of the mobile communication network according to the designated area information.

Clause 35. The method according to clause 34, wherein the network entity is the CSMF in the network slice management system, then the performing the operation of querying the network slice capability of the mobile communication network according to the designated area information comprises:

sending the designated area information to the corresponding NSMF for the NSMF to acquire, from the NSSMF corresponding to the designated area information, network slice capability information of the mobile communication network in the designated area and return the network slice capability information to the CSMF; and receiving the network slice capability information of the mobile communication network in the designated area returned by the NSMF, wherein the response message is a slice capability querying request confirmation message and is returned to the application server by the CSMF; and the slice capability querying request confirmation message comprises the network slice capability information of the mobile communication network in the designated area.

Clause 36. The method according to clause 34, wherein the network entity is the NSMF in the network slice management system, then the performing the operation of querying the network slice capability of the mobile communication network according to the designated area information comprises:

acquiring, from the NSSMF corresponding to the designated area information, the network slice capability information of the mobile communication network in the designated area, wherein the response message is the slice capability querying request confirmation message and is returned to the application server by the NSMF; and the slice capability querying request confirmation message comprises the network slice capability information of the mobile communication network in the designated area.

Clause 37. The method according to clause 34, wherein the network entity is the NSSMF in the network slice management system, then the performing the operation of querying the network slice capability of the mobile communication network according to the designated area information comprises:

acquiring, according to the designated area information, the network slice capability information of the mobile communication network in the designated area, wherein the response message is the slice capability querying request confirmation message and is returned to the application server by the NSSMF; and the slice capability querying request confirmation message comprises the network slice capability information of the mobile communication network in the designated area.

Clause 38. The method according to clause 34, wherein the network entity is the CSMF in the network slice management system, then the performing the operation of deploying the network slice capability of the mobile communication network according to the designated area information comprises:

determining, according to the designated area information, information of a network slice capability to be deployed in the designated area; and sending the information of the network slice capability to be deployed to a network management subsystem corresponding to the designated area to enable the network management subsystem to deploy, according to such information, the network slice capability to be deployed in the designated area, and receiving a deployment confirmation message returned by the network management subsystem, wherein the response message is a slice capability deployment request confirmation message and is returned to the application server by the CSMF.

Clause 39. The method according to clause 34, wherein the network entity is a first NSMF in the network slice management system, then the performing the operation of deploying the network slice capability of the mobile communication network according to the designated area information comprises:

in response to determining that the first NSMF is an NSMF in the designated area, determining, according to the designated area information, the information of the network slice capability to be deployed in the designated area, and sending the network slice capability information to the network management subsystem corresponding to the designated area to enable the network management subsystem to deploy, according to such information, the network slice capability to be deployed in the designated area accordingly, and receiving the deployment confirmation message returned by the network management subsystem; and in response to determining that the first NSMF is not the NSMF in the designated area, forwarding the slice capability deploying request message to a second NSMF in the designated area to enable the second NSMF to cooperate with a corresponding network management subsystem to complete deployment of the network slice capability in the designated area, and receiving a deployment confirmation message returned by the network management subsystem through the second NSMF, wherein the response message is the slice capability deployment request confirmation message and is returned to the application server by the CSMF.

Clause 40. The method according to clause 34, wherein the network entity is a first NSSMF in the network slice management system, then the performing the operation of deploying the network slice capability of the mobile communication network according to the designated area information comprises:

in response to determining that the first NSSMF is an NSSMF in the designated area, determining, according to the designated area information, the information of the network slice capability to be deployed in the designated area, and sending the network slice capability information to the network management subsystem corresponding to the designated area to enable the network management subsystem to deploy, according to such information, the network slice capability to be deployed in the designated area accordingly, and receiving the deployment confirmation message returned by the network management subsystem; and in response to determining that the first NSSMF is not the NSMF in the designated area, forwarding the slice capability deploying request message to a second NSSMF in the designated area to enable the second NSSMF to cooperate with a corresponding network management subsystem to complete deployment of the network slice capability in the designated area, and receiving a deployment confirmation message returned by the network management subsystem through the second NSSMF, wherein the response message is the slice capability deployment request confirmation message and is returned to the application server by the CSMF.

Clause 41. The method according to clause 34, wherein the network entity is the CSMF, the NSMF, or the NSSMF in the network slice management system, then performing the operation of subscribing to the network slice capability of the mobile communication network according to the designated area information comprises:

subscribing to, according to the designated area information, a slice capability updating notification service for the application server in the designated area; and in response to determining that the subscription is successful and the network slice capability information of the mobile communication network in the designated area is changed, returning a slice capability change notification message to the application server, the notification message comprising slice capability updating information of the mobile communication network in the designated area.

Clause 42. An application server, comprising: a memory and a processor, wherein the memory is configured to store a computer program; the processor is coupled to the memory and configured to execute the computer program, so as to: send to a network entity in a network slice management system a service request message, wherein the service request message comprises a service parameter to request the network slice management system to provide a target service therefor; the target service comprises a network slice template service or a network slice capability service; and receive a response message returned by the network entity for the service request message, the response message carrying information of whether the network slice management system is capable of successfully providing the target service for the application server.

Clause 43. A network entity, comprising: a memory and a processor, wherein the memory is configured to store a computer program; the processor is coupled to the memory and configured to execute the computer program, so as to: receive a service request message sent by an application server, wherein the service request message comprises a service parameter to request a target service from the network slice management system; provide the target service for the application server according to the service parameter, wherein the target service comprises a network slice template service or a network slice capability service; and return a response message to the application server, the response message carrying information of whether the network slice management system is capable of successfully providing the target service for the application server.

Clause 44. A computer-readable storage medium storing therein a computer program, wherein when the computer program is executed by a processor, the processor is enabled to implement steps of the methods in any one of clauses 1-41.

Clause 45. A computer program product, comprising a computer program or instruction, wherein when the computer program or instruction is executed by a processor, the processor is enabled to implement steps of the methods in any one of clauses 1-41.

What is claimed is:

1. A service request method, applicable to an application server, the service request method comprising:

sending to a network entity in a network slice management system a service request message, the service request message including a service parameter to request the network slice management system to provide a target service, the target service including a network slice template service or a network slice capability service; and receiving a response message returned by the network entity for the service request message, the response message carries information indicating a capability of the network slice management system of successfully providing the target service for the application server.

2. The service request method according to claim 1, wherein in response to determining that the network slice management system has the capability of successfully providing the target service for the application server, the service request method further comprises receiving a notification message returned by the network entity indicating that the target service is completed.

3. The service request method according to claim 1, wherein the sending to the network entity in the network slice management system the service request message comprises:

sending to a slice management exposure function entity the service request message to enable an exposure network entity to send the service request message to the network entity in the network slice management system.

4. The service request method according to claim 1, wherein in response to determining that the target service is the network slice template service, the service parameter at least comprises one of a first parameter set and a template identifier to enable the network slice management system to perform a creating, modifying, or deleting operation on a slice template.

5. The service request method according to claim 4, wherein:

the service request message is a slice template customization request message; and the service parameter comprises the first parameter set.

6. The service request method according to claim 4, wherein:

the service request message is a slice template modification request message; and the service parameter comprises the first parameter set and the template identifier.

7. The service request method according to claim 4, wherein:

the service request message is a slice template deletion request message; and the service parameter comprises the template identifier.

8. The service request method according to claim 4, wherein:

the first parameter set comprises: at least one of a service quality parameter, a network element configuration parameter, an application-related parameter, a geographic location of a data network (DN), a deployment manner of a user plane function (UPF), and a network capacity parameter; and the template identifier comprises at least one of a network slice template (NST) identifier and a network slice subnet template (NSST) identifier.

9. The service request method according to claim 1, wherein in response to determining that the target service is the network slice capability service, the service parameter comprises a second parameter set to enable the network slice management system to perform a querying, subscribing, or deploying operation on network slice capability of a mobile communication network.

10. The service request method according to claim 9, wherein:
the service request message is a slice capability query request message, a slice capability deploying request message, or a slice capability subscription request message; and
the second parameter set comprises designated area information.

11. One or more computer-readable storage media storing thereon computer-readable instructions that, when executed by one or more processors, cause the one or more processors to perform acts applicable to a network entity in a network slice management system, the acts comprising:
receiving a service request message transmitted by an application server, the service request message including a service parameter to request a target service from the network slice management system;
providing, according to the service parameter, the target service for the application server, the target service including a network slice template service or a network slice capability service; and
returning a response message to the application server, the response message carrying information of whether the network slice management system is capable of successfully providing the target service for the application server.

12. The one or more computer-readable storage media according to claim 11, wherein:
the target service is the network slice template service, the service parameter at least comprises one of a first parameter set and a template identifier; and
the providing, according to the service parameter, the target service for the application server comprises performing an operation of creating, modifying, or deleting a slice template according to one of the first parameter set and the template identifier at least comprised in the service parameter.

13. The one or more computer-readable storage media according to claim 12, wherein:
the service request message is a slice template customization request message, the service parameter comprises the first parameter set, then the performing the operation of creating, modifying, or deleting the slice template according to one of the first parameter set and the template identifier at least comprised in the service parameter specifically comprises: performing an operation of creating the slice template according to the first parameter set;
the service request message is a slice template modification request message, the service parameter comprises the first parameter set and the template identifier, then the performing the operation of creating, modifying, or deleting the slice template according to one of the first parameter set and the template identifier at least comprised in the service parameter specifically comprises: performing an operation of modifying the slice template according to the template identifier and the first parameter set; or
the service request message is a slice template deletion request message, the service parameter comprises the template identifier, then the performing the operation of creating, modifying, or deleting the slice template according to one of the first parameter set and the template identifier at least comprised in the service parameter specifically comprises: performing an operation of deleting the slice template according to the template identifier,
wherein the first parameter set comprises: at least one of a service quality parameter, a network element configuration parameter, an application-related parameter, a geographic location of a data network (DN), a deployment manner of a user plane function (UPF), and a network capacity parameter; and the template identifier comprises at least one of a network slice template (NST) identifier and a network slice subnet template (NSST) identifier.

14. The one or more computer-readable storage media according to claim 13, wherein:
the network entity is a communication service management function (CSMF) in the network slice management system; and
the performing the operation of creating the slice template according to the first parameter set comprises:
sending the first parameter set to a corresponding network slice management function (NSMF) to enable the NSMF to send, according to the first parameter set, to a selected network slice subnet management function (NSSMF) a subnet slice template parameter required for generating an NSST and to generate an NST associated with the NSST; and
receiving an identifier of at least one template of the NST and the NSST sent by the NSMF, wherein the identifier of the NSST is returned after the NSSMF generates the NSST according to the subnet slice template parameter,
wherein the response message is a slice template customization request confirmation message and is returned to the application server by the CSMF; and the slice template customization request confirmation message comprises the identifier of at least one template of the NST and the NSST.

15. The one or more computer-readable storage media according to claim 14 wherein:
the network entity is the NSMF in the network slice management system; and
the performing the operation of creating the slice template according to the first parameter set comprises:
sending to the selected NSSMF the subnet slice template parameter required for generating the NSST according to the first parameter set and generating the NST associated with the NSST; and
receiving the identifier of the NSST returned after the NSSMF has generated the NSST according to the subnet slice template parameter,
wherein the response message is the slice template customization request confirmation message and is returned to the application server by the NSMF; and the slice template customization request confirmation message comprises the identifier of at least one template of the NST and the NSST.

16. The one or more computer-readable storage media according to claim 14, wherein:
the network entity is the NSSMF in the network slice management system; and
the performing the operation of creating the slice template according to the first parameter set comprises:
generating the NSST according to the first parameter set, and reporting the identifier of the NSST to a corresponding NSMF to enable the NSMF to generate the NST corresponding to the NSST; and
receiving the identifier of the NST returned after the NSMF has generated the NST, wherein the response message is the slice template customization request confirmation message and is returned to the application server by the NSSMF; and the slice template customization request confirmation message comprises the identifier of at least one template of the NST and the NSST.

17. The one or more computer-readable storage media according to claim 16, wherein:
the NST is a customized NST; the NSST comprises at least one customized NSST; and
an identifier of the customized NST or a customized NSST contains an identifier field of a customization manufacturer; or the identifier of the customized NST or the customized NSST is associated with an identifier of the customization manufacturer.

18. The one or more computer-readable storage media according to claim 13, wherein:
the network entity is a communication service management fuction (CSMF) in the network slice management system; and
the performing the operation of modifying the slice template according to the template identifier and the first parameter set comprises:
sending the first parameter set and the template identifier to a corresponding network slice management function (NSMF) to enable the NSMF to modify an NST and/or send a subnet slice template parameter to a selected NSSMF to enable the NSSMF to modify an NSST according to the first parameter set and the template identifier, and updating a mapping relationship between the NST and the NSST after the NST and/or the NSST has been modified; and
receiving a modification confirmation message returned by the NSMF, wherein the response message is a slice template modifying request confirmation message and is returned to the application server by the CSMF.

19. The one or more computer-readable storage media according to claim 13, wherein:

the network entity is a network slice management function (NSMF) in the network slice management system; and
the performing the operation of modifying the slice template according to the template identifier and the first parameter set comprises:
according to the first parameter set and the template identifier, modifying an NST and/or sending to a selected NSSMF a subnet slice template parameter to enable the NSSMF to modify an NSST; and
updating a mapping relationship between the NST and the NSST after the NST and/or the NSST has been modified,
wherein the response message is a slice template modifying request confirmation message and is returned to the application server by the NSMF.

20. An application server comprising:
one or more processors; and
one or more memories storing thereon computer-readable instructions that, when executed by one or more processors, cause the one or more processors to perform acts comprising:
sending to a network entity in a network slice management system a service request message, the service request message including a service parameter to request the network slice management system to provide a target service, the target service including a network slice template service or a network slice capability service; and
receiving a response message returned by the network entity for the service request message, the response message carries information indicating a capability of the network slice management system of successfully providing the target service for the application server.

* * * * *